United States Patent [19]
Haymaker

[11] Patent Number: 6,126,015
[45] Date of Patent: Oct. 3, 2000

[54] SOLIDS SEPARATING DEVICE FOR DIFFERENT SIZED MATERIALS

[76] Inventor: Roger L. Haymaker, 14525 N. 161th St. E. Ave, Collinsville, Okla. 74021

[21] Appl. No.: 09/009,272

[22] Filed: Jan. 20, 1998

[51] Int. Cl.[7] .............................. B07B 1/00; A01K 29/00
[52] U.S. Cl. .......................... 209/235; 209/294; 209/296; 209/362; 119/166
[58] Field of Search .................................... 209/235, 283, 209/294, 296, 362; 119/165, 163, 166

[56] References Cited

U.S. PATENT DOCUMENTS

| | | | |
|---|---|---|---|
| 4,120,264 | 10/1978 | Carter | 119/1 |
| 4,522,150 | 6/1985 | Gershman | 119/1 |
| 4,846,104 | 7/1989 | Pierson, Jr. | 119/1 |
| 4,934,317 | 6/1990 | Pourshalchi | 119/1 |
| 5,048,464 | 9/1991 | Shirley | 119/166 |
| 5,048,465 | 9/1991 | Carlisi | 119/166 |
| 5,107,797 | 4/1992 | LaRoche | 119/166 |
| 5,402,751 | 4/1995 | De La Chevrotiere | 119/166 |
| 5,477,812 | 12/1995 | Waters | 119/163 |
| 5,853,585 | 12/1998 | Nesseth | 209/294 X |

FOREIGN PATENT DOCUMENTS

| | | | |
|---|---|---|---|
| 4113093 | 10/1991 | Germany | 209/235 |

*Primary Examiner*—Tuan N. Nguyen
*Attorney, Agent, or Firm*—Steven R. Tollette

[57] ABSTRACT

The device selectively separates and removes larger sized objects from a mixture of larger and smaller sized objects, such as soiled litter and animal waste from surrounding clean litter. The device has a rotating chamber which contains the mixture of larger and smaller sized objects with an opening for entry into and out of the chamber, and for expulsion of separated larger sized objects out of the chamber. A separating element, which is disposed longitudinally on the interior of the chamber, is passed through the mixture of larger and smaller sized objects to separate the larger sized objects from the smaller sized objects during the rotation of the chamber. As the chamber rotates, the separated larger sized objects, such as soiled litter and animal waste, are transferred from the separating element to a pivotable ramp in the interior of the chamber. The weight of separated larger sized objects causes the ramp to pivot to an inclined position which allows the separated larger sized objects to slide down the ramp and out of the chamber into an appropriate receptacle. A system of seals are provided as part of the receptacle to seal the separated larger sized objects inside the receptacle to allow multiple separations of the mixture of larger and smaller sized objects before disposal of the separated larger sized objects is required. Invention can be totally manual or totally automatic in its operation.

41 Claims, 37 Drawing Sheets

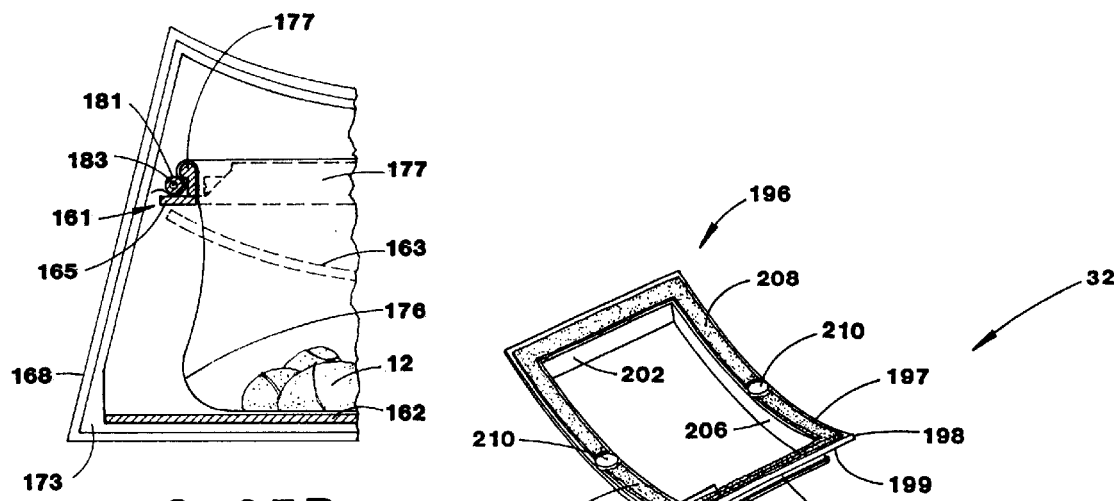
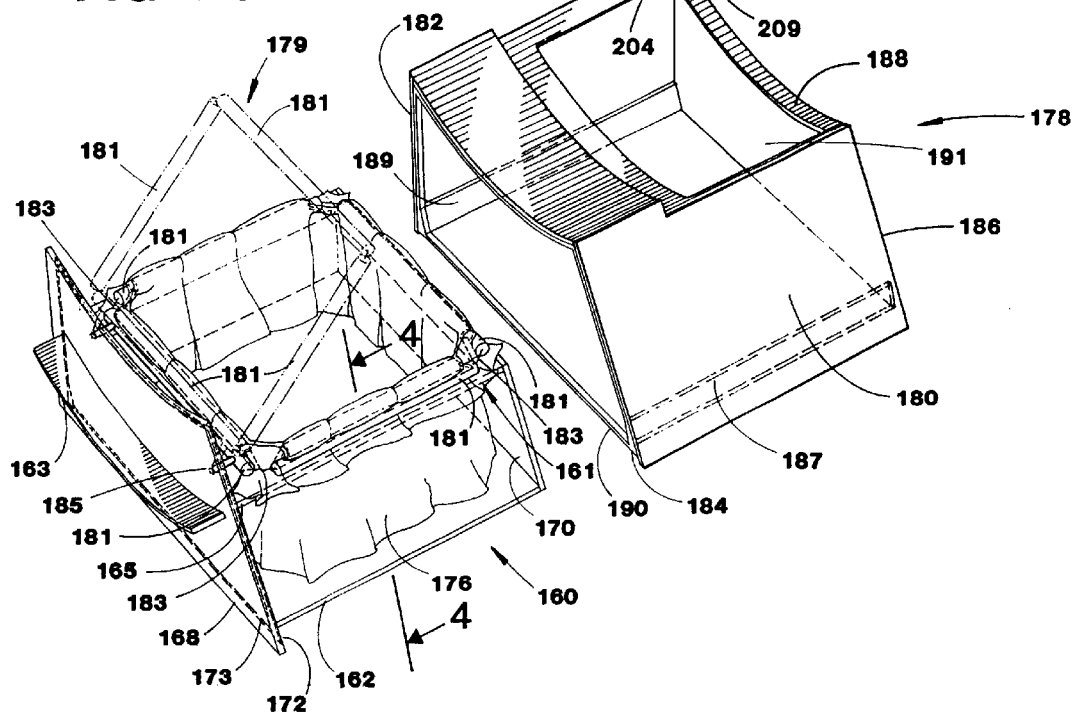
FIG. 25B
FIG. 25A

SOLIDS SEPARATING DEVICE FOR DIFFERENT SIZED MATERIALS

BACKGROUND

This invention relates to a device to selectively separate and remove larger sized objects from a mixture of larger and smaller sized objects. More specifically, the invention relates to the separation and removal of urine saturated litter clumps or soiled litter and solid animal waste, hereinafter referred to as animal waste, from surrounding clean litter.

Owners of domestic animals, such as cats, have long used a litter box for the toilet needs of their domestic animals. The litter box is filled with one of any number of particulate materials meant to absorb moisture and odor from the animal's wastes. These particulate materials are referred to as kitty litter or litter. Due to the unpleasant odor and the unsanitary nature of the wastes, the litter in the litter box must be cleaned on a regular basis for the benefit of both the animal and the owner of the animal.

A common type of litter box is a simple tray filled with litter. The usual method of cleaning the tray type litter box is to manually collect and dispose of the soiled litter and animal waste with perforated scoops or other devices developed to remove the soiled litter and animal waste from the clean litter. As this method of cleaning a litter box is unsanitary, unpleasant, time consuming and ineffective, the owner finds it necessary to repeat the cleaning process frequently and to replace the entire contents of the litter box periodically. To replace the contents of the litter box, the owner must pick up the tray type litter box and dump the contents; soiled litter and animal waste, and clean litter; into a plastic bag or other trash container. Since the soiled litter and animal waste often sticks to the bottom of the tray, spillage of the unsanitary and odoriferous contents may occur.

Cleaning a litter box is considered by most people to be such an unpleasant, time consuming and unsanitary task that they put it off until the odor from the litter box becomes unbearable and the entire contents of the litter box must be replaced. This causes a very unsanitary condition that could be a source of infection for the animal and the owner. This has led to the use of antiseptic and odor fighting chemical products that are dispersed throughout the litter. The open top and shallow sides of a tray type litter box do not allow proper dispersement of these antiseptic and odor fighting chemicals throughout the litter.

Because the above efforts to clean and deodorize the animal's litter box are either infrequently or ineffectively done by the owner, the owner finds that he or she is constantly replacing the litter in the litter box. This constant replacement of litter increases the cost of owning the animal. If the owner were to be able to easily and effectively clean the soiled litter and animal waste from the clean litter without the task being so unpleasant and time consuming, then the owner would find that the litter would not have to be replaced as frequently. This would reduce the cost of owning the animal.

When a domestic animal uses a litter box, it often digs, scratches, and otherwise kicks and distributes litter onto its wastes. Because of the shallow sides of the tray type litter box, the animal often kicks soiled litter and animal waste particles out of the litter box onto the area around the litter box. This creates an additional unsanitary and unpleasant condition for the owner to deal with.

In response to the above problems, inventors have developed a variety of automated, self-cleaning litter boxes. One type of automated, self-cleaning litter box consists of an open tray for litter that contains a rake-like device across the tray; an opening at the end of the litter tray to receive the soiled litter and animal waste separated by the rake; and a motor with controls to move the rake through the litter. One problem with this type of automated litter box is that it is much bigger than the simple tray type litter box and takes up more of the owner's living area. Another problem is that this type of automated litter box has a smaller area available for litter and for the animal to use the litter box than the simple tray type litter box, even though the automated litter box is physically larger. This type of litter box still allows the animal to kick soiled litter and animal waste out of the litter box. Since the top of the litter box is open, the odors from the soiled litter and animal waste still fill the owner's living space and, like the simple tray type litter box, antiseptic or deodorizer chemicals cannot be properly dispersed throughout the litter. A major disadvantage of this type of litter box is that the rake-like device must be widely spaced to reduce the loading on the electric motor and, therefore, is ineffective in cleaning soiled litter and animal waste from the clean litter. Also, since the electrical devices, used to automate the litter box, are near the litter area, there is the possibility that the animal could incur an electrical shock while using the litter box. There is also the danger that the automatic self-cleaning litter box will start a cleaning cycle while the animal is in the litter box, which could harm the animal. This type of litter box requires special bags or special boxes for its receptacle which are very expensive. Sometimes these special bags or special boxes are not readily available. For all of the above reasons, the tray type automated, self-cleaning litter box fails to meet the needs of the animal and the animal's owner.

Other types of automated, self-cleaning litter boxes are totally enclosed litter boxes with motorized mechanisms, located outside the enclosure, to either rotate the enclosure or to rotate separating devices inside the litter box enclosure. There are a number of problems with the totally enclosed types of litter boxes. They are large and require clearance on all sides of the litter box, which requires more of the owner's living space. It is difficult to remove soiled litter from these totally enclosed litter boxes because of the small opening in the enclosure for this purpose and due to the complex mechanisms inside these litter boxes. It is also difficult to add fresh litter to these litter boxes. If the litter box makes use of a plastic bag to collect animal wastes, then the owner must buy special, expensive plastic bags for the litter box. There is also the danger that the totally enclosed type of litter box will start a cleaning cycle while the animal is in the litter box, which could harm the animal. All of these components make the totally enclosed types of automatic self-cleaning litter boxes expensive to manufacture and expensive to maintain.

Because of the expense to purchase, the expense to maintain and the problems associated with the use of these automated, self-cleaning litter boxes, none of these automated, self-cleaning litter boxes have gained widespread acceptance.

SUMMARY

The present invention is directed to a device that satisfies the need for a simple, low cost, material containing, odor containing, easy to fill, easy to clean, effective and automatic way to selectively separate and remove larger sized objects from a mixture of larger and smaller sized objects, such as soiled litter and animal waste from clean litter. In a broad aspect, the device having features of the present invention comprises a rotating chamber, a support base, a selectively restrictive separating means, a pivoting ramp, and a receptacle. The device has a stationary mode that occurs when the chamber is stationary and has a cleaning mode that occurs when the chamber is rotated. The chamber receives and contains the mixture of larger and smaller sized objects. This normally occurs when the chamber is in the stationary mode, but could occur when the chamber is in the cleaning mode. The support base supports the chamber while the chamber is either in the stationary mode or the cleaning mode. The chamber and the support base have an opening, in at least one end, where the opening is centered around the axis of rotation of the chamber. The opening allows entry into the chamber, such as an animal going inside the litter box, allows exit from the chamber, such as an animal leaving the litter box, and allows the separated larger sized objects, such as the soiled litter and animal waste, to exit the chamber. The separating means is attached to the interior surface of the chamber. The separating means is used to separate the larger sized objects, such as soiled litter and animal waste, from the mixture of larger and smaller sized objects, such as a mixture of soiled litter and animal waste and clean litter. The ramp is attached to the interior of the chamber in a first position wherein the ramp is substantially horizontal and is allowed to pivot about a point near the rear of the ramp. The ramp receives the separated larger sized objects, such as soiled litter and animal waste, from the separating means and directs the separated larger sized objects out of the chamber. The receptacle is attached to the external surface of the support base, underneath the opening in the support base, to receive the separated larger sized objects, such as soiled litter and animal waste, from the ramp. The receptacle can accept any type of plastic bag so that the separated larger sized objects can be received into the plastic bag inside the receptacle.

The following illustrates the device as a litter box. The device is filled with litter through the opening in the support base and the chamber. Once filled with litter, the chamber remains in the stationary mode to allow the animal to enter through the opening in the support base and the opening in the chamber, use the litter box and leave through both openings. When the owner desires to clean the litter box, he or she places the chamber into the cleaning mode by rotating the chamber. As the chamber rotates, the separating means moves through the mixture of soiled litter, animal waste and clean litter, and removes the soiled litter and animal waste from the clean litter. Also, as the chamber rotates, the clean litter tumbles to keep the litter from packing down in the chamber and to disperse antiseptic and deodorizer chemicals throughout the litter. The abrasive action of the litter, as it tumbles when the chamber rotates, acts to clean the interior surface of the chamber. The separating means cooperates with the chamber's interior surface to keep the separated larger sized objects from falling back into the clean litter as the chamber is rotated. When the chamber is rotated to the point where the separating means is over the ramp, gravity causes the separated soiled litter and animal waste to move from the separating means onto the ramp. Once the separated soiled litter and animal waste have been received by the ramp, the weight of the separated soiled litter and animal waste causes the ramp to pivot, about the pivot point at the rear of the ramp, from the first position to a second position wherein the ramp is inclined. As the ramp pivots to the second position, the separated soiled litter and animal waste slide off the ramp, exit the chamber through the opening and are deposited into the plastic bag inside the receptacle on the outside of the chamber. When the separated soiled litter and animal waste are no longer on the ramp, the ramp pivots back to the first position ready to receive additional separated soiled litter and animal waste from the separating means and to provide space for the animal to enter or exit the chamber. The owner can tie the plastic bag and remove the soiled litter and animal waste for disposal or can leave the separated soiled litter and animal waste in the plastic bag inside the receptacle until additional cleaning cycles have been completed or the receptacle becomes full. The owner can easily and automatically clean the litter box and dispose of the soiled litter and animal waste that is separated from the clean litter in the time it takes to rotate the chamber and never touch the soiled litter or animal waste. Since the owner can use the invention to easily and effectively separate the soiled litter and animal waste from the clean litter, the owner will reduce the frequency that all of the litter will have to be replaced and reduce his or her cost of owning the animal which meets one of the objects of the invention.

Another object of the present invention is to provide an enclosed area for the mixture of larger and smaller sized objects in order to contain them within that enclosed area. In this invention, this is accomplished since the mixture of larger and smaller sized objects is contained in the chamber. For example, when the invention is used as a litter box, the animal goes inside the chamber to use the litter box and kicks the litter to cover its waste, the litter kicked by the animal is contained inside the litter box by the chamber.

Another object of the present invention is to provide a method of separating and removing larger sized objects from a mixture of larger and smaller sized objects that reduces the time required to separate and remove the larger sized objects. The present invention is designed to separate and remove the larger sized objects from a mixture of larger and smaller sized objects with one or two rotations of the chamber. Compared to other methods of separating and removing larger sized objects from a mixture of larger and smaller sized objects, this invention greatly reduces the time needed to separate and remove the larger sized objects.

Another object of the present invention is to provide an enclosed area for the mixture of larger and smaller sized objects in order to contain the odor from the mixture within the enclosed area. In this invention, this is accomplished due to the mixture of the larger and smaller sized objects being contained in the chamber. For example, when the invention is used as a litter box, the odor from the animal waste is contained inside the litter box by the chamber.

Another object of this invention is to allow for multiple cleanings of the mixture of larger and smaller sized objects to be performed before the separated larger sized objects must be removed from the receptacle. For example, in one embodiment of the invention, the receptacle has seals that prevent the odor from the separated soiled litter and animal waste from leaving the receptacle and entering the owner's living space. Therefore, the owner can clean the litter box numerous times before having to dispose of the separated soiled litter and animal waste.

Another object of the present invention is to provide a device to automatically, selectively separate larger sized objects from a mixture of larger and smaller sized objects that is simple to operate. One embodiment of the invention calls for the chamber to be manually operated by a person. Therefore, no motor for rotating the chamber is required, no controls to automate the rotation of the chamber are required, and no electrical wiring is required to connect the motor and controls to a source of power. This greatly simplifies the invention and makes it easy to operate. An individual simply rotates the chamber by hand when they want to separate larger sized objects from a mixture of larger and smaller sized objects.

Another object of the present invention is to provide a device that is totally automatic and motorized to selectively separate larger sized objects from a mixture of larger and smaller sized objects without intervention by the owner. This embodiment of the invention has an electric motor and controls to automatically rotate the chamber 2 1/12 times to separate and remove the larger sized objects from the mixture of larger and smaller sized objects. The owner only has to periodically empty the receptacle, after multiple operations, with this embodiment of the invention.

Yet another object of the present invention is to reduce the cost to manufacture a device to separate larger sized objects from a mixture of larger and smaller sized objects. In one embodiment, the invention has eliminated the need for a motor, controls and electrical wiring which greatly reduces the cost to manufacture the invention.

Yet another object of the present invention is to reduce the space required for a litter box in the owner's living space. Since the invention can be used and cleaned from the front, the owner does not need to leave room around the other three sides of the invention. This means that the invention can be placed into various locations in the owner's living space, such as a corner or under a table, thereby taking up less of the owner's living space.

Still yet, another object of the present invention is to provide a new and improved device for separating larger sized objects from a mixture of larger and smaller sized objects which provides some of the advantages found in the apparatuses and methods of the prior art thereof, while simultaneously overcoming some of the disadvantages normally associated therewith.

BRIEF DESCRIPTION OF THE DRAWINGS

These and other features, aspects, and advantages of the present invention will become better understood with respect to the following description and accompanying drawings where:

FIG. 25A is an exploded view of an alternative embodiment of the receptacle;

FIG. 25B is a partial sectional view of the receptacle shown in FIG. 25A taken along the line 4—4 of FIG. 25A.

DESCRIPTION

Figure 1:
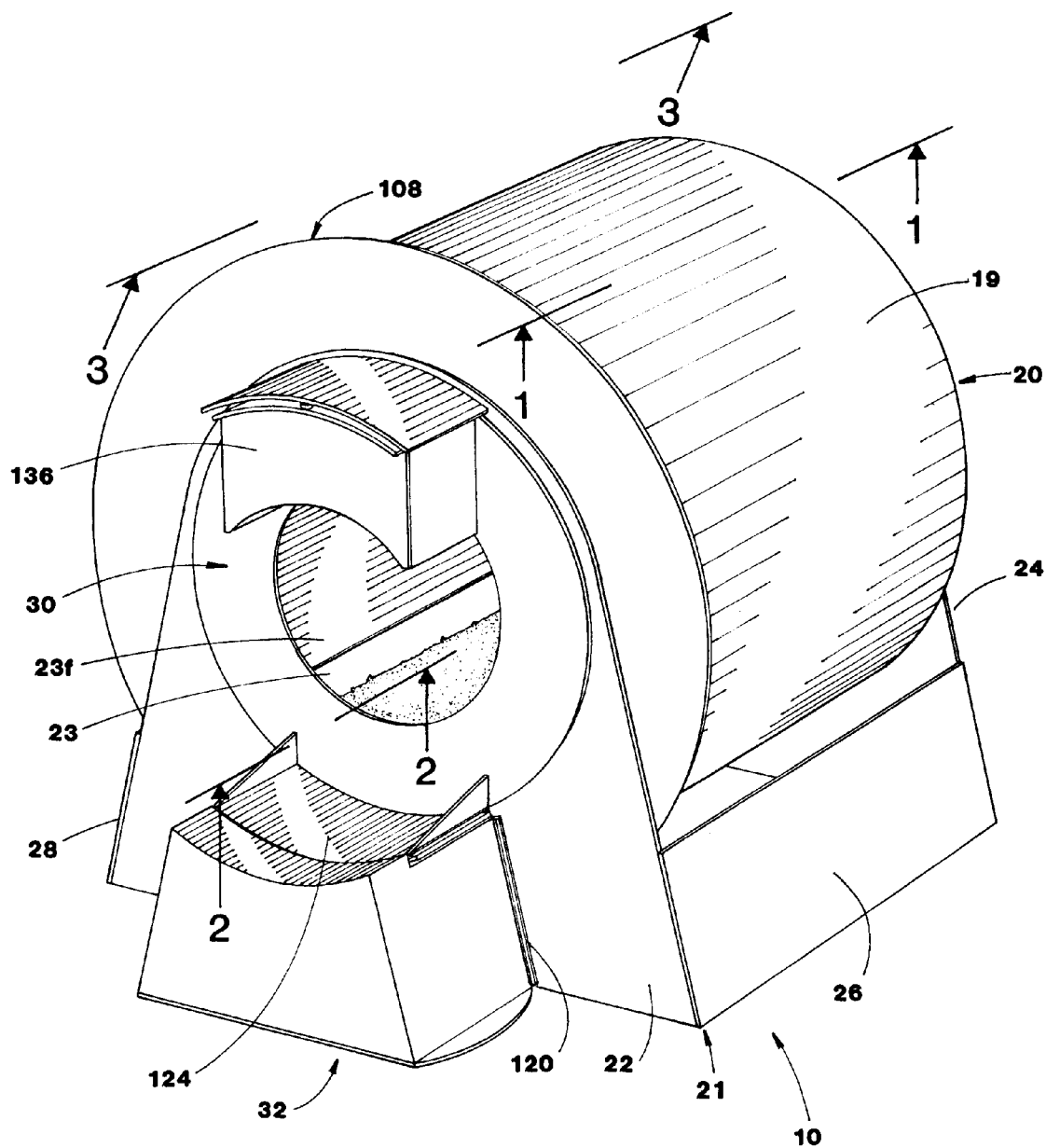
FIG. 1 is a front perspective view of one embodiment of the invention.

While the present, preferred embodiment of the invention discussed below is a self-cleaning litter box, the inventor envisions other applications for the invention. The following description illustrates the unique features of the invention by describing the invention as a self-cleaning litter box. Referring now to the drawings wherein like referenced characters designate like or corresponding parts throughout the several views, particularly to FIG. 1, there is shown a device 10 for separating and removing soiled litter and animal waste 12 from a mixture of soiled litter and animal waste 12 and clean litter 11, and for depositing the separated soiled litter and animal waste 12 into a storage receptacle 32.

Figure 19:
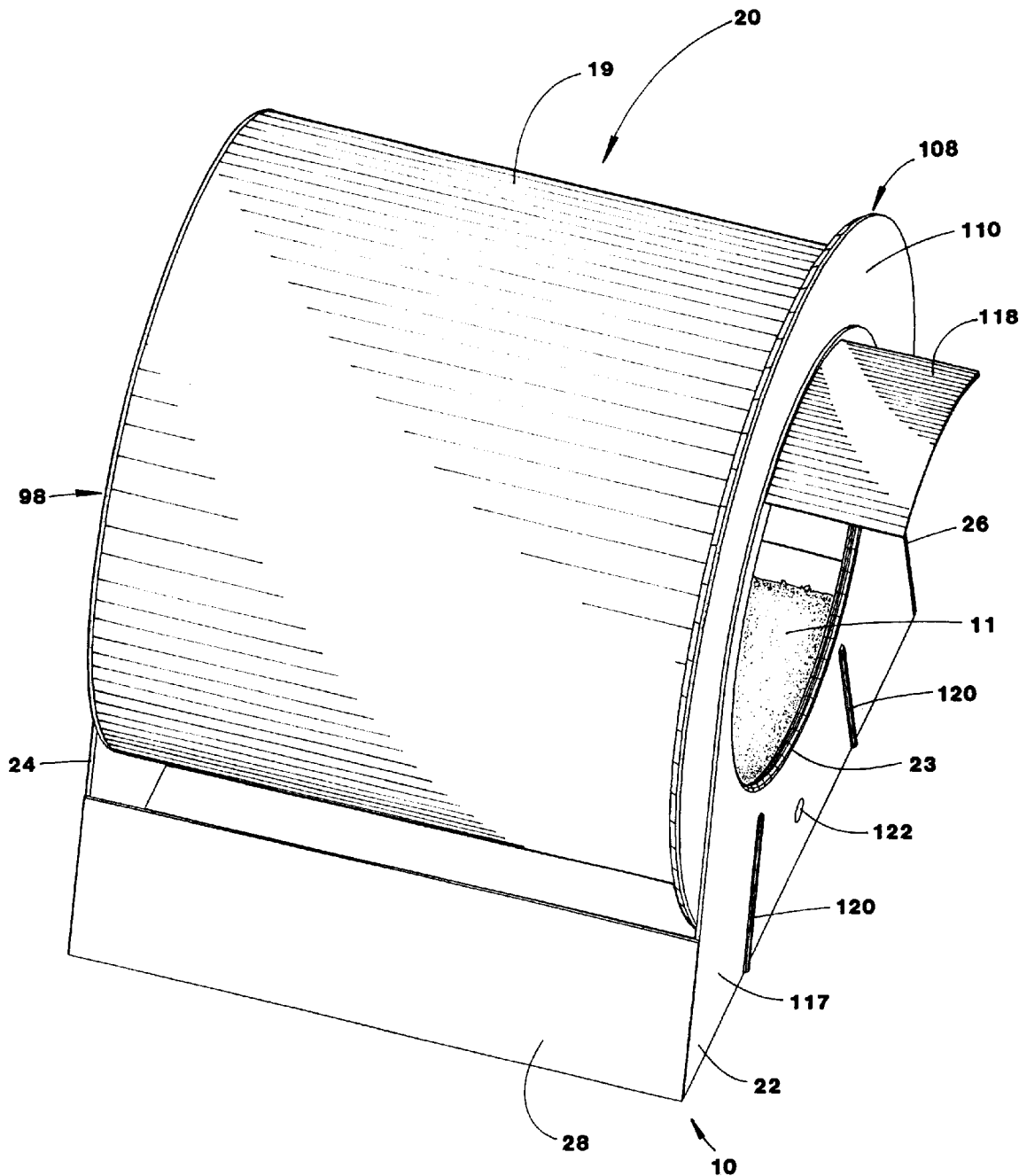
FIG. 19 is a front perspective view of one embodiment of the invention without a face plate or a receptacle.

FIG. 1 is a front perspective of the device 10 in the stationary mode having the major components of a rotatable chamber 20, a support base 21, a face plate 30 and a receptacle 32. The chamber 20 is rotatively mounted onto the support base 21 with the axis of rotation being longitudinal with respect to the chamber 20. The chamber 20 and the support base 21 are now described concurrently with reference to FIG. 3. The chamber 20 holds the mixture of soiled litter and animal waste 12 and clean litter 11 at a given fill level and includes a front assembly 108, a rear assembly 98 and a surface segment 19. The surface segment 19 is fitted to the front assembly 108 and the rear assembly 98 to form the cylindrical shaped chamber 20. The support base 21 includes a front support 22, a rear support 24, a first side support 26 and a second side support 28. The first side support 26 is attached to the side of the front support 22 and to the side of the rear support 24. The second side support 28 is attached to the opposite side of the front support 22 and to the opposite side of the rear support 24. The front assembly 108 is rotatively attached to the front support 22. The rear assembly 98 is rotatively attached to the rear support 24. As shown in FIG. 19, the device 10 has an opening 23 in the front support 22 and the front assembly 108 used for entry into the chamber 20 by the animal, for exit from the chamber 20 by the animal and for removal of the separated soiled litter and animal waste 12 from the interior of the chamber 20.

Figure 20A:
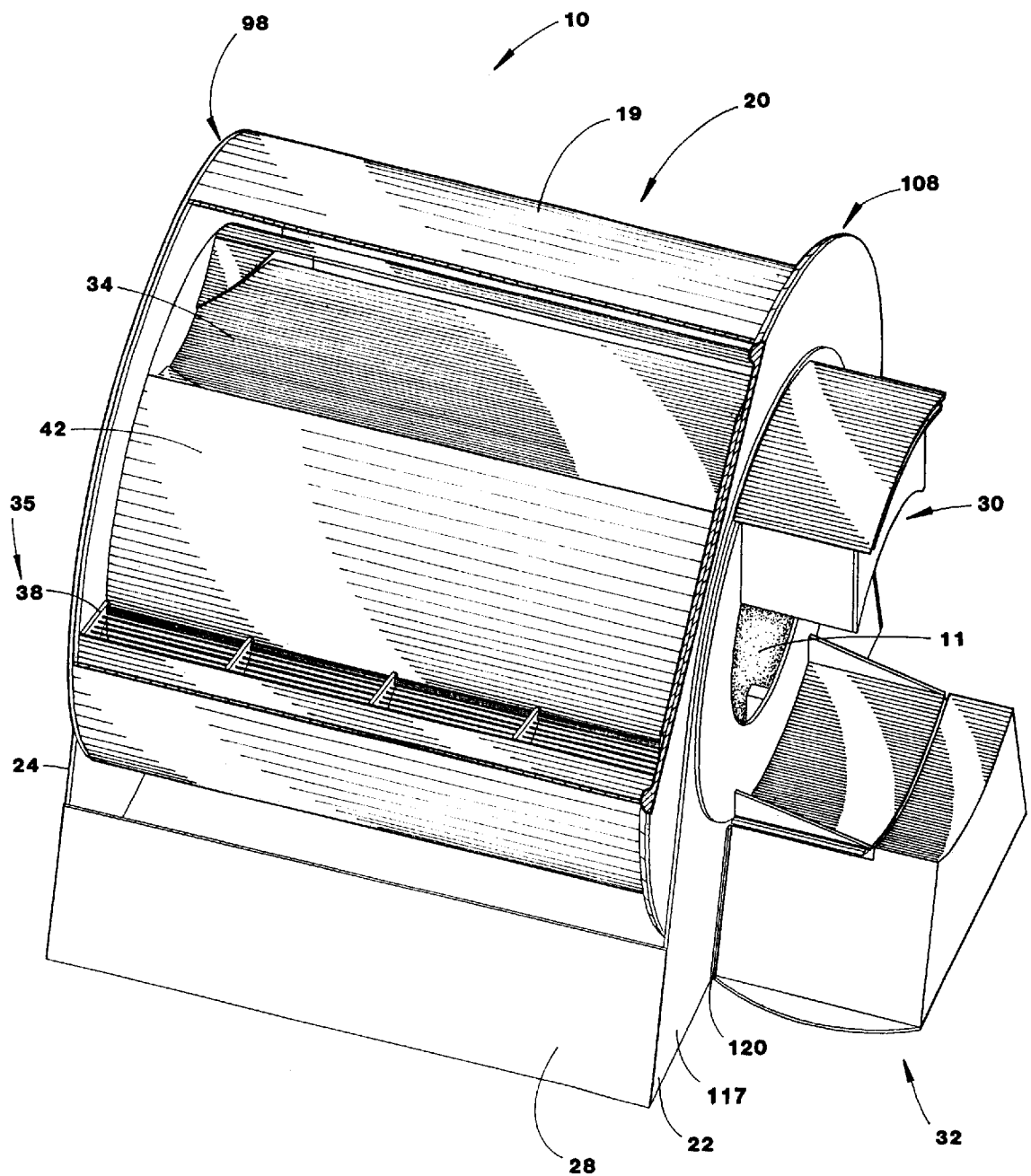
FIGS. 20A through 20G are sequential, cutaway, perspective views of one embodiment of the invention taken along the line 3—3 of FIG. 1 illustrating how the invention separates larger sized objects from a mixture of larger and smaller sized objects and automatically places these larger sized objects into the receptacle.
Figure 20B:
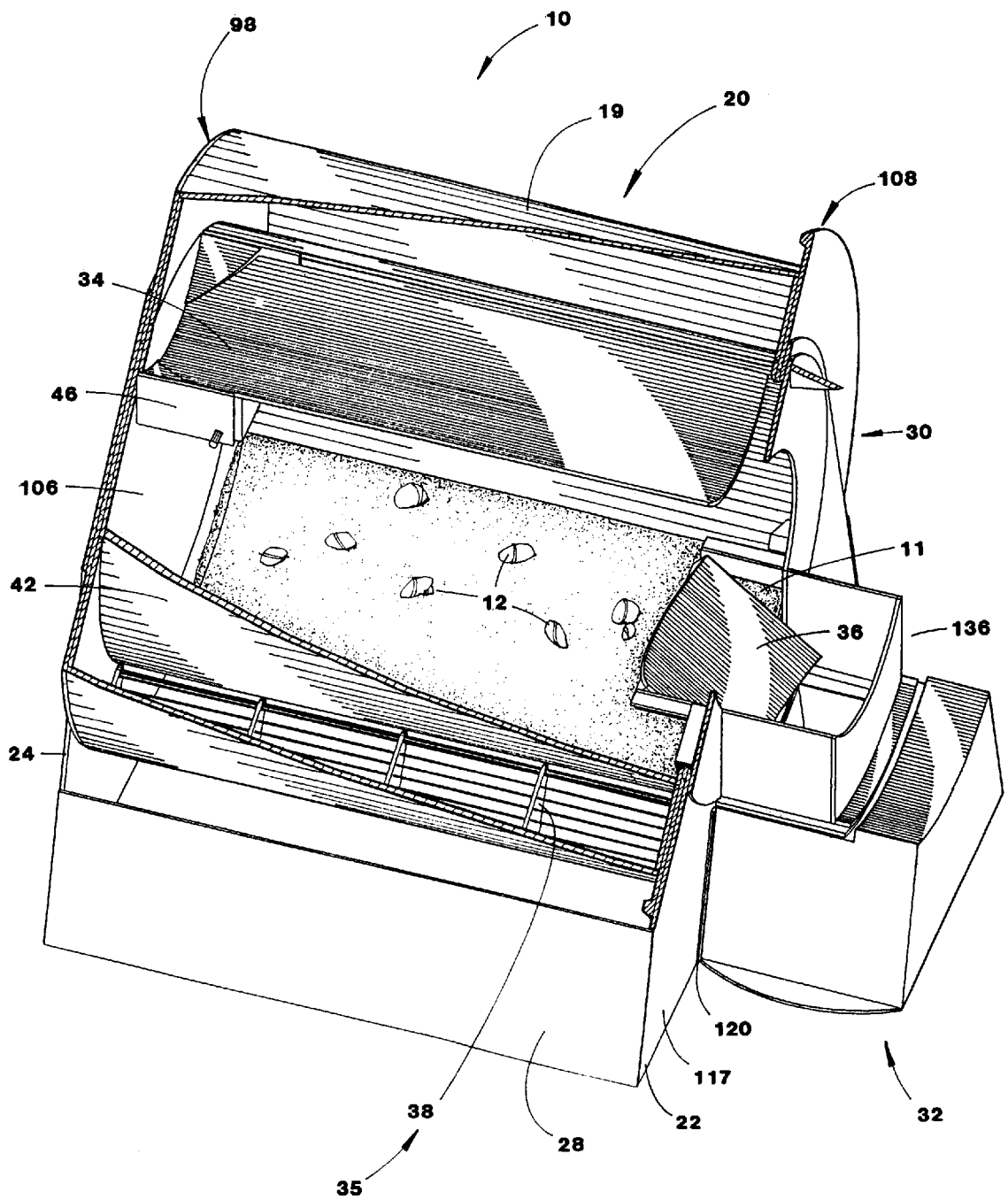
Figure 20C:
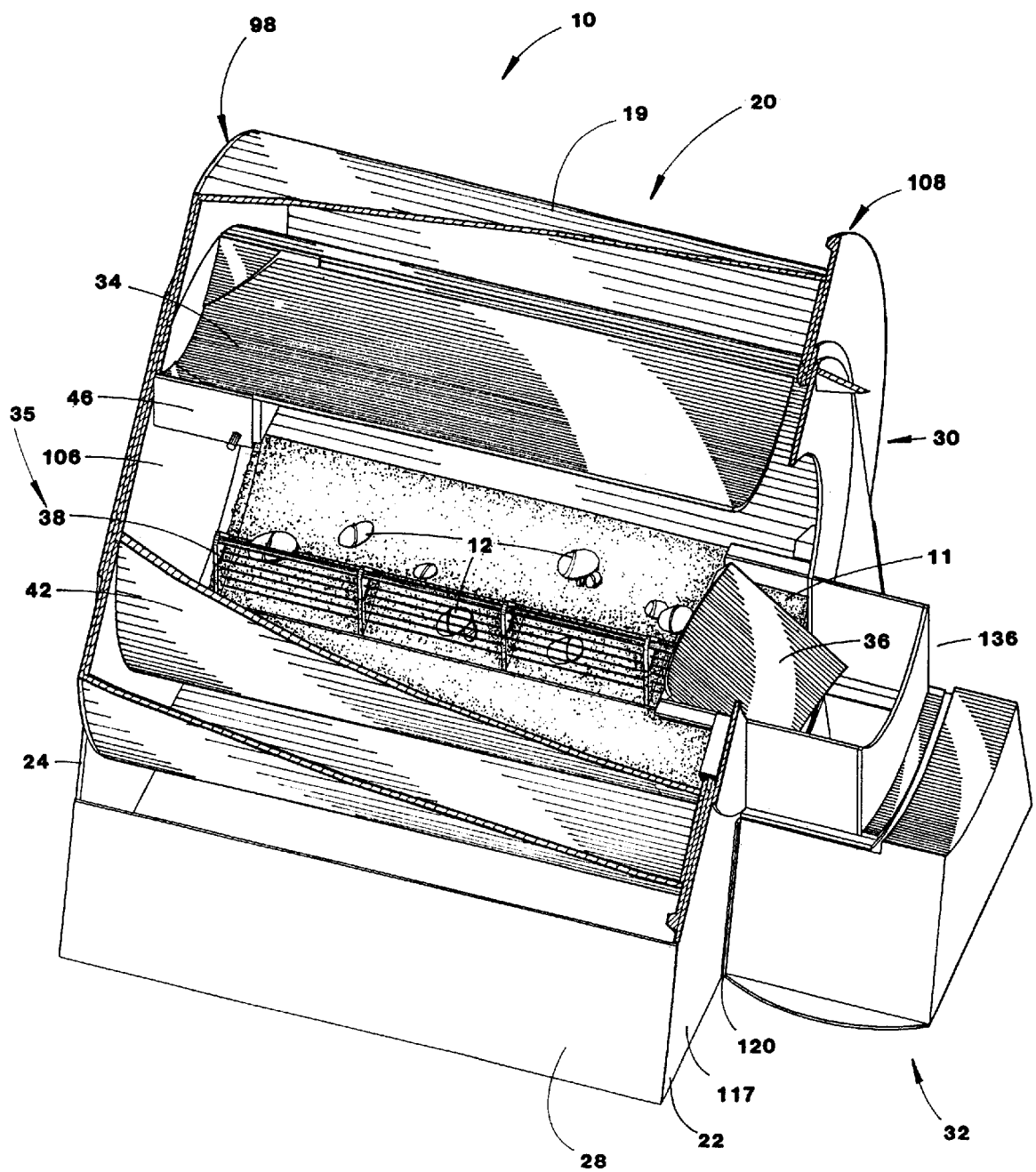
Figure 20D:
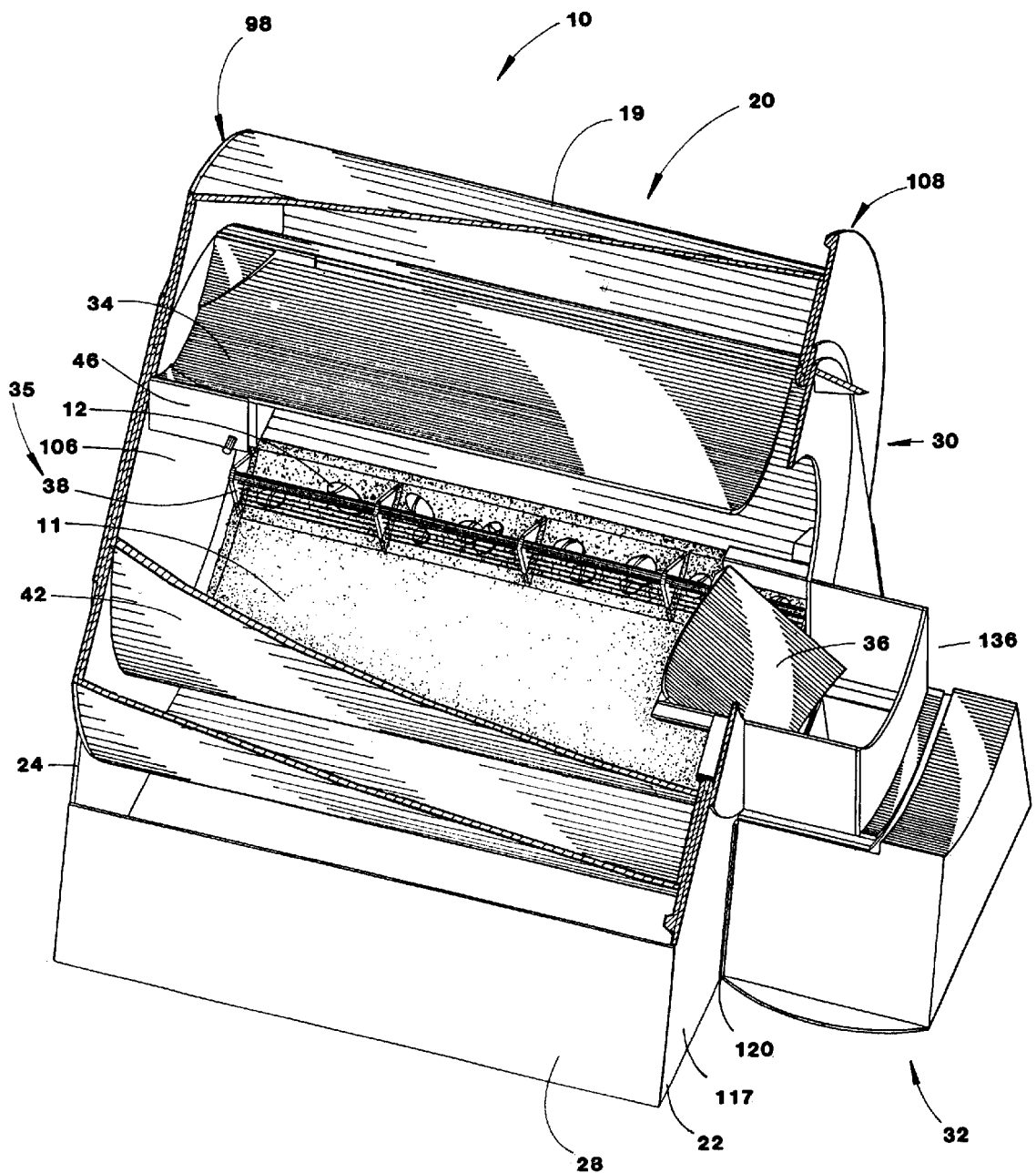
Figure 20E:
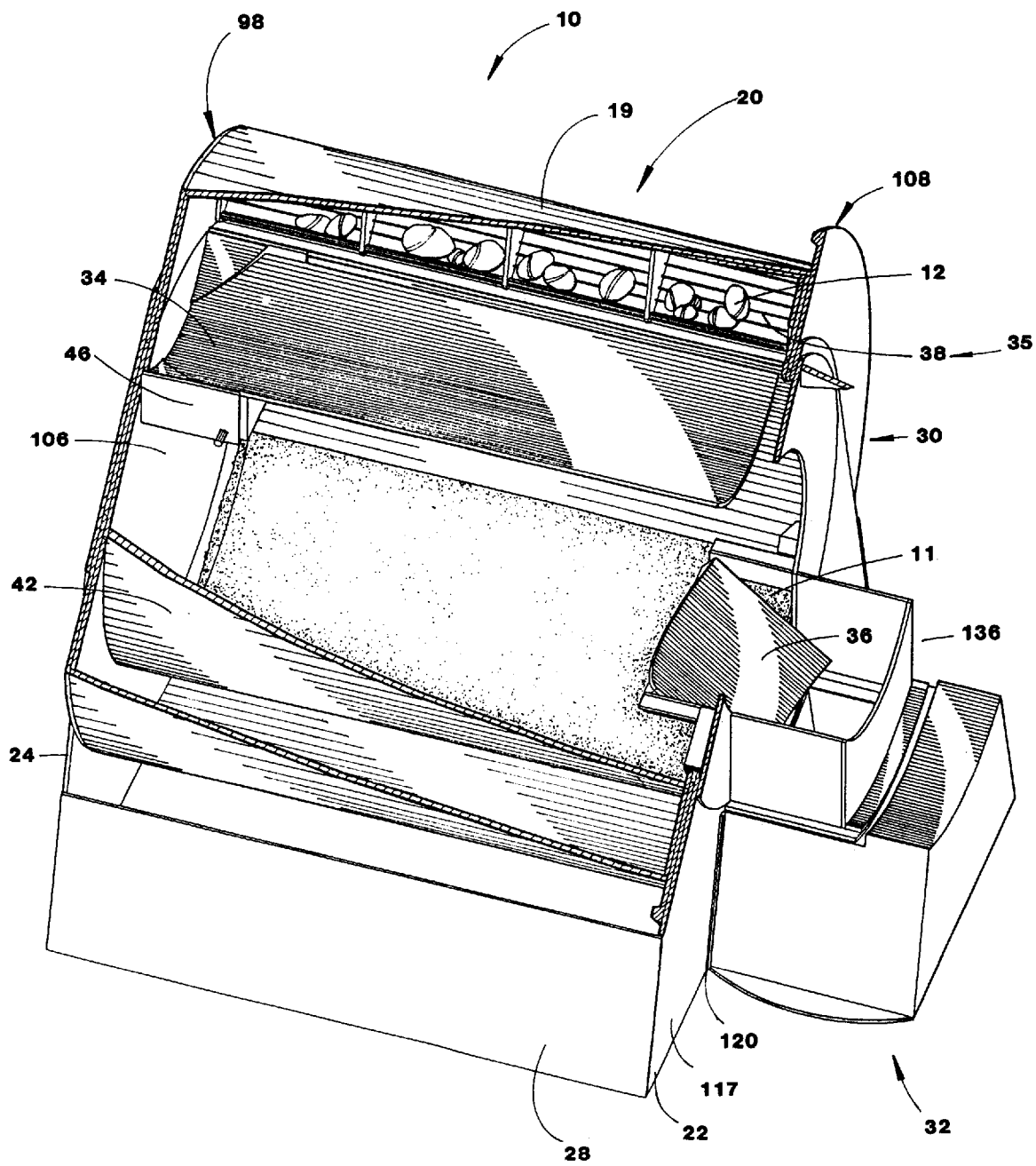

FIG. 1 also shows the face plate 30 and the receptacle 32 while the invention is in the stationary mode. The receptacle 32 is located outside the chamber 20, underneath the opening 23 and underneath the face plate 30. The face plate 30 is removably attached to the front support 22 and the front assembly 108 at the opening 23 and has a face plate opening 23f. The face plate opening 23f is also used for entry into the chamber 20 by the animal, for exit from the chamber 20 by the animal and for removal of the separated soiled litter and animal waste 12 from the interior of the chamber 20 when the face plate 30 is attached to the front support 22 and the front assembly 108. The face plate 30 can be moved, while attached to the front support 22 and the front assembly 108, from a first face plate position, shown in FIG. 20A, to a second face plate position, shown in FIG. 20B. The second face plate position of the face plate 30 is a point where the face plate 30 is moved one hundred and eighty degrees from the point where the first face plate position of the face plate 30 is located. The face plate 30 can be removed from the front support 22 and front assembly 108, as seen in FIG. 19, to provide a larger access to the interior of the chamber 20, through the opening 23, to add clean litter 11 to the chamber 20 or to clean out the chamber 20. As shown in FIG. 1 and FIG. 20A, the first face plate position of the face plate 30 cooperates with the receptacle 32 to create a step for the animal to use to enter and exit the chamber 20 and to seal the receptacle 32 to prevent odors from the separated soiled litter and animal waste 12 from filling the owner's living space. As shown in FIG. 20B, the second face plate position of the face plate 30 cooperates with the receptacle 32 to direct the separated soiled litter and animal waste 12 into the receptacle 32.

Figure 2:
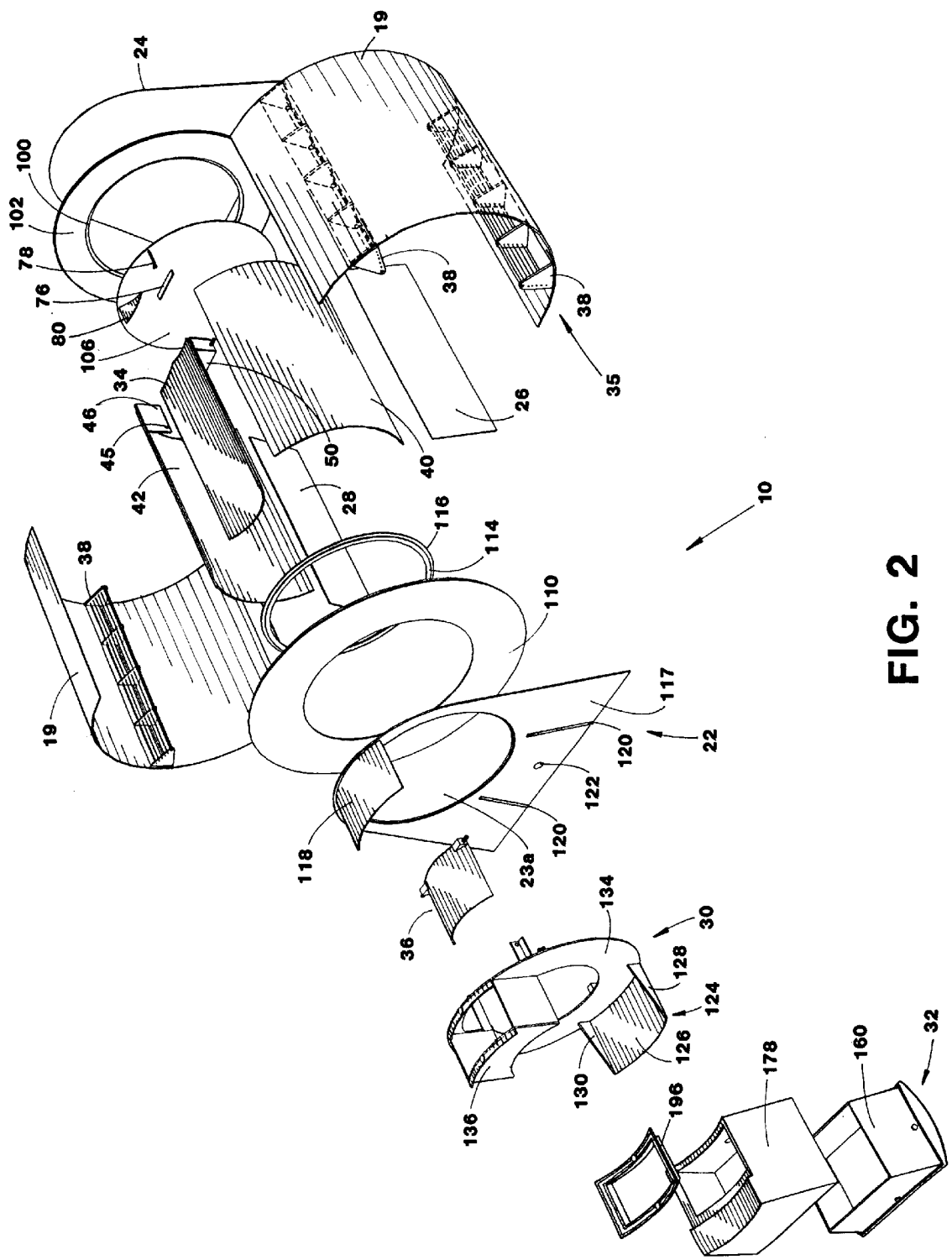
FIG. 2 is an exploded view of the invention shown in FIG. 1.
Figure 4:
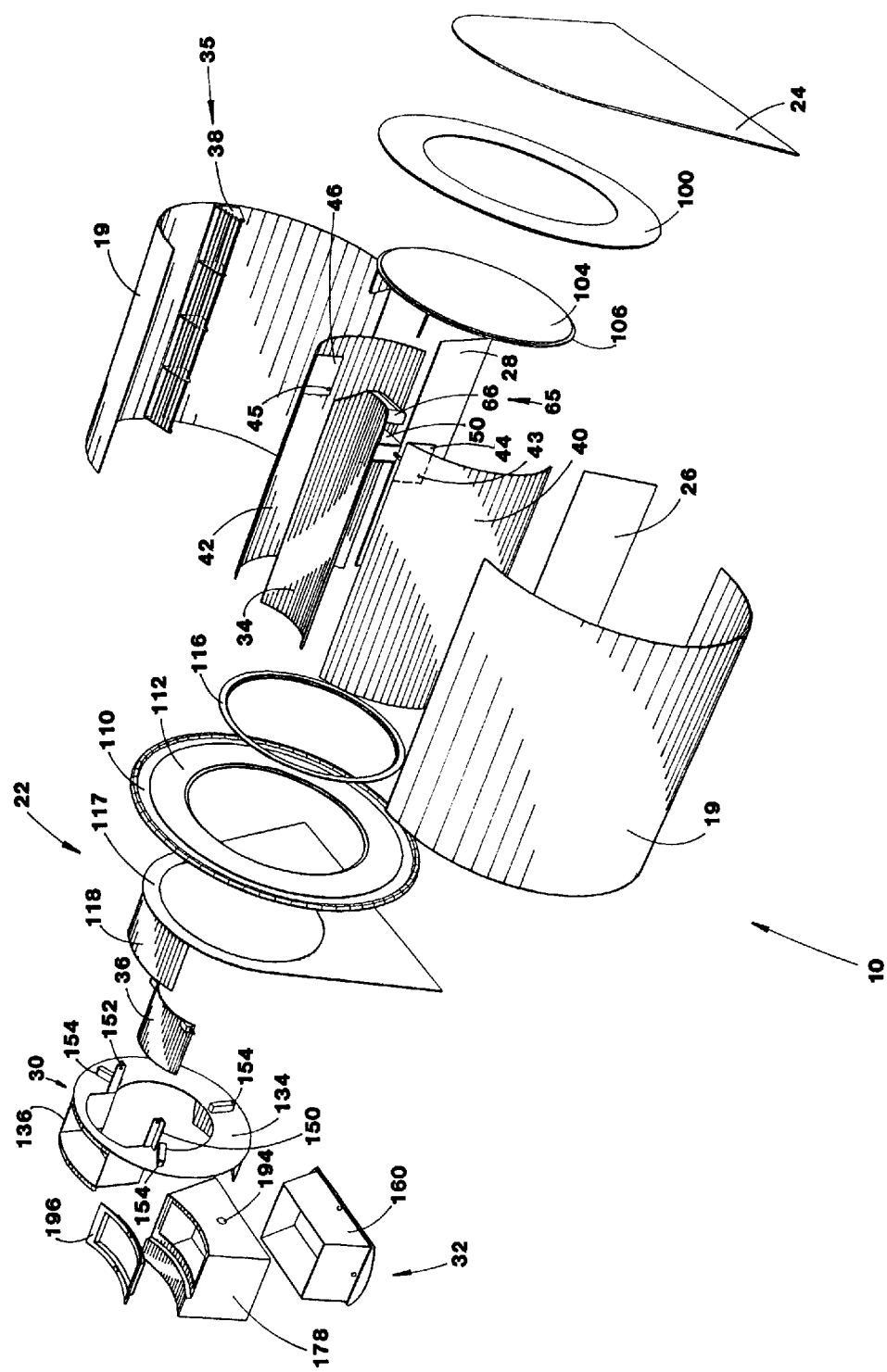
FIG. 4 is an exploded view of the invention shown in FIG. 3.
Figure 5:
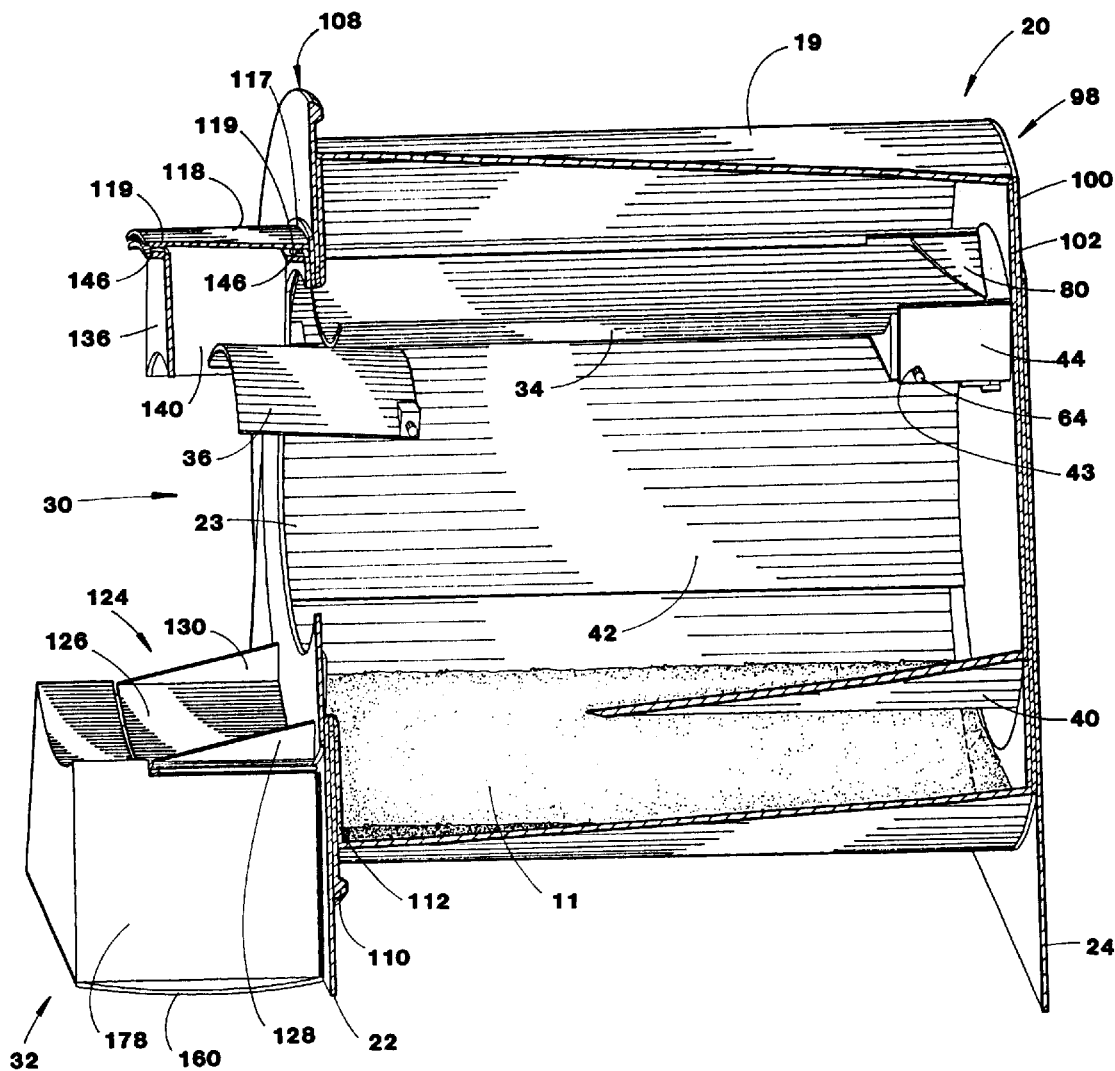
FIG. 5 is a partial perspective view of the invention taken along the line 1—1 of FIG. 1.

As shown in FIG. 2, FIG. 4 and FIG. 5, where the invention is in the stationary mode, the device 10 has additional major components, internal of the chamber 20, comprising a selectively restrictive separating means 35 and a pivoting ramp 34. One embodiment of the separating means 35, shown in FIG. 4 and FIG. 5, comprises a single separating element 38 that is rigidly attached to the interior surface of the surface segment 19 of the chamber 20. The rear of the ramp 34 is pivotally attached to the interior of the chamber 20. The ramp 34 has a ramp restoring means 65, such as a ramp counter balance element 66 or a spring or a combination of a pulley and a weight, attached to the bottom of the ramp 34 to keep the ramp 34 in the first position when the invention is in the stationary mode.

In the cleaning mode, as illustrated by FIGS. 20A through 20G, the owner moves the face plate 30 one hundred and eighty degrees from the first face plate position to the second face plate position, then grasps the front assembly 108 and rotates the chamber 20 in a counter-clockwise direction. As the chamber 20 rotates, the interior surface of the surface segment 19 of the chamber 20 cooperates with the separating means 35 to remove the soiled litter and animal waste 12 from the clean litter 11 and to retain the soiled litter and animal waste 12 on the separating means 35. When the separating means 35 is rotated over the ramp 34, gravity causes the separated soiled litter and animal waste 12 to move from the separating means 35 onto the ramp 34. When the weight of the soiled litter and animal waste 12 exceeds the weight of the ramp restoring means 65, the ramp 34 pivots, about an axis transverse to the axis of rotation of the chamber 20, from the first position to the second position. As the ramp 34 pivots to the second position, the separated soiled litter and animal waste 12 slide down the surface of the ramp 34, out of the chamber 20 and into the receptacle 32. When the soiled litter and animal waste 12 are no longer on the ramp 34, the ramp restoring means 65 causes the ramp 34 to pivot back to the first position and the ramp 34 is ready to receive additional soiled litter and animal waste 12 from the separating means 35.

To better illustrate the new and unique features of the present invention, the following will provide a detailed description of the different embodiments of the invention presented in FIGS. 1 through 32. Many parts of the invention are made from a sheet of material. These sheets of material include materials such as wood, plastic, fiberglass, coated cardboard, rubber, or other natural materials or other man-made materials. Also, many of these parts are attached to each other, the method of attachment may be accomplished by the use of glues, screws, nuts and bolts, heat bonding or other means of fastening. FIG. 1 is a front perspective view of the device 10, a self-cleaning litter box, in the stationary mode. The device 10 separates soiled litter and animal waste 12 from a mixture of soiled litter and animal waste 12 and clean litter 11 and deposits the separated soiled litter and animal waste 12 into a receptacle 32. This embodiment of the invention features the rotatable chamber 20 supported by the support base 21 with the face plate 30 and the receptacle 32.

Figure 16:
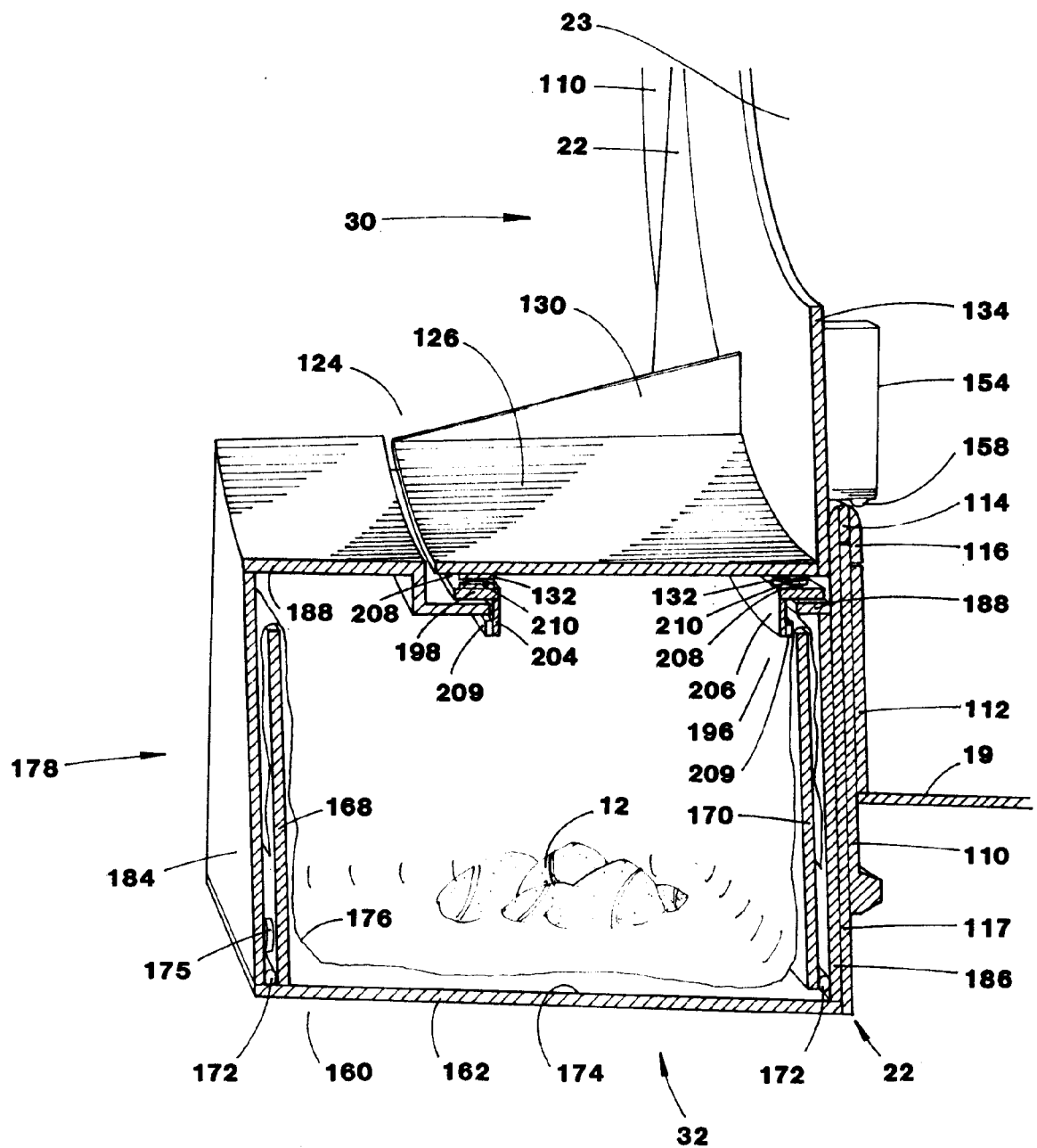
FIG. 16 is partial cutaway perspective view of one embodiment of the receptacle and face plate taken along the line 2—2 of FIG. 1, with the face plate in the first face plate position.
Figure 17:
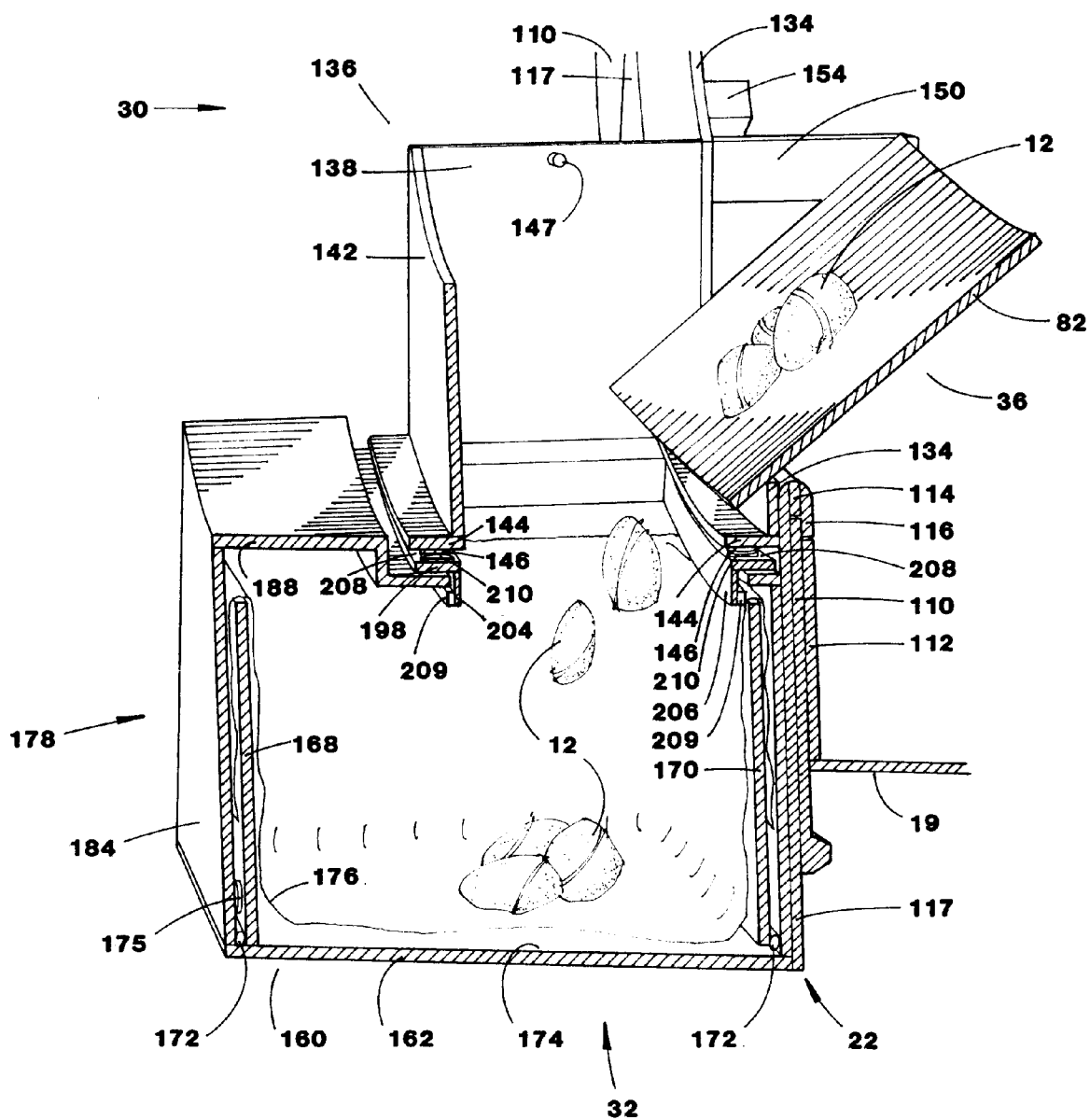
FIG. 17 is partial cutaway perspective view of one embodiment of the receptacle and face plate taken along the line 2—2 of FIG. 1, with the face plate in the second face plate position.

As seen in FIG. 1, the support base 21 includes the front support 22, the rear support 24, the first side support 26 and the second side support 28. FIG. 2 shows an exploded view of the invention shown in FIG. 1. FIG. 5 shows a sectional view of the invention shown in FIG. 1. As shown in FIG. 2 and FIG. 5, the front support 22 has a front support frame 117, a cover 118, at least two cover alignment devices 119, a front support fastener 122 and at least two front support alignment devices 120. As shown in FIG. 2, the front support frame 117 is made from a thin sheet of material that is substantially parabolic in shape where the parallel plane creates the bottom of the front support frame 117 and the curved area creates the top of the front support frame 117 with a front support opening 23a. The front support opening 23a is a circular opening in the front support frame 117 and is substantially coincident with the axis of rotation of the chamber 20 to allow for entry into the chamber 20, for exit from the chamber 20 and for the removal of the soiled litter and animal waste 12 from the chamber 20. As shown in FIG. 16 and FIG. 17, the exterior edge of the front support frame 117 at the front support opening 23a is rounded to provide a smooth surface to facilitate the connection of the face plate 30 to the front support frame 117 and the front assembly 108, and the removal of the face plate 30 from the front support frame 117 and the front assembly 108. The cover 118 is made from a thin sheet of material that is substantially rectangular in shape and is curved to allow the cover 118 to match the curvature of the top of the front support frame 117. One edge of the cover 118 is rigidly attached onto the exterior surface of the front support frame 117 over the front support opening 23a to cooperate with the face plate 30 when the face plate 30 is in the first face plate position. The cover 118 has at least two cover alignment devices 119 attached to the bottom surface of the cover 118. The preferred cover alignment devices 119 are magnets that align the cover 118 with the face plate 30. At least one front support fastener 122 is attached to the exterior surface of the front support frame 117 underneath the front support opening 23a. The preferred front support fastener 122 is either a magnet or the first part of a hook and loop fastener. The front support fastener 122 removably attaches the receptacle 32 to the front support 22. At least two front support alignment devices 120 are attached to the exterior surface of the front support frame 117 underneath the front support opening 23a. The preferred front support alignment devices 120 are made from a thin sheet of material that is substantially semi-cylindrical in shape. The front support alignment devices 120 align the receptacle 32 to the front support opening 23a so that the receptacle 32 is in the correct position during both the stationary mode and the cleaning mode.

Figure 3:
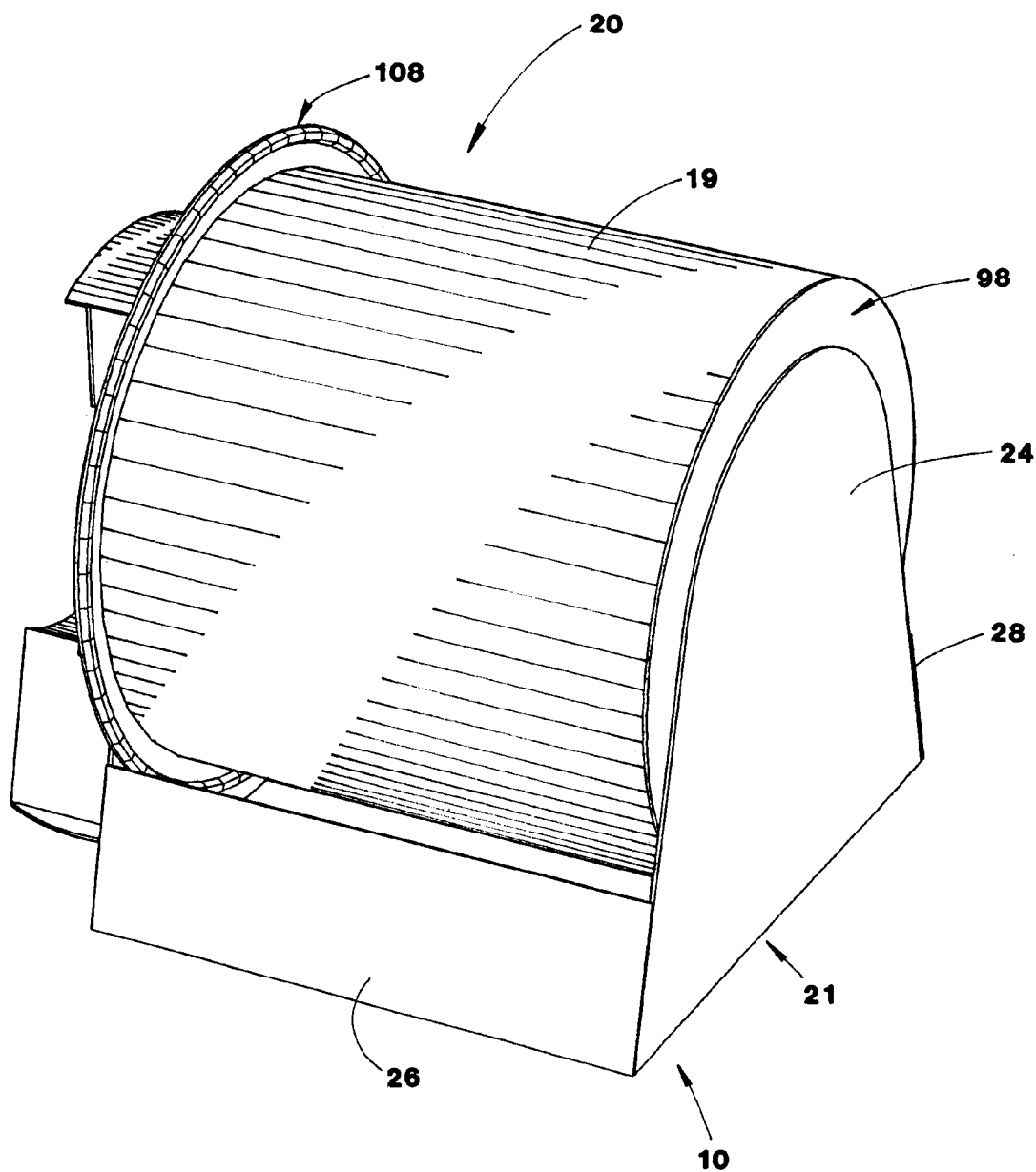
FIG. 3 is a rear perspective view of the invention shown in FIG. 1.

As shown in FIG. 4, the rear support 24 is made from a thin sheet of material that is substantially parabolic in shape where the parallel plane creates the bottom of the rear support 24 and the curved area creates the top of the rear support 24. As shown in FIG. 1, FIG. 2 and FIG. 3, the first side support 26 is made from a thin sheet of material that is substantially rectangular in shape. The first side support 26 is attached to the side of the front support 22 and to the side of the rear support 24. As shown in FIG. 1, FIG. 2 and FIG. 4, the second side support 28 is made from a thin sheet of material that is substantially rectangular in shape. The second side support 28 is attached to the opposite side of the front support 22 and to the opposite side of the rear support 24.

Figure 6:
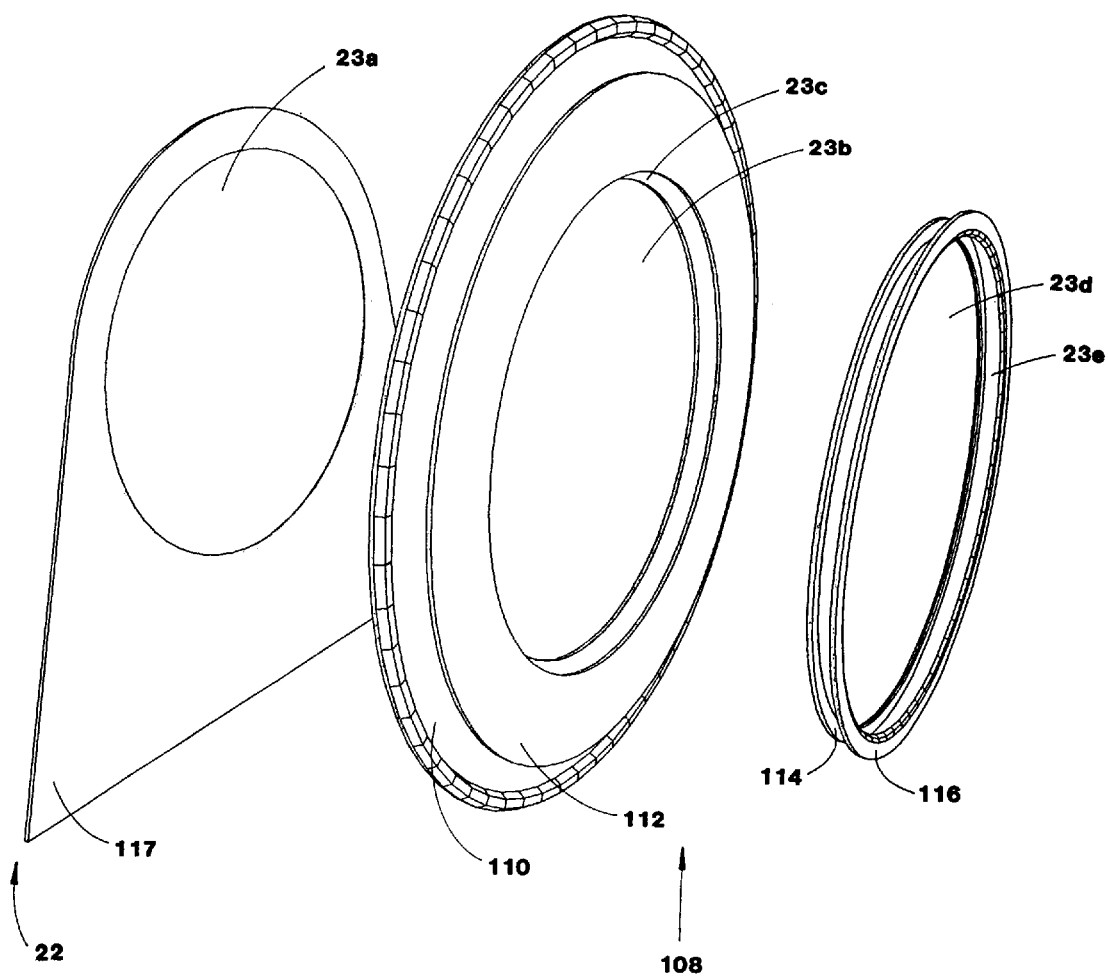
FIG. 6 is a perspective view showing one embodiment of the front support and the front assembly.

FIG. 1 and FIG. 3 show the rotatable chamber 20 comprising the surface segment 19, the front assembly 108 and the rear assembly 98 that forms a cylindrical shape to hold a given level of clean litter 11 and soiled litter and animal waste 12. As shown in FIG. 2 and FIG. 4, the surface segment 19 is made from a thin sheet of material that is cylindrical in shape to form the outer surface of the chamber 20. FIG. 6 shows the front assembly 108 having a front bearing 110, a front surface segment support 112, a front bearing support 114 and a front bearing retainer 116. The front bearing 110 is made from a sheet of material that is disc shaped with a raised area along the outer edge of the interior surface of the front bearing 110 to provide a grip for the owner to use to rotate the chamber 20. The front bearing 110 has a front bearing opening 23b. The front bearing opening 23b is a circular opening in the front bearing 110 and is substantially coincident with the axis of rotation of the chamber 20. The front surface segment support 112 is made from a sheet of material that is disc shaped. The front surface segment support 112 is attached to the interior surface of the front bearing 110. The end of the surface segment 19 is attached to the edge of the front surface segment support 112 to connect the end of the surface segment 19 to the front bearing 110 to allow the chamber 20 to rotatively move on the front bearing 110. The front surface segment support 112 has a front surface segment support opening 23c. The front surface segment support opening 23c is a circular opening in the front surface segment support 112 and is substantially coincident with the axis of rotation of the chamber 20. The front bearing support 114 is made from a sheet of material that is disc shaped having a front bearing support opening 23d. The front bearing support 114 has an outside diameter that is slightly less than the diameter of the front bearing opening 23b to allow the front bearing support 114 to fit inside the front bearing opening 23b of the front bearing 110. The front bearing support 114 is attached to the interior surface of the front support frame 117 to support the front bearing 110, while the front bearing 110 rotates. The front bearing support opening 23d is circular in shape and is substantially coincident with the axis of rotation of the chamber 20 to allow for entry into and exit from the chamber 20 and for the removal of the soiled litter and animal waste 12 from the chamber 20. In one embodiment, as shown in FIG. 16 and FIG. 17, the exterior and interior edges of the front bearing support 114, at the front bearing support opening 23d, are rounded to provide a smooth surface to facilitate the connection of the face plate 30 to the front support 22 and the front assembly 108, and the removal of the face plate 30 from the front support 22 and the front assembly 108. The front bearing retainer 116 is made from a sheet of material that is disc shaped having a front bearing retainer opening 23e. The front bearing retainer 116 has an outside diameter that is slightly less than the diameter of the front surface segment support opening 23c to allow the front bearing retainer 116 to fit inside the front surface segment support opening 23c of the front surface segment support 112. The front bearing retainer 116 is attached to the interior surface of the front bearing support 114 to keep the front bearing 110 aligned with the front bearing support 114 during rotation of the chamber 20. The front bearing retainer opening 23e is a circular opening in the front bearing retainer 116 and is substantially coincident with the axis of rotation of the chamber 20. As shown in FIG. 16 and FIG. 17, the interior edge of the front bearing retainer 116, at the front bearing retainer opening 23e, is rounded to provide a smooth surface to facilitate the connection of the face plate 30 to the front support 22 and the front assembly 108, and the removal of the face plate 30 from the front support 22 and the front assembly 108.

Figure 7:
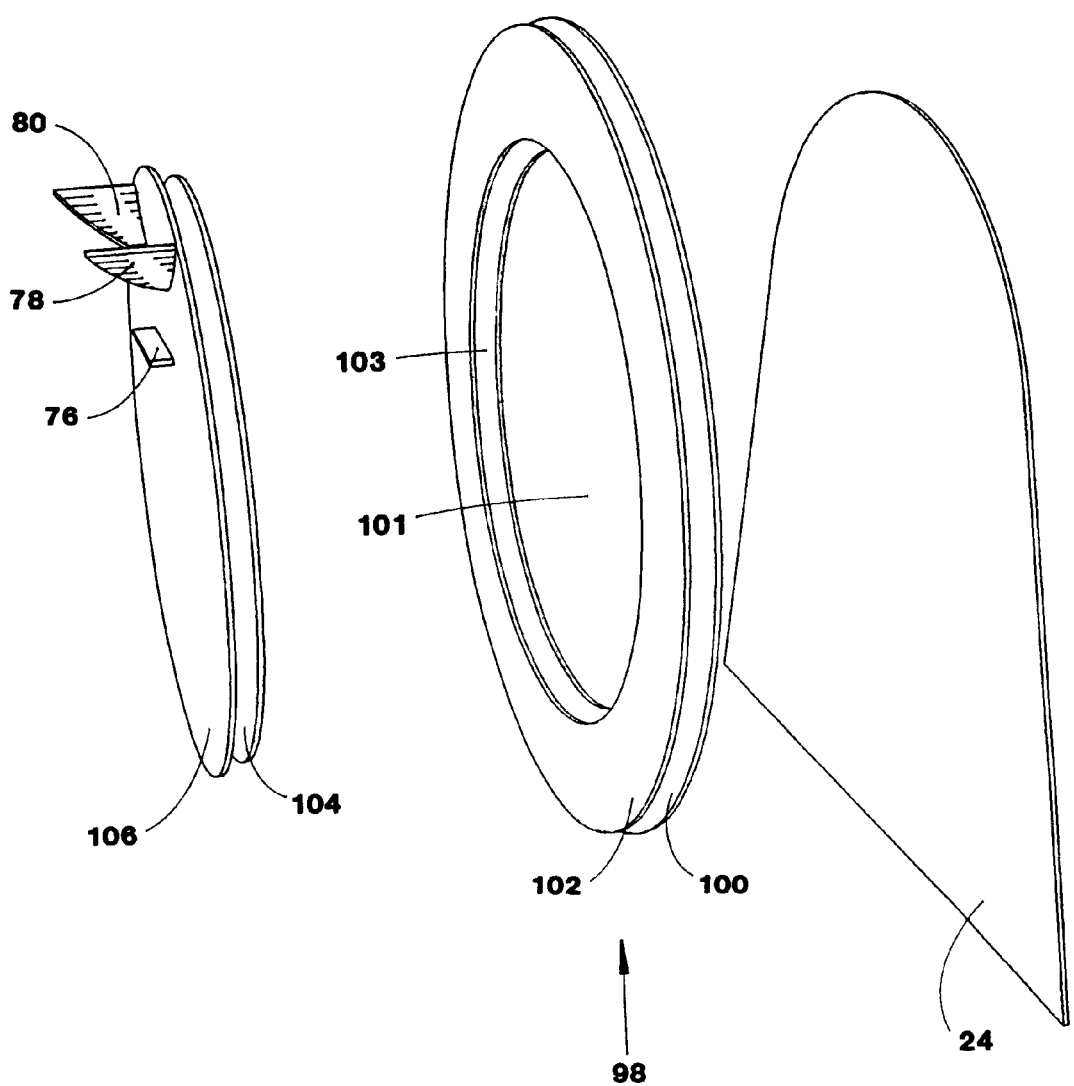
FIG. 7 is a perspective view showing one embodiment of the rear support and the rear assembly.

FIG. 7 shows the rear assembly 98 having a rear bearing 100, a rear surface segment support 102, a rear bearing support 104 and a rear bearing retainer 106. The rear bearing 100 is made from a sheet of material that is disc shaped having a rear bearing opening 101. The rear bearing opening 101 is a circular opening in the rear bearing 100 and is substantially coincident with the axis of rotation of the chamber 20. The rear surface segment support 102 is made from a sheet of material that is disc shaped having a rear surface segment support opening 103. The rear surface segment support 102 is attached to the interior surface of the rear bearing 100. The opposite end of the surface segment 19 is attached to the edge of the rear surface segment support 102 to connect the opposite end of the surface segment 19 to the rear bearing 100 to allow the chamber 20 to rotatively move on the rear bearing 100. The rear surface segment support opening 103 is a circular opening in the rear surface segment support 102 and is substantially coincident with the axis of rotation of the chamber 20. The rear bearing support 104 is made from a sheet of material that is disc shaped. The rear bearing support 104 has an outside diameter that is slightly less than the diameter of the rear bearing opening 101 to allow the rear bearing support 104 to fit inside the rear bearing opening 101 of the rear bearing 100. The rear bearing support 104 is attached to the interior surface of the rear support 24 to support the rear bearing 100, while the rear bearing 100 rotates. The rear bearing retainer 106 is made from a sheet of material that is disc shaped. The rear bearing retainer 106 has an outside diameter that is slightly less than the diameter of the rear surface segment support opening 103 to allow the rear bearing retainer 106 to fit inside the rear surface segment support opening 103 of the rear surface segment support 102. The rear bearing retainer 106 is attached to the interior surface of the rear bearing support 104 to keep the rear bearing 100 aligned with the rear bearing support 104 during rotation of the chamber 20.

In the above embodiment of the present invention, there is no opening in the rear support 24 and the rear assembly 98 in order to more effectively contain the litter when the animal kicks the clean litter 11 over the soiled litter and animal waste 12. In an alternative embodiment of the invention, shown in FIG. 32, the rear assembly 98 and the rear support 24 contain an opening 23 to allow for an alternative entry into the chamber 20, for an alternative exit from the chamber 20 or for an alternative opening for adding to the mixture of larger and smaller sized objects in the chamber 20. In this embodiment, the rear assembly 98 would be built similar to the front assembly 108. In yet another embodiment of the invention, plastic curtains, not shown in drawings, are placed over the opening 23 to allow the animal to enter and exit the chamber 20 while preventing clean litter 11 and soiled litter and animal waste 12 from being kicked out of the chamber 20 through the opening 23.

Figure 9:
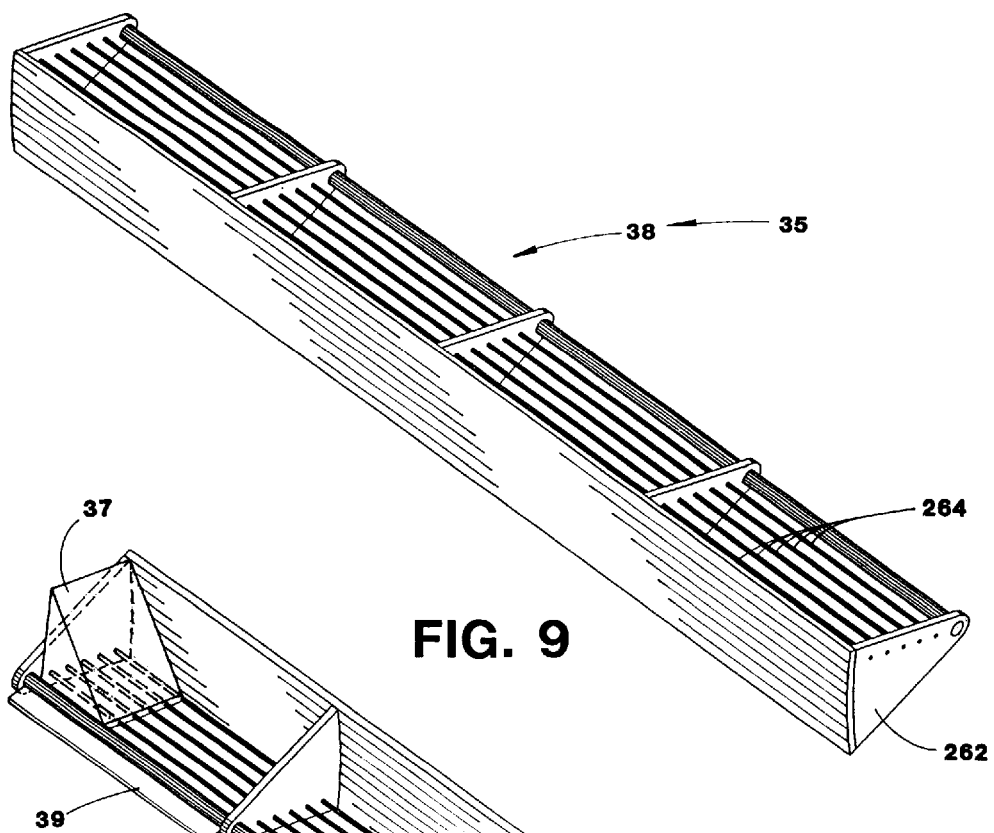
FIG. 9 is a rear perspective view showing one embodiment of the separating means.
Figure 10:
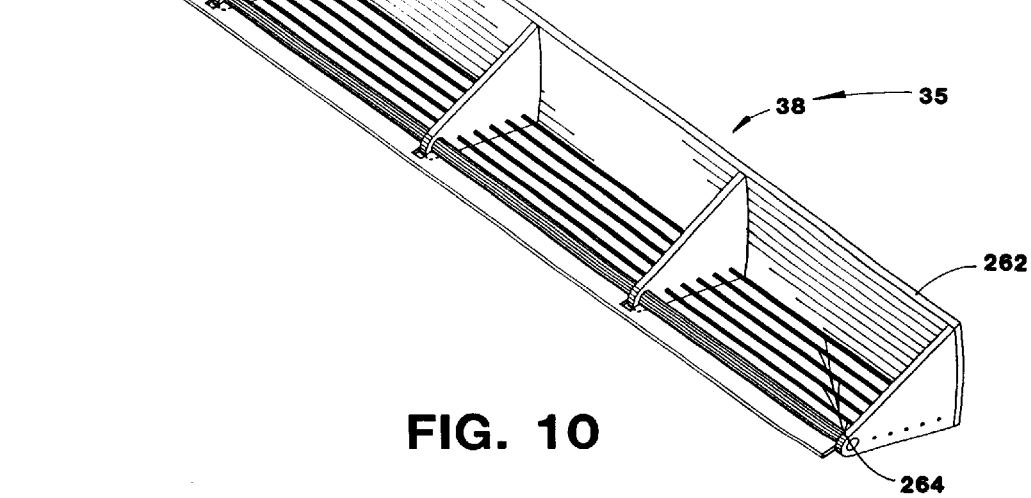
FIG. 10 is a front perspective view of an alternate embodiment of the separating means.

As shown in FIG. 4, the preferred embodiment of the selectively restrictive separating means 35 comprises a single separating element 38 that is rigidly attached to the interior surface of the surface segment 19 of the chamber 20. As seen in FIG. 9, the separating element 38 is best described as a grate, having a framework 262 with elements 264, such as wires, rods, or bars, across the framework 262. The spacing of the elements 264 in the framework 262 create apertures of a size sufficient to allow smaller sized objects to pass through, but to restrain and separate the larger sized objects. For example, when the device 10 is used as a litter box, the apertures, created by the spacing of the elements 264 in the framework 262, are of a size sufficient to allow the clean litter 11 to pass through, but to restrain and separate the soiled litter and animal waste 12. The elements 264 in the separating element 38 shown in FIG. 4 and FIG. 9 is inclined with respect to a line projected from the center of the axis of rotation of the chamber 20 to the center of the separating element 38. The incline of the elements 264 further assists retention of the soiled litter and animal waste 12 on the separating element 38 during rotation of the chamber 20. In an alternative embodiment, shown in FIG. 2, the separating means 35 comprises two or more separating elements 38 rigidly attached to the interior surface of the surface segment 19 of the chamber 20. Another alternative embodiment of the separating means 35 is shown in FIG. 10 where a separating element filler device 37 is rigidly attached to the framework 262 of the separating element 38 at the end of the separating element 38 near the rear assembly 98. The separating element filler device 37 is wedge shaped and is made from materials such as wood, plastic, fiberglass, coated cardboard, rubber, or other natural materials or other man-made materials. The separating element filler device 37 is used to move the separated soiled litter and animal waste 12 away from the rear of the separating element 38 and toward the center of the separating element 38.

FIG. 2 and FIG. 4 show the invention with a first baffle 40 and a second baffle 42. While the above described separating means 35 will separate the soiled litter and animal waste 12 from the mixture of clean litter 11 and soiled litter and animal waste 12 without these two baffles, occasionally some of the separated soiled litter and animal waste 12 will fall back into the clean litter 11 as the chamber 20 is rotated. Therefore, the invention works best when the above described separating means 35 is used in combination with the first baffle 40, as the first baffle 40 prevents the separated soiled litter and animal waste 12 from falling back into the clean litter 11 when the chamber 20 is rotated. The second baffle 42 may be used to provide additional structural support for the chamber 20.

The first baffle 40 is made from a thin sheet of material that is substantially rectangular in shape with a curvature to match the curvature of the surface segment 19. The end of the first baffle 40 is rigidly attached to the interior surface of the front bearing retainer 116 in a substantially vertical position. The opposite end of the first baffle 40 is rigidly attached to the interior surface of the rear bearing retainer 106 in a substantially vertical position. The second baffle 42 is made from a thin sheet of material that is substantially rectangular in shape with a curvature to match the curvature of the surface segment 19. The end of the second baffle 42 is rigidly attached to the interior surface of the front bearing retainer 116 in a substantially vertical position. The opposite end of the second baffle 42 is rigidly attached to the interior surface of the rear bearing retainer 106 in a substantially vertical position. The first baffle 40 is substantially parallel to the second baffle 42, except that the bottom of the first baffle 40 and the bottom of the second baffle 42 are farther apart to provide more space for the animal at the bottom of the chamber 20. The interior surface of the surface segment 19 of the chamber 20 and the first baffle 40 cooperate with the separating means 35 to remove the soiled litter and animal waste 12 from the clean litter 11 and to retain the soiled litter and animal waste 12 on the separating means 35 as the chamber 20 is rotated.

FIG. 10 shows another alternative embodiment of the separating means 35 that comprises a wiper 39 attached to the edge of the framework 262 of the separating element 38, opposite the part of the framework 262 attached to the interior surface of the surface segment 19, to extend the separating element 38, and to allow the wiper 39 to come in contact with the exterior surface of the first baffle 40 and the exterior surface of the second baffle 42 when the chamber 20 is rotated. The wiper 39 is made from a thin piece of flexible material, such as rubber or plastic. The wiper 39 extends the separating element 38 to prevent any soiled litter or animal waste 12 from going over the top of the separating element 38 as it moves through the mixture of clean litter 11 and soiled litter and animal waste 12. The wiper 39 also loosens any soiled litter or animal waste 12 that may have adhered to the exterior surface of the first baffle 40 and the exterior surface of the second baffle 42.

Figure 11:
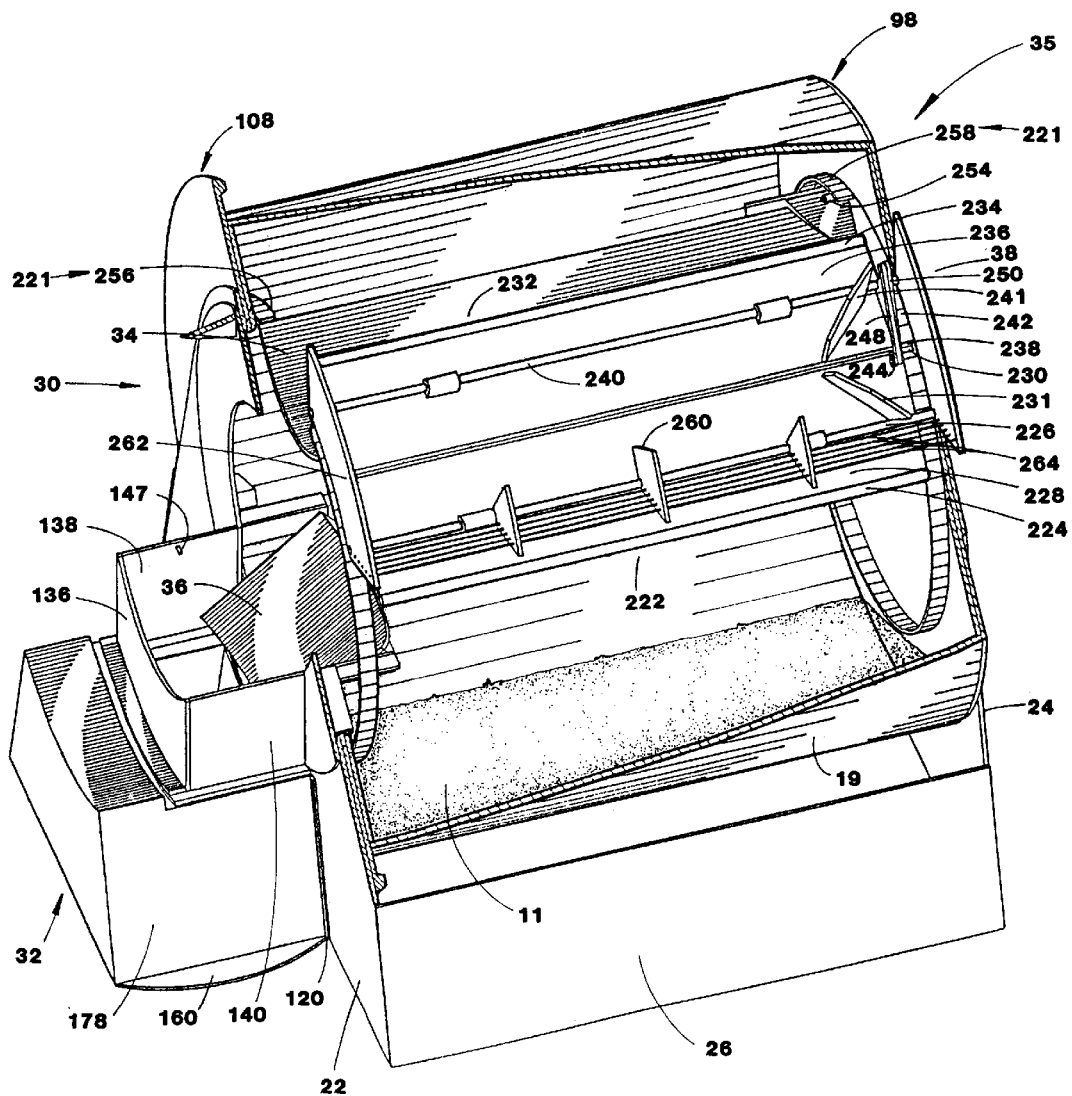
FIG. 11 is a cutaway perspective view of an embodiment of the invention with another alternative embodiment of the separating means taken along the line 1—1 of FIG. 1.
Figure 12:
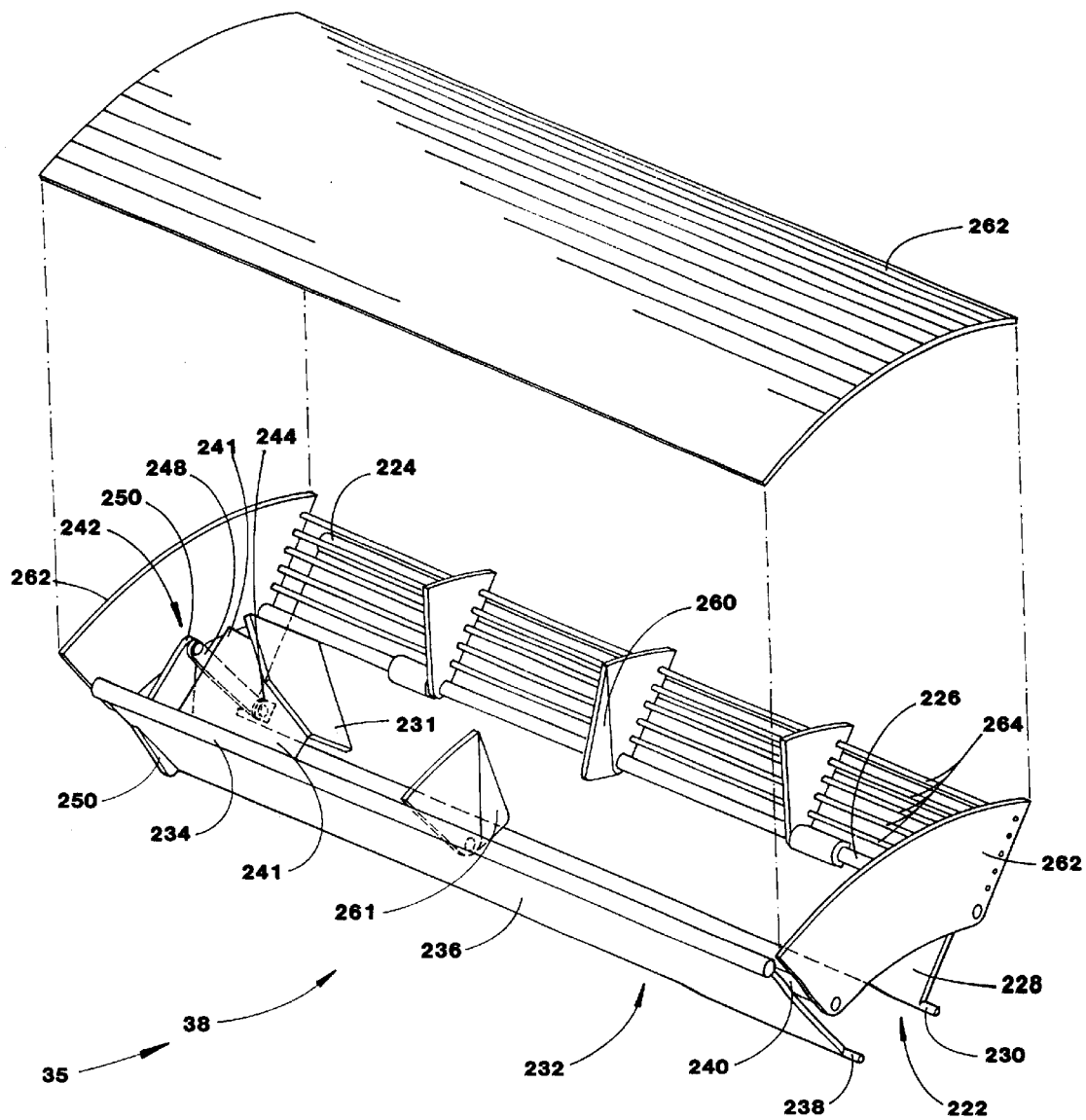
FIG. 12 is a cutaway perspective view of the separating means shown in FIG. 11 in the open position.

FIG. 11 is a cutaway view showing an alternative embodiment of the invention with an another alternative embodiment of the separating means 35 that eliminates the need for the first baffle 40 and the second baffle 42. Internal to the chamber 20 is a means for guiding the separating means 221. As shown in FIG. 11, one such means for guiding the separating means 221 is a first flap guide 256, a second flap guide 258 and a tripping element 254. The first flap guide 256 is made from a thin sheet of material that is C-shaped. The edge of the first flap guide 256 is rigidly attached to the internal surface of the front bearing retainer 116 with the gap in the C-shaped first flap guide 256 at the top of the chamber 20. The second flap guide 258 is made from a thin sheet of material that is C-shaped. The edge of the second flap guide 258 is rigidly attached to the internal surface of the rear bearing retainer 106 with the gap in the C-shaped second flap guide 258 at the top of the chamber 20. The tripping element 254 is made from a short piece of cylindrical shaped material, such as a dowel rod, where one end of the tripping element 254 is rigidly attached to the rear bearing retainer 106 underneath the second flap guide 258 at the top of the chamber 20 where the gap in the second flap guide 258 ends. As seen in FIG. 12, this alternative embodiment of the separating means 35 comprises a separating element 38; where the separating element 38 comprises a framework 262 with elements 264, such as wires, rods, or bars, across the framework 262; a first flap element 222, a flap alignment device 242 and a first stop 260. The elements 264 in the separating element 38 of this embodiment are substantially perpendicular to the internal surface of the surface segment 19, unlike the inclined position of the embodiment of the separating element 38 shown in FIG. 9. The first flap element 222 is rotatively attached to the framework 262 over the elements 264 at a point closest to the center of the chamber 20. The first flap element 222 is also rotatively attached to the flap alignment device 242, at one end of the top surface of the first flap element 222. The first stop 260 is attached to the framework 262 of the separating element 38 to cooperate with the first flap guide 256 and the second flap guide 258 to hold the first flap element 222 in the first flap element position, wherein the first flap element 222 is substantially horizontal, as the separating means 35 rotates with the chamber 20. The first stop 260 is made from a thin sheet of material and is substantially triangular in shape. When the separating means 35 is rotated through the lower half of the chamber 20, the first stop 260 interferes with the rotation of the first flap element 222 to maintain the first flap element 222 in the first flap element position. This allows the first flap element 222 to move over the top of the mixture of clean litter 11 and the soiled litter and animal waste 12, which forces all of the mixture of clean litter 11 and soiled litter and animal waste 12 through the apertures formed by the elements 264 of the separating element 38. The first flap element 222, the framework 262 and the elements 264 of the separating means 35 cooperate with the internal surface of the surface segment 19 to retain the separated soiled litter and animal waste 12 on the separating means 35 while the chamber 20 is being rotated. The first flap guide 256 and the second flap guide 258 hold the first flap element 222 in the first flap element position while the separating means 35 is rotated through the upper half of the chamber 20.

As seen in FIG. 11, the gap in the first flap guide 256 and the gap in the second flap guide 258 are positioned so that they allow the first flap element 222 to rotate from the first flap element position to a second flap element position, wherein the first flap element 222 is inclined, due to the weight of the separated soiled litter and animal waste 12, when the first flap element 222 is over the ramp 34. When the first flap element 222 rotates to the second flap element position, the separated soiled litter and animal waste 12 slide off the separating means 35 and onto the ramp 34. As the chamber 20 is rotated, the first flap element 222 stays in the second flap element position until the flap alignment device 242 comes in contact with the tripping element 254. When the flap alignment device 242 moves over the tripping element 254, the flap alignment device 242 rotates the first flap element 222 from the second flap element position back to the first flap element position that is slightly higher than before so that the first flap element 222 is slightly higher than the first flap guide 256 and the second flap guide 258. After the flap alignment device 242 moves past the tripping element 254, the first flap element 222 come to rest on the first flap guide 256 and the second flap guide 258. Once again, the first flap guide 256 and the second flap guide 258 hold the first flap element 222 in the first flap element position as the separating means 35 rotates through the upper half of the chamber 20. As the separating means 35 reaches the lower half of the chamber 20, the first stop 260 again holds the first flap element 222 in the first flap element position.

As shown in FIG. 11 and FIG. 12, the first flap element 222 comprises a first flap support element 228, a first flap pivot rod 226 and a pair of first flap guide elements 230. The first flap support element 228 is made from a thin sheet of material that is substantially rectangular in shape. The first flap pivot rod 226 is a smooth rod made of wood, plastic or metal that is rotatively attached to the top of the first flap support element 228 and is rigidly attached to the framework 262 of the separating element 38.

The first flap support element 228 is allowed to rotate about the first flap pivot rod 226 to rotate from the first flap element position to the second flap element position and back to the first flap element position. The pair of first flap guide elements 230 are made from short pieces of cylindrical shaped material, such as a dowel rod, and are made from wood, plastic, or metal. The pair of first flap guide elements 230 are rigidly attached to the rear of the first flap support element 228 and extend out from the sides of the first flap support element 228. The pair of first flap guide elements 230 are of such a length to allow them to come in contact with and be supported by the first flap guide 256 and the second flap guide 258 to hold the first flap support element 228 in the first flap element position when the separating means 35 is rotated through the upper half of the chamber 20.

The flap alignment device 242 comprises a pivot element 244, a linkage element 248 and a flap tripping element 250. The pivot element 244 is made from wood, plastic or metal and is similar to a hinge or the end of a pin type connection with a circular opening. The pivot element 244 is rigidly attached to the top of the first flap support element 228 near the rear of the first flap support element 228. The linkage element 248 is made from a thin sheet of material and is substantially rectangular in shape with a circular opening at each end. The flap tripping element 250 is made from a thin sheet of material and is substantially triangular in shape with a circular opening at the apex of the triangle and is rotatively attached to the framework 262. The end of the linkage element 248 is rotatively attached to the pivot element 244 with a pin through the circular opening in the pivot element 244 and through the circular opening in the linkage element 248. The opposite end of the linkage element 248 is rotatively attached to the apex of the flap tripping element 250 with a pin through the circular opening in the linkage element 248 and through the circular opening in the flap tripping element 250. When the first flap element 222 rotates from the first flap element position to the second flap element position, it causes the pivot element 244 to pull on the linkage element 248. This causes the linkage element 248 to move the flap tripping element 250 toward the interior of the chamber 20. As the chamber 20 continues to rotate, the flap tripping element 250 comes in contact with the tripping element 254, which moves the flap tripping element 250 back toward its original position. As the flap tripping element 250 is moved back to its original position, it pulls on the linkage element 248 which then pulls on the pivot element 244 which rotates the first flap support element 228 from the second flap element position to the first flap element position.

As seen in FIG. 11 and FIG. 12, another alternative embodiment of the separating means 35 is the addition of a first flap counter balance element 224 to the first flap element 222. The first flap counter balance element 224 is made from wood, plastic or metal and is rigidly attached to the front of the first flap support element 228 to help keep the first flap support element 228 in the first flap element position and to assist the flap alignment device 242 with moving the first flap support element 228 from the second flap element position to the first flap element position.

The use of the first flap counter balance element 224 can eliminate the need for the flap alignment device 242 and the tripping element 254. When the first flap counter balance element 224 is used without the flap alignment device 242 and the tripping element 254, the first flap counter balance element 224 cooperates with the first stop 260 to hold the first flap support element 228 in the first flap element position when the separating means 35 is rotated through the upper half of the chamber 20. As the separating means 35 is rotated through the lower half of the chamber 20, the separating means 35 moves through soiled litter and animal waste 12 and clean litter 11 and separates the soiled litter and animal waste 12 from the clean litter 11 and the pair of first flap guide elements 230 hold the first flap support element 228 in the first flap element position. As seen in FIG. 11, the gap in the first flap guide 256 and the gap in the second flap guide 258 are positioned so that they allow the first flap support element 228 to rotate from the first flap element position to the second flap element position, due to the weight of the separated soiled litter and animal waste 12, when the first flap support element 228 is over the ramp 34. When the first flap support element 228 rotates to the second flap element position, the separated soiled litter and animal waste 12 slide off the separating means 35 and onto the ramp 34. After the weight of the separated soiled litter and animal waste 12 is removed from the first flap support element 228, the first flap counter balance element 224 cooperates with the first stop 260 to rotate the first flap support element 228 from the second flap element position back to the first flap element position that is slightly higher than before so that the first flap guide elements 230 are slightly higher than the first flap guide 256 and the second flap guide 258. After the first flap support element 228 is rotated through the upper half of the chamber 20, the first flap guide elements 230 come to rest on the first flap guide 256 and the second flap guide 258. Once again, the first flap guide 256 and the second flap guide 258 hold the first flap support element 228 in the first flap element position as the separating means 35 rotates through the lower half of the chamber 20.

Also shown in FIG. 11 and FIG. 12 is an another alternative embodiment of the separating means 35 that comprises a second flap element 232 in addition to the separating element 38, the first flap element 222, the flap alignment device 242 and the first stop 260 described above. The second flap element 232 provides additional length to the separating means 35 to allow the separating means 35 to hold a larger volume of separated soiled litter and animal waste 12 as the chamber 20 is rotated. The second flap element 232 comprises a second flap support element 236, a second flap pivot rod 240 and a pair of second flap guide elements 238. The second flap support element 236 is made from a thin sheet of material that is substantially rectangular in shape. The second flap pivot rod 240 is a smooth rod made of wood, plastic or metal that is rotatively attached to the top of the second flap support element 236 and is rigidly attached to the framework 262 of the separating element 38. The second flap support element 236 is allowed to rotate about the second flap pivot rod 240 to rotate from the first flap element position, wherein the second flap support element 236 is substantially horizontal, to the second flap element position, wherein the second flap support element 236 is inclined and back to the first flap element position. The pair of second flap guide elements 238 are short pieces of cylindrical shaped material, such as a dowel rod, and are made from wood, plastic, or metal. The second flap guide elements 238 are rigidly attached to the front of the second flap support element 236 and are extended out from the sides of the second flap support element 236. The second flap guide elements 238 are of such a length to allow them to come in contact with and be supported by the first flap guide 256 and the second flap guide 258 to hold the second flap support element 236 in the first flap element position when the separating means 35 is rotated through the upper half of the chamber 20. When the separating means 35 has a second flap element 232, the second flap element 232 is rigidly attached to the flap tripping element 250 so that the flap alignment device 242 causes both the first flap element 222 and the second flap element 232 to rotate from an second flap element position to the first flap element position when the flap tripping element 250 of the flap alignment device 242 comes in contact with the tripping element 254.

Another improvement to the above discussed separating means 35 is the addition of a second flap counter balance element 234 to the second flap support element 236. The second flap counter balance element 234 is made from wood, plastic or metal and is rigidly attached to the rear of the second flap support element 236 to help keep the second flap support element 236 in the first flap element position and to assist the flap alignment device 242 with moving the second flap support element 236 from the second flap element position to the first flap element position.

Another improvement to the separating means 35 that utilizes the second flap counter balance element 234 is the addition of a second stop 261 attached to the framework 262 of the separating element 38. The second stop 261 can eliminate the need for the flap alignment device 242 and the tripping element 254. When the second flap counter balance element 234 is used, the second stop 261 holds the second flap support element 236 in the first flap element position when the separating means 35 is rotated through the upper half of the chamber 20 and the pair of second flap guide elements 238 hold the second flap support element 236 in the first flap element position when the separating means 35 is rotated through the lower half of the chamber 20.

As shown in FIG. 11 and FIG. 12, a further improvement to the separating means 35 with the first flap element 222 or a first flap element 222 and a second flap element 232, is the addition of a first flap wing 231 and a second flap wing 241. The first flap wing 231 and the second flap wing 241 help to move the clean litter 11 and the soiled litter and animal waste 12 away from the flap alignment device 242, as the separating means 35 moves through the mixture of the soiled litter and animal waste 12; and help direct the soiled litter and animal waste 12 from the separating means 35 onto the ramp 34. The first flap wing 231 is rigidly attached to the top of the first flap support element 228 at approximately a forty-five degree angle and to the end of the first flap support element 228 such that the first flap wing 231 is closer to the interior of the chamber 20 than the flap alignment device 242. The first flap wing 231 is made from a thin sheet of material and is substantially the same as a five sided polygon in shape. The second flap wing 241 is rigidly attached to the top of the second flap support element 236 at approximately a forty-five degree angle and to the end of the second flap support element 236 such that the second flap wing 241 is closer to the interior of the chamber 20 than the flap alignment device 242. The second flap wing 241 is made from a thin sheet of material and is substantially the same as a five sided polygon in shape. The first flap wing 231 and the second flap wing 241 cooperate to move clean litter 11 and soiled litter and animal waste 12 away from the flap alignment device 242, as the separating means 35 is moved through the mixture of the clean litter 11 and soiled litter and animal waste 12, to prevent the flap alignment device 242 from becoming clogged with the clean litter 11 and the soiled litter and animal waste 12. The first flap wing 231 and the second flap wing 241 also cooperate to direct the separated soiled litter and animal waste 12 from the separating means 35 onto the ramp 34 when the first flap element 222 or the first flap element 222 and second flap element 232 rotate from the first flap element position to the second flap element position over the ramp 34.

Figure 20F:
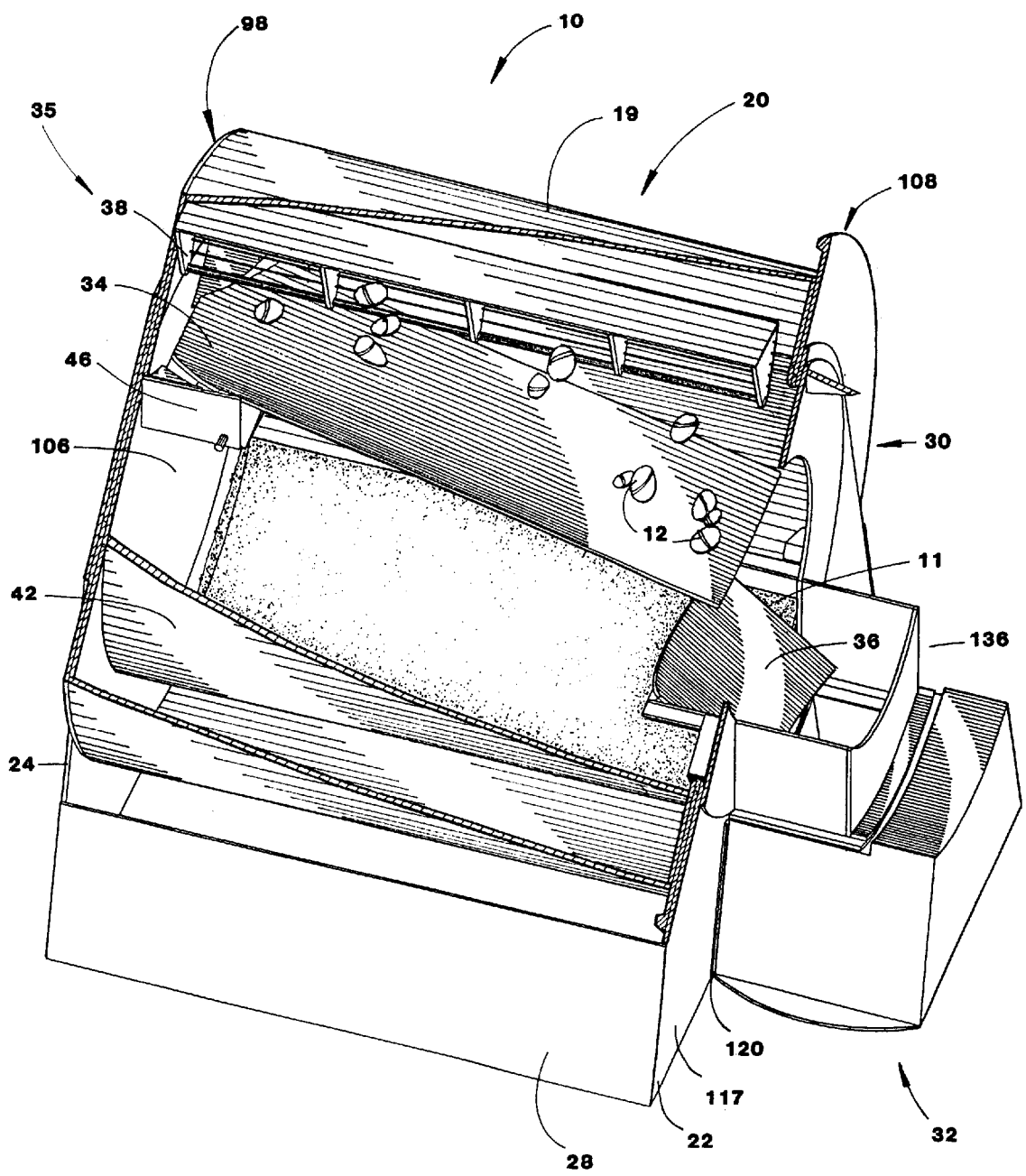
Figure 20G:
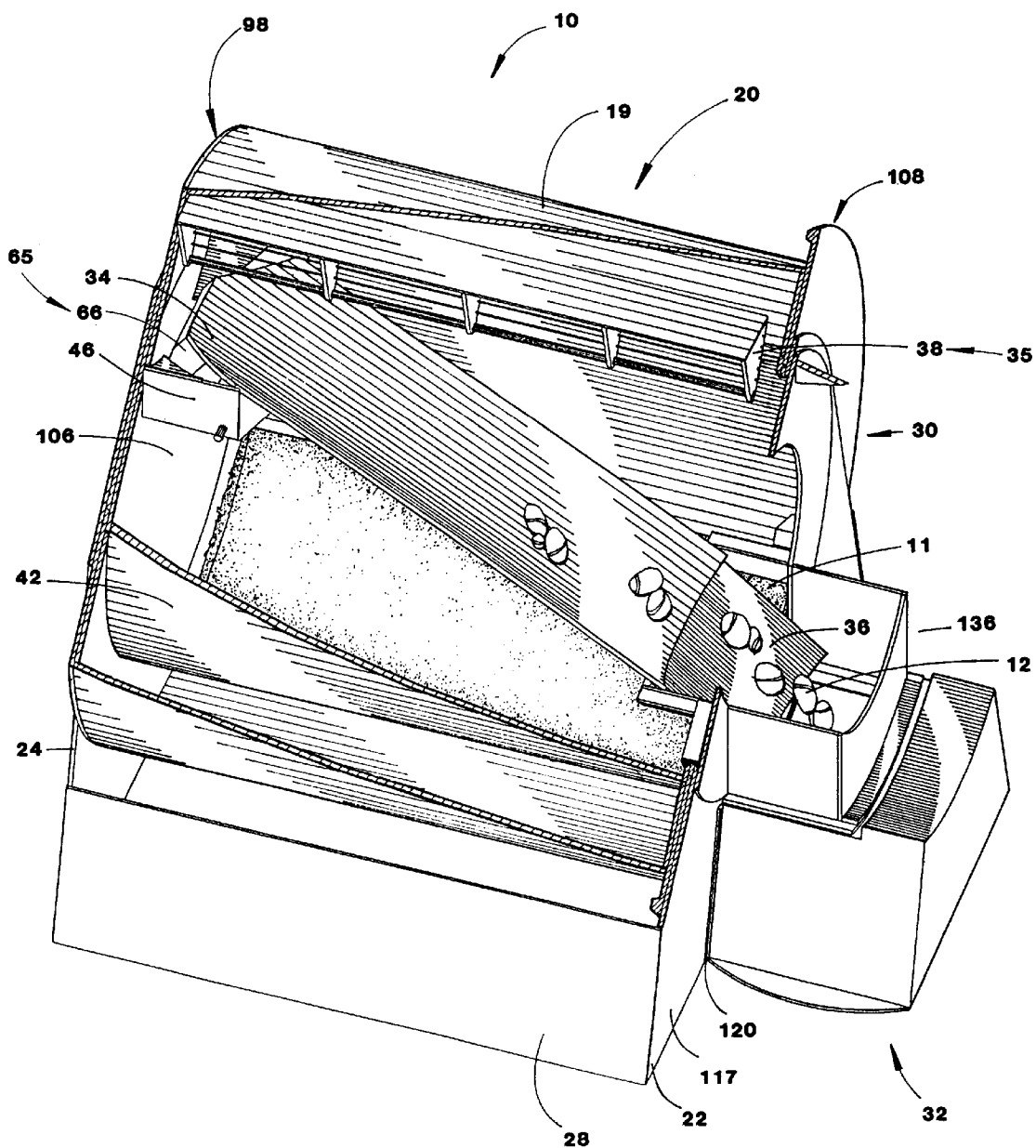

FIG. 2, FIG. 4 and FIG. 5 show the ramp 34 in the interior of the chamber 20. As shown in FIG. 20F, the ramp 34 is pivotally attached in the interior of the chamber 20, about an axis transverse to the axis of rotation of the chamber 20, such that the combination of gravity and the separating means 35 cooperate, as the chamber 20 is rotated, to move the separated soiled litter and animal waste 12 from the separating means 35 onto the ramp 34. Once the soiled litter and animal waste 12 are received by the ramp 34, the combination of gravity and the separated soiled litter and animal waste 12 cooperate to pivot the ramp 34 from a first position, wherein the ramp is substantially horizontal, to a second position, wherein the ramp is inclined, as shown in FIG. 20G. As the ramp 34 rotates from the first position to the second position, the separated soiled litter and animal waste 12 slide on the ramp 34 and ultimately exit the chamber 20.

Figure 8:
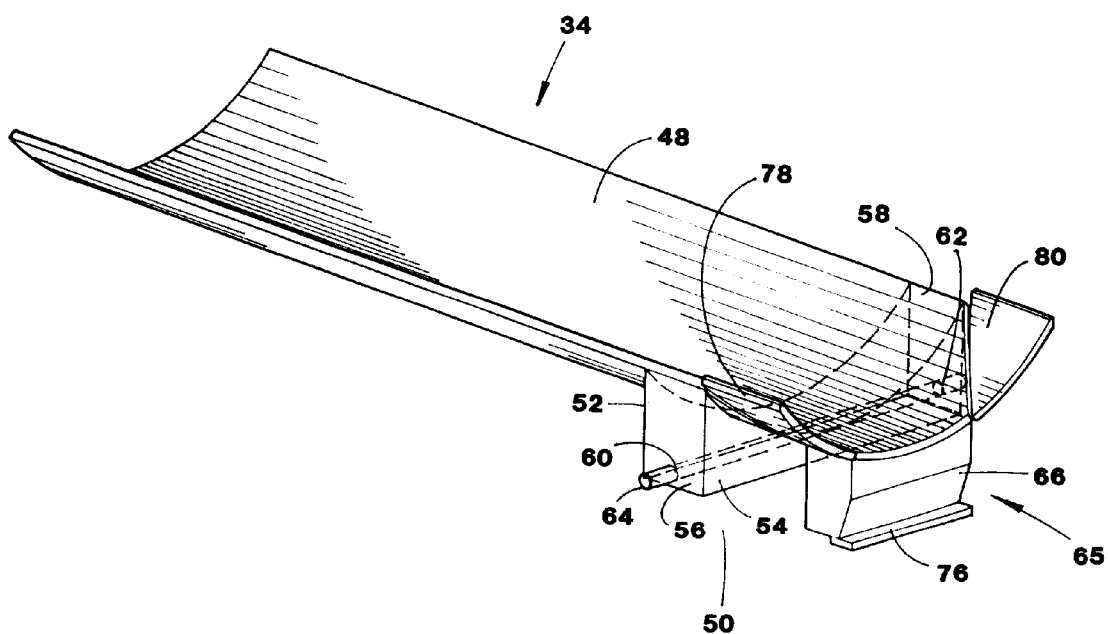
FIG. 8 is a perspective view showing one embodiment of the ramp.

As seen in FIG. 8, the ramp 34 comprises a long lever arm 48, a ramp mounting bracket 50 and a ramp restoring means 65. The long lever arm 48 is made from a thin sheet of material and is substantially rectangular in shape except that both rear corners are trimmed across the corners, in a triangular shape, to allow the long lever arm 48 to pivot toward the interior of the chamber 20 without interfering with the rotation of the chamber 20. The surface of the long lever arm 48 is concave so that it cooperates with gravity to move the separated soiled litter and animal waste 12, received from the separating means 35, to the center of the long lever arm 48. This causes the separated soiled litter and animal waste 12 to concentrate on the long lever arm 48 to insure that the weight of the soiled litter and animal waste 12 is sufficient to pivot the ramp 34 and to prevent the separated soiled litter and animal waste 12 from falling back into the clean litter 11. The ramp mounting bracket 50 is rigidly situated onto the bottom of the long lever arm 48, a short distance from the rear of the long lever arm 48, to pivotally support the ramp 34. The ramp mounting bracket 50 comprises a front plate 52, a rear plate 54, a first side plate 56, a second side plate 58 and a ramp mounting rod 64. The front plate 52 is made from a thin sheet of material that is substantially rectangular in shape except that the top of the front plate 52 is curved to allow it to match the curvature of the bottom of the long lever arm 48. The rear plate 54 is made from a thin sheet of material that is substantially rectangular in shape except that the top of the rear plate 54 is curved to allow it to match the curvature of the bottom of the long lever arm 48. The first side plate 56 is made from a thin sheet of material that is substantially rectangular in shape with a first side plate opening 60 that is circular in shape near the bottom of the first side plate 56. The first side plate 56 is rigidly attached to the end of the front plate 52 and to the end of the rear plate 54. The second side plate 58 is made from a thin sheet of material that is substantially rectangular in shape with a second side plate opening 62 that is circular in shape near the bottom of the second side plate 58. The second side plate 58 is rigidly attached to the opposite end of the front plate 52 and to the opposite end of the rear plate 54. The ramp mounting bracket 50 is attached to the bottom of the long lever arm 48 by attaching the top of the front plate 52, the top of the rear plate 54, the top of the first side plate 56 and the top of the second side plate 58 to the bottom of the long lever arm 48. The ramp mounting rod 64 is a short piece of cylindrical shaped material, such as a dowel rod, and is made from wood, plastic, or metal. The ramp mounting rod 64 is received into the first side plate opening 60 and the second side plate opening 62. The ramp mounting rod 64 is of sufficient length to extend through the first side plate opening 60 and the second side plate opening 62 to pivotally support the ramp 34.

As shown in FIG. 8, the preferred embodiment of the ramp restoring means 65 is a ramp counter balance element 66. The ramp counter balance element 66 is made from wood, plastic, fiberglass, coated cardboard, rubber, metal, or other natural materials or other man-made materials. The ramp counter balance element 66 is rigidly attached to the bottom of the long lever arm 48 at the rear of the long lever arm 48 to cooperate with the ramp mounting bracket 50 and gravity to maintain the long lever arm 48 in a first position when the invention is in the stationary mode. The rear of the ramp counter balance element 66 is angled to prevent the ramp counter balance element 66 from interfering with the rear bearing retainer 106 when the ramp 34 pivots from the first position to the second position. Alternative embodiments of the ramp restoring means 65 include one or more springs attached to the bottom of the long lever arm 48 or a combination of a pulley and a weight attached to the bottom of the long lever arm 48.

FIG. 2, FIG. 7 and FIG. 8 show a ramp stop 76, a first ramp filler element 78 and a second ramp filler element 80 attached to the interior surface of the rear bearing retainer 106. The ramp stop 76 is made from a thin sheet of material and is substantially rectangular in shape. The rear of the ramp stop 76 is rigidly attached to the interior surface of the rear bearing retainer 106. The rear of the ramp stop 76 cooperates with the ramp restoring means 65 to keep the ramp 34 in the first position, when the invention is in the stationary mode, by interfering with the movement of the ramp 34. The first ramp filler element 78 is made from a thin sheet of material and is substantially triangular in shape. The surface of the first ramp filler element 78 is concave to match the concave surface of the long lever arm 48. The first ramp filler element 78 cooperates with the long lever arm 48 to receive the separated soiled litter and animal waste 12 from the separating means 35 and to prevent the separated soiled litter and animal waste 12 from falling back into the clean litter 11. The second ramp filler element 80 is made from a thin sheet of material and is substantially triangular in shape. The surface of the second ramp filler element 80 is concave to match the concave surface of the long lever arm 48. The second ramp filler element 80 cooperates with the long lever arm 48 to receive the separated soiled litter and animal waste 12 from the separating means 35 and to prevent the separated soiled litter and animal waste 12 from falling back into the clean litter 11.

FIG. 2, FIG. 4 and FIG. 5 show a first ramp support 44 and a second ramp support 46 mounted internal of the chamber 20 to pivotally support the ramp 34. The first ramp support 44 is made from a thin sheet of material and is substantially rectangular in shape. The rear of the first ramp support 44 is rigidly attached to the interior surface of the rear bearing retainer 106 and the top of the first ramp support 44 is rigidly attached to the top of the first baffle 40. The first ramp support 44 has a first ramp support opening 43 that is circular in shape to receive the end of the ramp mounting rod 64 extending from the ramp mounting bracket 50 to pivotally support the ramp 34. The second ramp support 46 is made from a thin sheet of material and is substantially rectangular in shape. The rear of the second ramp support 46 is rigidly attached to the interior surface of the rear bearing retainer 106 and the top of the second ramp support 46 is rigidly attached to the top of the second baffle 42. The second ramp support 46 has a second ramp support opening 45 that is circular in shape to receive the end of the ramp mounting rod 64 extending from the ramp mounting bracket 50 to pivotally support the ramp 34.

FIG. 1 shows the face plate 30 while the invention is in the stationary mode. As shown in FIG. 2, FIG. 4 and FIG. 19, the face plate 30 is removably connected to the front support 22 and the front assembly 108 at the opening 23. The face plate 30 can be moved, while connected to the front support 22 and the front assembly 108, from a first face plate position as shown in FIG. 20A to a second face plate position as shown in FIG. 20B. The second face plate position of the face plate 30 is at the point where the face plate 30 is moved one hundred and eighty degrees from the point where the first face plate position of the face plate 30 is located. As shown in FIG. 19, the face plate 30 can be removed from the front support 22 and the front assembly 108 to provide larger, easier access to the interior of the chamber 20. As shown in FIG. 1, FIG. 16 and FIG. 20A, the face plate 30 cooperates with the receptacle 32 to create a step for the animal to use to enter and exit the chamber 20 and to seal the receptacle 32 when the face plate 30 is in the first face plate position. The step created by the face plate 30 and the receptacle 32 may be covered with carpet or other texture material to assist the animal's footing, to act as a scratching surface for claw sharpening and to help collect residue litter that may get caught in the animal's paws as it leaves the litter box. As shown in FIG. 17 and FIGS. 20B through 20G, the face plate 30 cooperates with the ramp 34 to remove the separated soiled litter and animal waste 12 from the chamber 20 and directs the separated soiled litter and animal waste 12 into the receptacle 32 when the face plate 30 is moved to the second face plate position.

Figure 13:
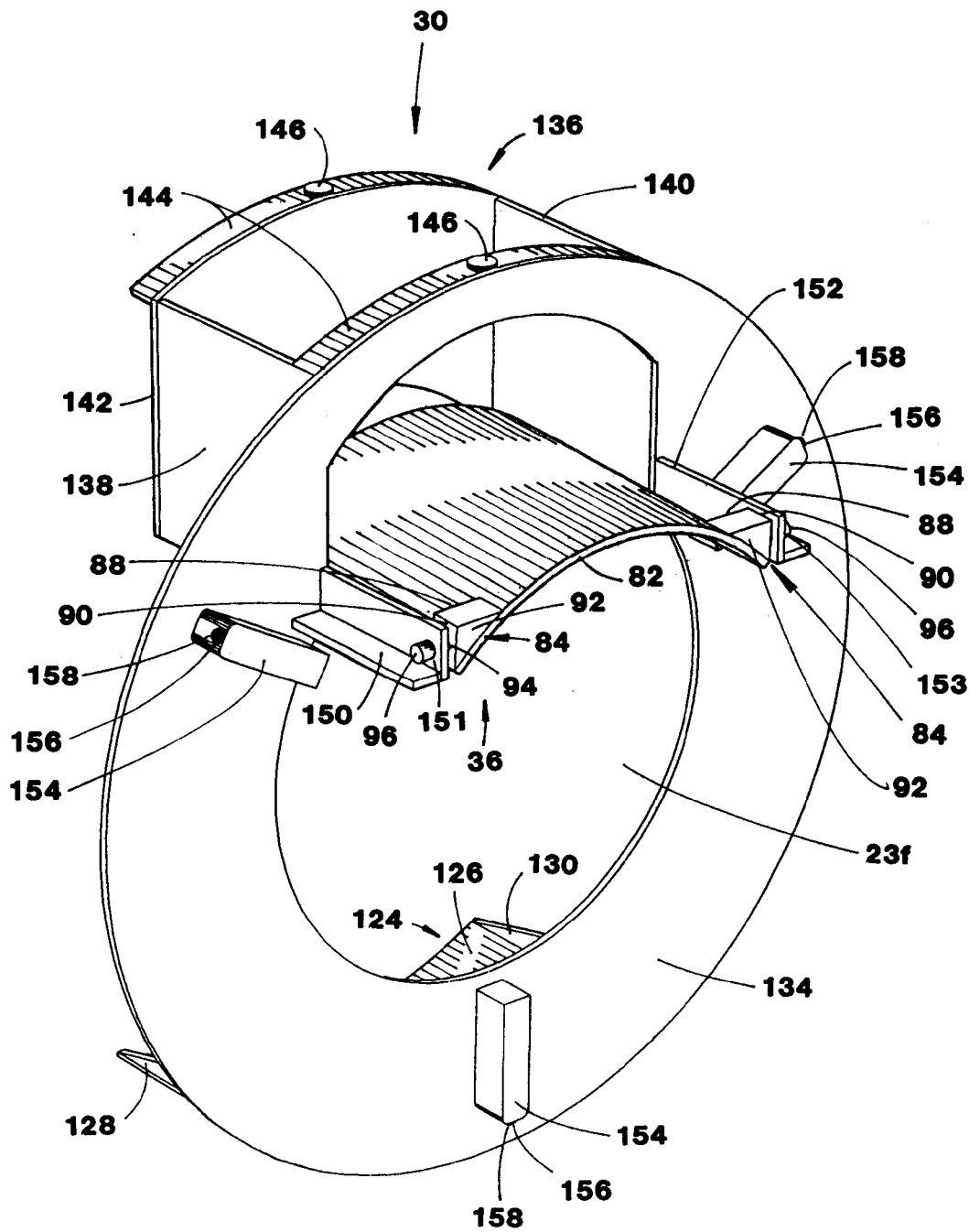
FIG. 13 is a rear perspective view showing one embodiment of the face plate in its first face plate position.
Figure 14:
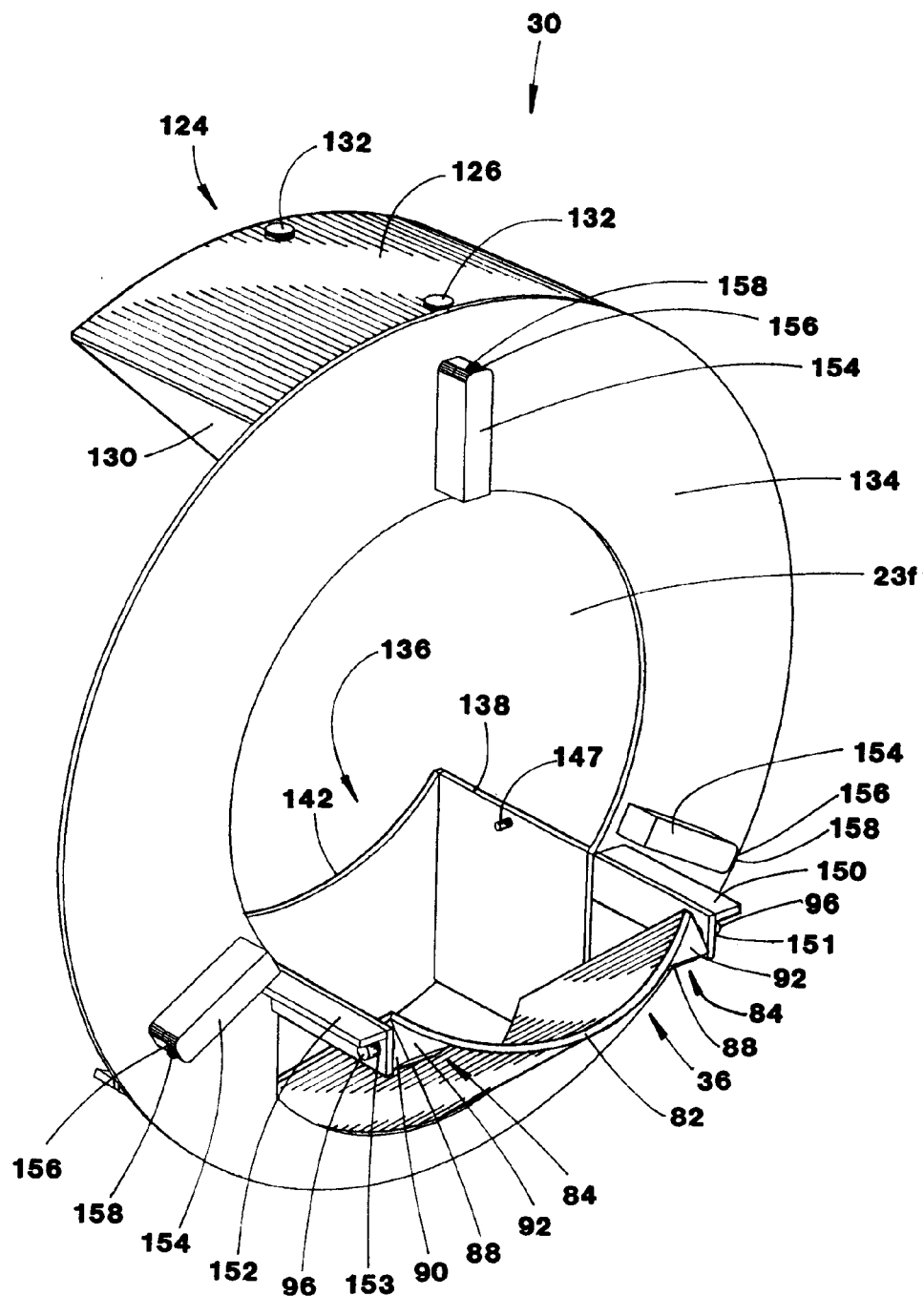
FIG. 14 is a rear perspective view showing one embodiment of the face plate in its second face plate position.

FIG. 2 shows the front view of the face plate 30 and FIG. 13 shows the rear view of the face plate 30, when the face plate 30 is in the first face plate position. As shown in FIG. 2, FIG. 4, FIG. 13 and FIG. 14, the face plate 30 comprises a short ramp 36, a face plate step 124, a face plate support element 134, a face plate disposal chute 136, a first short ramp support 150, a second short ramp support 152 and at least three face plate alignment elements 154. As shown in FIG. 13 and FIG. 14, the face plate support element 134 is made from a sheet of material that is disc shaped with a face plate opening 23f and with a U-shaped opening that intersects the face plate opening 23f at the top of the face plate support element 134. The face plate opening 23f is circular in shape and is substantially coincident with the axis of rotation of the chamber 20 to allow for entry into the chamber 20, for exit from the chamber 20 and for the removal of the soiled litter and animal waste 12 from the chamber 20.

The short ramp 36 is pivotally supported by the first short ramp support 150 and the second short ramp support 152 in the U-shaped opening in the face plate support element 134 for pivoting, about an axis at the rear of the short ramp 36, between a first short ramp position, wherein the short ramp is substantially horizontal, when the face plate 30 is at the first face plate position as shown in FIG. 13, and a second short ramp position, wherein the short ramp is inclined, when the face plate 30 is at the second face plate position as shown in FIG. 14. As shown in FIG. 20G, the short ramp 36 cooperates with the ramp 34 to guide the separated soiled litter and animal waste 12 out of the chamber 20 when the face plate 30 is in the second face plate position. The short ramp 36 is held in the first short ramp position by a face plate disposal chute stop 147 so that the short ramp 36 does not fall down into the opening 23 and the face plate opening 23f when the face plate 30 is in the first face plate position.

As shown in FIG. 13 and FIG. 14, the short ramp 36 has a short lever arm 82, a pair of short ramp mounting brackets 84 and a pair of short ramp mounting bracket pins 96. The short lever arm 82 is made from a thin sheet of material that is substantially rectangular in shape with a concave surface. The concave surface of the short lever arm 82 cooperates with gravity to move the separated soiled litter and animal waste 12 to the center of the short lever arm 82. The pair of short ramp mounting brackets 84 are rigidly attached onto the bottom surface of the short lever arm 82, at the rear corners of the short lever arm 82, to pivotally support the short lever arm 82. The short ramp mounting brackets 84 have a short ramp mounting bracket front 88, a short ramp mounting bracket side 90, and a short ramp mounting bracket rear 92. The short ramp mounting bracket front 88 is made from a thin sheet of material and is substantially triangular in shape. The top of the short ramp mounting bracket front 88 is curved to allow it to match the curvature of the bottom of the short lever arm 82. The short ramp mounting bracket rear 92 is made from a thin sheet of material and is substantially triangular in shape. The top of the short ramp mounting bracket rear 92 is curved to allow it to match the curvature of the bottom of the short lever arm 82. The short ramp mounting bracket side 90 is made from a thin sheet of material that is substantially rectangular in shape and has a short ramp mounting bracket side opening 94. The short ramp mounting bracket side opening 94 is a circular opening in the center of the short ramp mounting bracket side 90. The short ramp mounting bracket side 90 is rigidly attached onto the side of the short ramp mounting bracket front 88 and onto the side of the short ramp mounting bracket rear 92. The top of the short ramp mounting bracket front 88, the top of the short ramp mounting bracket side 90, and the top of the short ramp mounting bracket rear 92 are rigidly attached to the bottom of the short lever arm 82 at the rear corners of the short lever arm 82 to pivotally support the short lever arm 82. The short ramp mounting pins 96 are short pieces of cylindrical shaped material, such as a dowel rod, and are made from wood, plastic, or metal. The short ramp mounting pins 96 are received into the short ramp mounting bracket side openings 94 and extend outwardly from the short ramp mounting bracket side 90 to pivotally support the short ramp 36.

As shown in FIG. 13 and FIG. 14, the first short ramp support 150 is rigidly attached onto the interior surface of the face plate support element 134, at the first point where the face plate opening 23f and the U-shaped opening intersect, to pivotally support the short ramp 36. The first short ramp support 150 is made from wood, plastic, fiberglass, metal, or other natural materials or other man-made materials. The first short ramp support 150 is substantially L-shaped with a first short ramp support opening 151. The first short ramp support opening 151 is a circular opening at the rear of the vertical section of the L-shape for receiving the short ramp mounting bracket pins 96 from the short ramp mounting bracket 84.

As shown in FIG. 13 and FIG. 14, the second short ramp support 152 is rigidly attached onto the interior surface of the face plate support element 134, at the second point where the face plate opening 23f and the U-shaped opening intersect, to pivotally support the short ramp 36. The second short ramp support 152 is made from wood, plastic, fiberglass, metal, or other natural materials or other man-made materials and is substantially L-shaped with a second short ramp support opening 153. The second short ramp support opening 153 is a circular opening at the rear of the vertical section of the L-shape for receiving the short ramp mounting bracket pin 96 from the short ramp mounting bracket 84.

As shown in FIG. 2, the face plate step 124 provides access into the chamber 20 when the face plate 30 is at the first face plate position and the chamber 20 is in the stationary mode. The face plate step 124 is rigidly attached onto the exterior surface of the face plate support element 134 at the bottom of the face plate support element 134 when the face plate 30 is in the first face plate position. As shown in FIG. 2, the face plate step 124 comprises a face plate step base 126, a first face plate step side support 128, a second face plate step side support 130 and at least two face plate step alignment devices 132.

The face plate step base 126 is made from a thin sheet of material and is substantially rectangular in shape with a curved surface. The curved surface allows the face plate step base 126 to match the curvature of the face plate support element 134. The rear edge of the face plate step base 126 is rigidly attached onto the external surface of the face plate support element 134. The first face plate step side support 128 is made from a thin sheet of material and has the shape of a right triangle. The bottom of the first face plate step side support 128 is rigidly attached onto the end of the face plate step base 126. The side of the first face plate step side support 128 is rigidly attached onto the external surface of the face plate support element 134 to provide lateral and vertical support to the face plate step base 126. The second face plate step side support 130 is made from a thin sheet of material and has the shape of a right triangle. The bottom of the second face plate step side support 130 is rigidly attached onto the opposite end of the face plate step base 126. The side of the second face plate step side support 130 is rigidly attached onto the external surface of the face plate support element 134 to provide lateral and vertical support to the face plate step base 126.

Figure 31:
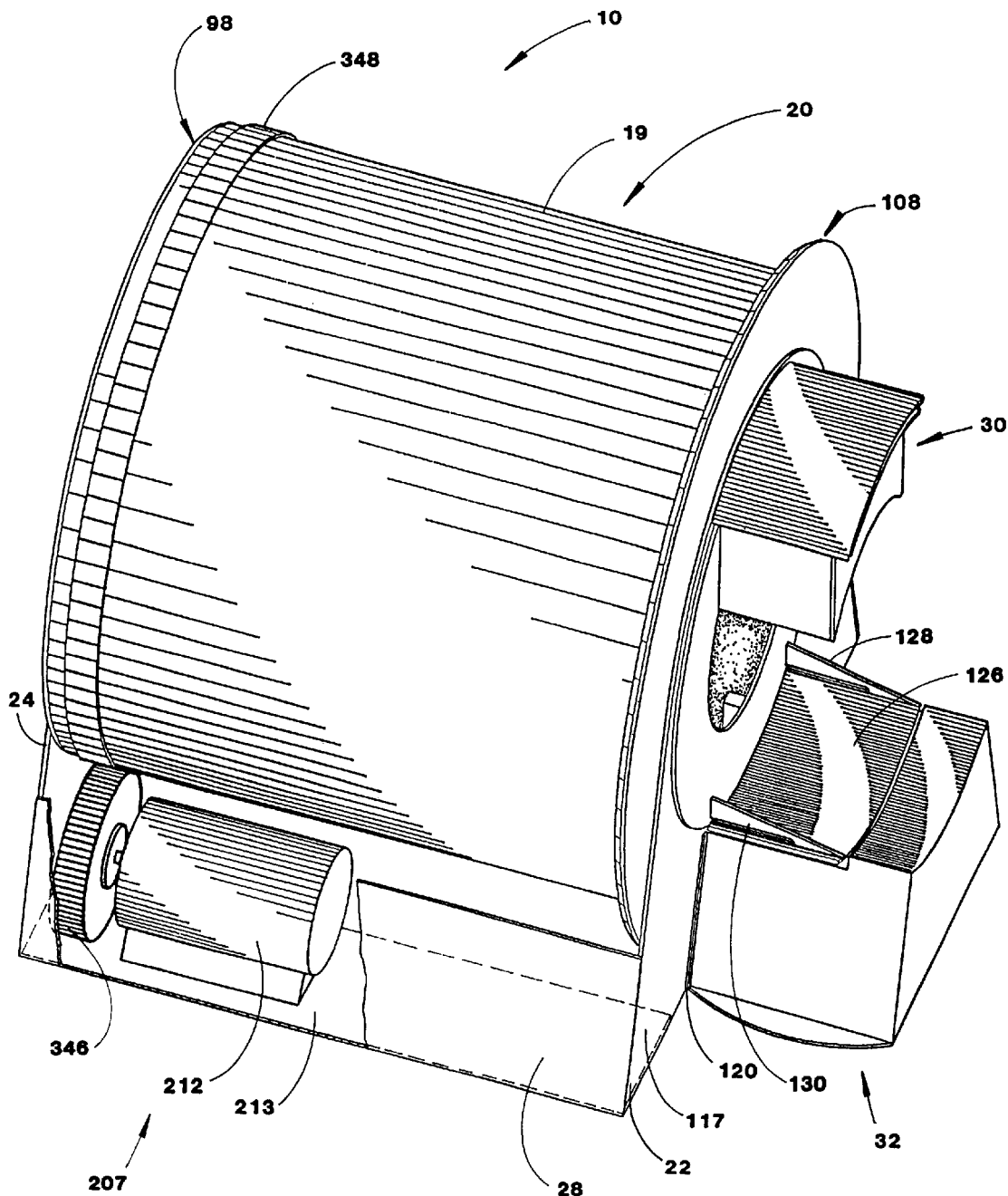
FIG. 31 is a perspective view of another embodiment of the invention with a motor and friction wheel drive system.
Figure 32:
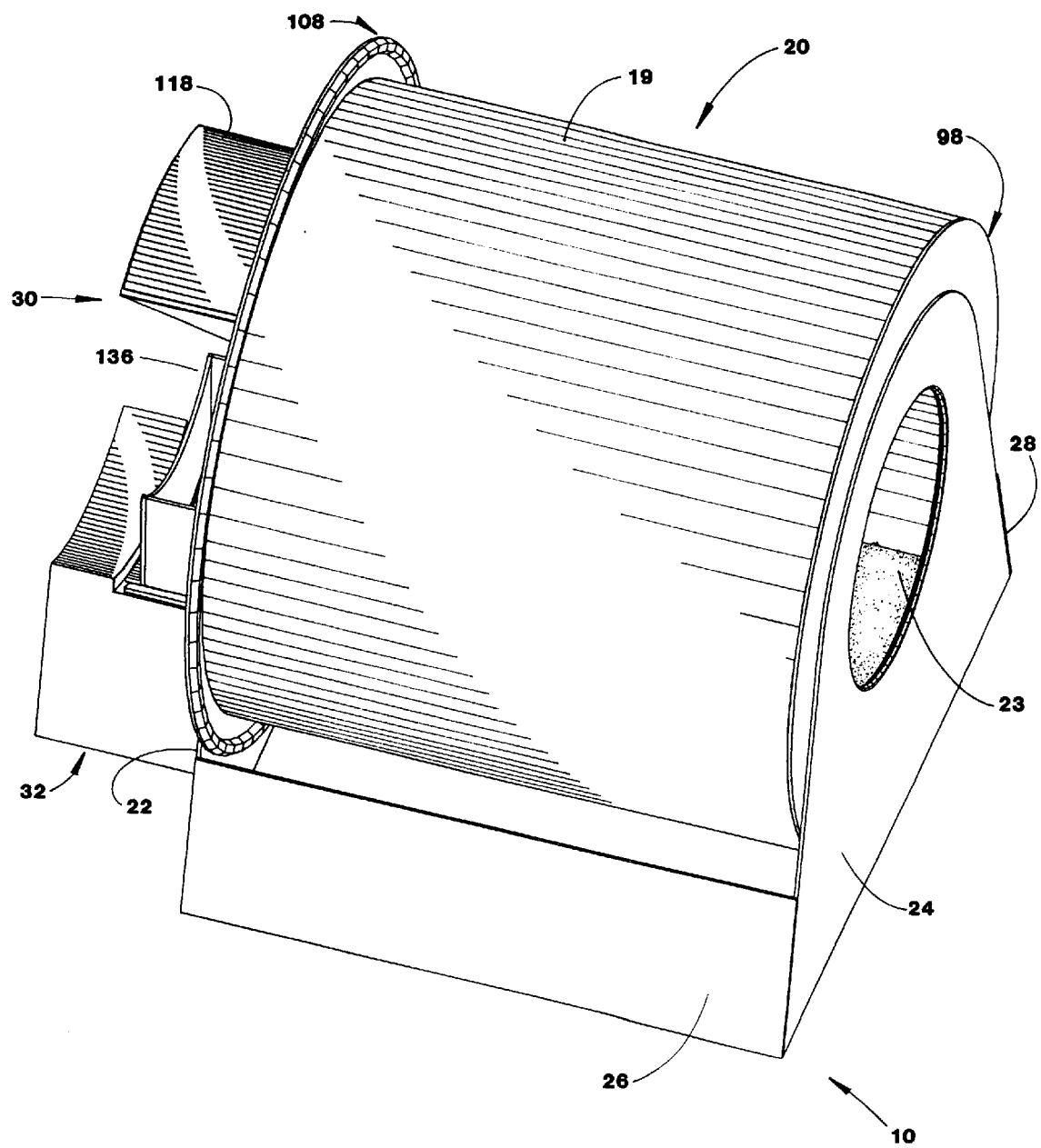
FIG. 32 is a rear perspective view of another embodiment of the invention with an opening in the rear support.

Another embodiment of the face plate step, shown in FIG. 31, provides for a rectangular opening in the first face plate side support 128 and in the second face plate side support 130. The rectangular opening is located just above where the first face plate side support 128 and the second face plate side support 130 connect to the face plate base step 126. The purpose of these rectangular openings are to allow any particles of clean litter 11 and soiled litter and animal waste 12, that may collect on the face plate base step 126 when the animal leaves the litter box, to fall into the receptacle 32 when the face plate is moved from the first face plate position to the second face plate position.

As shown in FIG. 14 and FIG. 16, the face plate step alignment devices 132 are rigidly attached onto the bottom surface of the face plate step base 126. The preferred face plate step alignment devices 132 are small pieces of metal that are attracted to a magnet, such as iron or steel. The face plate step alignment devices 132 cooperate with receptacle chute alignment devices 210 to align the face plate 30 when the face plate 30 is in the first face plate position and cooperate with the cover alignment devices 119 to align the face plate 30 when the face plate 30 is in the second face plate position.

As shown in FIG. 2 and FIG. 13, the face plate disposal chute 136 is rigidly attached onto the external surface of the face plate support element 134 of the face plate 30, at the top of the face plate support element 134 and over the U-shaped opening in the face plate support element 134 when the face plate 30 is in the first face plate position. As shown in FIG. 1, FIG. 5, FIG. 18 and FIG. 20A, the face plate disposal chute 136 is positioned underneath the cover 118, on the front support 22, when the face plate 30 is in the first face plate position. As shown in FIG. 11, FIG. 17 and FIGS. 20B through 20G, the face plate disposal chute 136 cooperates with the ramp 34 and the short ramp 36 to remove the separated soiled litter and animal waste 12 from the chamber 20, when the face plate 30 is in the second face plate position.

The face plate disposal chute 136 has a first face plate disposal chute side 138, a second face plate disposal chute side 140, a face plate disposal chute front 142, a face plate disposal chute top 144, at least two face plate disposal chute alignment devices 146 and a face plate disposal chute stop 147. The first face plate disposal chute side 138 is made from a thin sheet of material and is substantially rectangular in shape. The rear of the first face plate disposal chute side 138 is rigidly attached onto the external surface of the face plate support element 134 next to the U-shaped opening in the face plate support element 134 such that the first face plate disposal chute side 138 is perpendicular to the face plate support element 134. The second face plate disposal chute side 140 is made from a thin sheet of material and is substantially rectangular in shape. The rear of the second face plate disposal chute side 140 is rigidly attached onto the external surface of the face plate support element 134 next to the U-shaped opening in the face plate support element 134 such that the second face plate disposal chute side 140 is perpendicular to the face plate support element 134. The face plate disposal chute front 142 is made from a thin sheet of material. The face plate disposal chute front 142 has a curved top and has a curved bottom to match the curvature of the face plate support element 134. The end of the face plate disposal chute front 142 is rigidly attached onto the front of the first face plate disposal chute side 138. The opposite end of the face plate disposal chute front 142 is rigidly attached onto the front of the second face plate disposal chute side 140. The face plate disposal chute top 144 is made from a thin sheet of material and is substantially rectangular in shape with a curved surface. The curved surface of the face plate disposal chute top 144 allows the face plate disposal chute top 144 to match the curvature of the face plate support element 134. The face plate disposal chute top 144 has a rectangular opening in the center of the face plate disposal chute top 144. The rear of the face plate disposal chute top 144 is rigidly attached onto the external surface at the top of the face plate support element 134. The end of the face plate disposal chute top 144 is rigidly attached onto the top of the first face plate disposal chute side 138. The opposite end of the face plate disposal chute top 144 is rigidly attached onto the top of the second face plate disposal chute side 140. The front of the face plate disposal chute top 144 is rigidly attached onto the top of the face plate disposal chute front 142. The face plate disposal chute alignment devices 146 are rigidly attached onto the top surface of the face plate disposal chute top 144. The preferred face plate disposal chute alignment devices 146 are small pieces of metal that are attracted to a magnet, such as iron or steel. The face plate disposal chute alignment devices 146 cooperate with the cover alignment devices 119 to align the face plate 30 when the face plate 30 is in the first face plate position and cooperate with the receptacle chute alignment devices 210 to align the face plate 30 when the face plate 30 is in the second face plate position. As shown in FIG. 14, the face plate disposal chute stop 147 is rigidly attached to the internal surface of the first face plate disposal chute side 138 of the face plate disposal chute 136. The face plate disposal chute stop 147 is cylindrical in shape, such as a dowel rod, and is made from wood, metal or plastic. The face plate disposal chute stop 147 holds the short ramp 36 in the first short ramp position when the face plate 30 is in the first face plate position.

As shown in FIG. 4, FIG. 13, FIG. 14, FIG. 16 and FIGS. 20B through 20G, the face plate 30 has at least three face plate alignment elements 154. The face plate alignment elements 154 are rigidly attached to the interior surface of the face plate support element 134. The face plate alignment elements 154 attach the face plate 30 to the front support 22 and to the front assembly 108 such that the face plate 30 is aligned in the opening 23, such that the face plate 30 can be moved from the first face plate position to the second face plate position while attached to the front support 22 and the front assembly 108, and such that the face plate 30 can be easily removed from the front support 22 and the front assembly 108. The face plate alignment elements 154 are substantially rectangular, parallelepiped in shape with one end of the parallelepiped rounded to allow the face plate alignment elements 154 to easily slide over the front support 22 and the front assembly 108. The face plate alignment elements 154 have a face plate alignment element orifice 156 and a face plate alignment element catch 158. The face plate alignment element orifice 156 is placed in the rounded end of the face plate alignment element 154 to receive the face plate alignment element catch 158. The face plate alignment element catch 158 is a resilient projectile, such as a spring loaded bullet catch, that retracts or flexes when it comes in contact with the front support 22, when the face plate 30 is being attached to the front support 22 and the front assembly 108, and then returns to its normal position, after the face plate alignment elements 154 are forced past the front assembly 108, to hold the face plate 30 onto the front support 22 and the front assembly 108. In the one embodiment, as shown in FIG. 13 and FIG. 14, three face plate alignment elements 154 are rigidly attached to the interior surface of the face plate support element 134 approximately 120 degrees apart. This arrangement of the face plate alignment elements 154 allows the face plate 30 to properly align with the opening 23.

Figure 21:
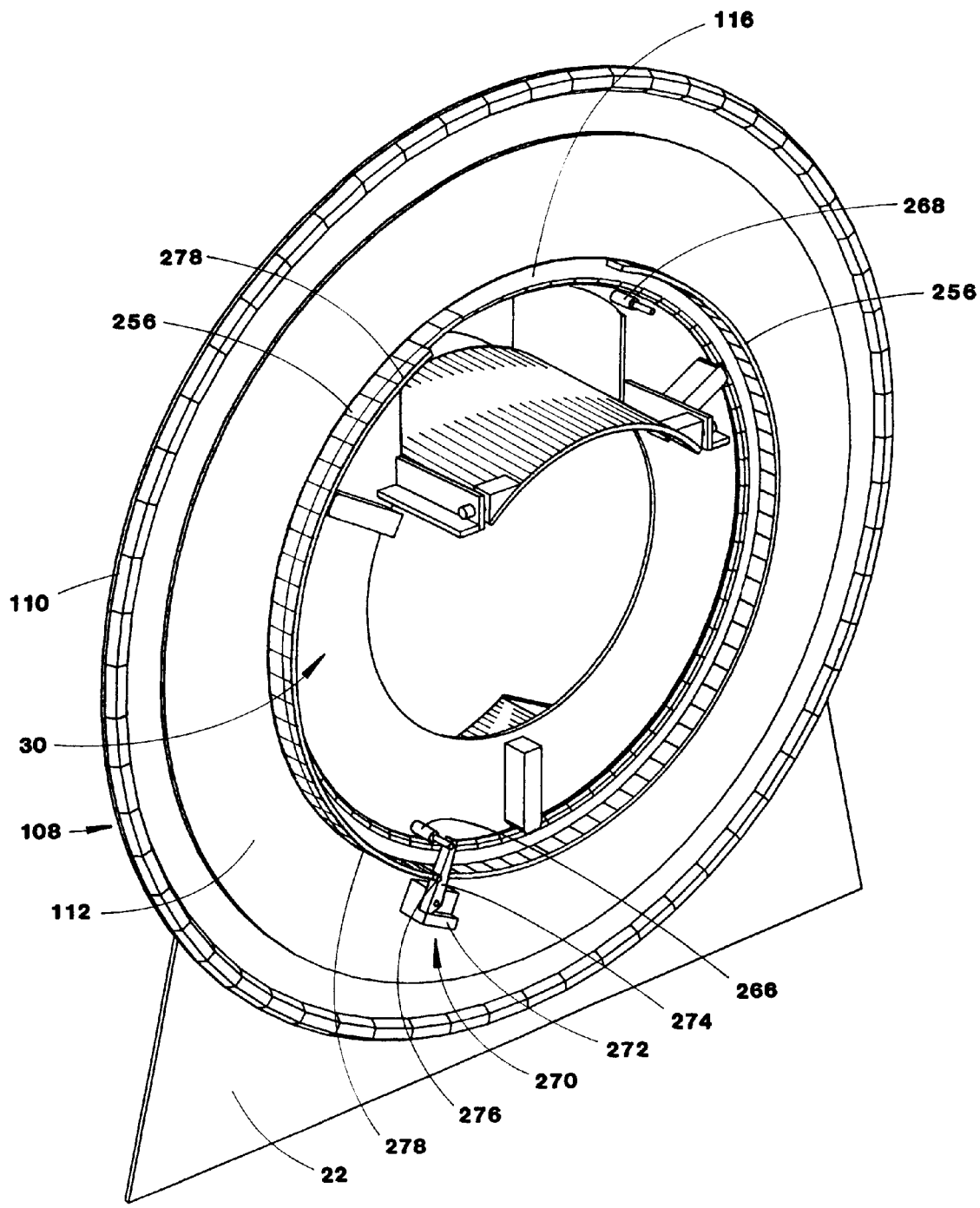
FIG. 21 is a rear perspective view of the front assembly with an alternative embodiment of the invention with the face plate in the first face plate position.
Figure 22:
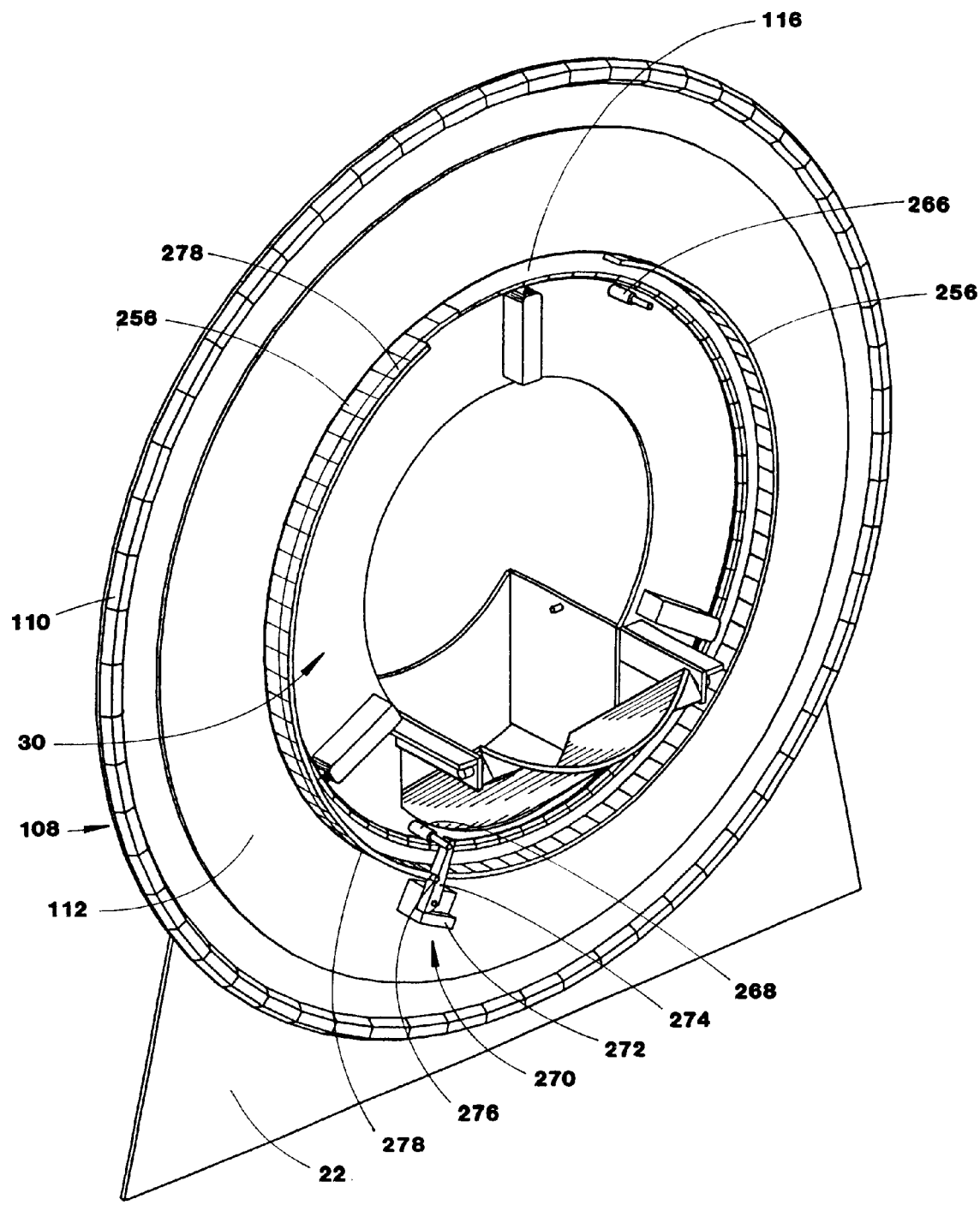
FIG. 22 is a rear perspective view of the front assembly with an alternative embodiment of the invention with the face plate in the second face plate position.
Figure 23:
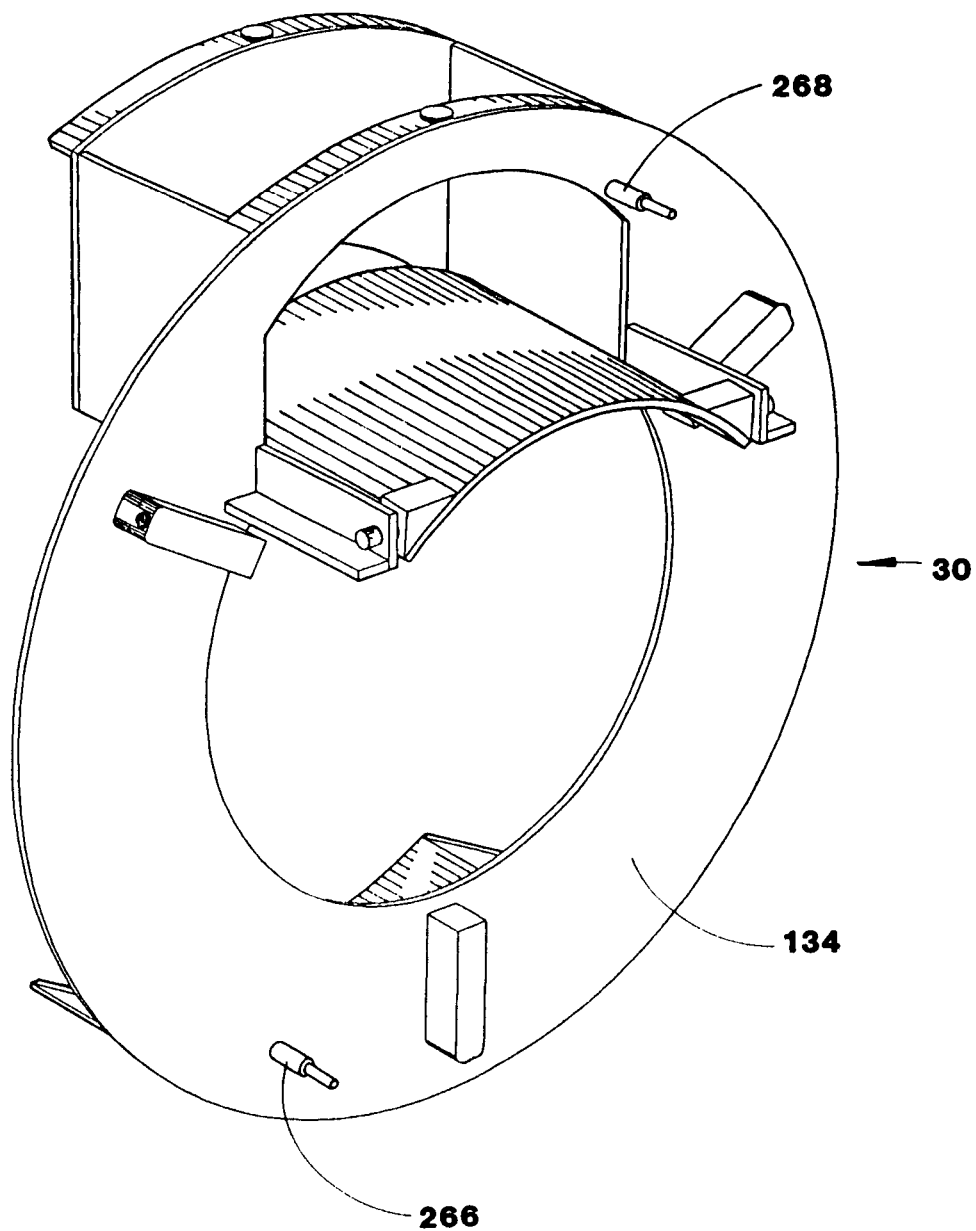
FIG. 23 is a rear perspective view showing an alternative embodiment of the face plate, shown in FIG. 21 and FIG. 22, in the first face plate position.

An alternative embodiment of the invention is shown in FIG. 21, FIG. 22 and FIG. 23. In this embodiment of the invention, the face plate 30 has the additional elements of a first face plate rotation element 266 and a second face plate rotation element 268; and the front assembly 108 has the additional elements of a front assembly engaging device 270, a front assembly engaging device tripping element 276 and a front assembly engaging device guide 278. These additional elements cause the face plate 30 to automatically move from the first face plate position to the second face plate position with one counter-clockwise rotation of the chamber 20 and then to move from the second face plate position back to the first face plate position with a second counter-clockwise rotation of the chamber 20, instead of moving the face plate 30 manually as required in other embodiments of the invention. In this embodiment, the owner cleans the litter box by manually rotating the chamber 20 two counter-clockwise rotations, in contrast with other embodiments where the owner cleans the litter box by manually moving the face plate 30 from the first face plate position to the second face plate position and then manually rotating the chamber 20 one counter-clockwise rotation followed by manually moving the face plate 30 back to the first face plate position.

As shown in FIG. 23, the first face plate rotation element 266 is made from a short piece of cylindrical shaped material, such as a dowel rod, and is made from wood, plastic, or metal. One end of the first face plate rotation element 266 is rigidly attached to the interior surface of the face plate support element 134 and extends toward the interior of the chamber 20. The second face plate rotation element 268 is made from a short piece of cylindrical shaped material, such as a dowel rod, and is made from wood, plastic, or metal. One end of the second face plate rotation element 268 is rigidly attached to the interior surface of the face plate support element 134 and extends toward the interior of the chamber 20. The second face plate rotation element 268 is located on the right side of the U-shaped opening when looking at the rear of the face plate 30. The first face plate rotation element 266 and the second face plate rotation element 268 are attached to the face plate 30 such that they are one hundred and eighty degrees apart.

As shown in FIG. 21 and FIG. 22, the front assembly engaging device 270 comprises a front assembly engaging device mounting bracket 272 and a front assembly engaging device lever arm 274. The front assembly engaging device mounting bracket 272 is rigidly attached to the interior surface of the front surface segment support 112. The front assembly engaging device lever arm 274 is rotatively attached to the front assembly engaging device mounting bracket 272. The front assembly engaging device mounting bracket 272 is an L-shaped block made from wood, plastic or metal that supports the front assembly engaging device lever arm 274 so that the front assembly engaging device lever arm 274 does not come in contact with the first flap guide 256. The front assembly engaging device lever arm 274 is shaped like a right triangle with a taper from the top (hypotenuse side of the right triangle) to the side (opposite side of the right triangle), is hollow and is made of wood, plastic or metal. The front assembly engaging device lever arm 274 contains a mechanism that allows the front assembly engaging device lever arm 274 to pivot approximately ninety degrees, but is spring loaded to hold the front assembly engaging device lever arm 274 in a substantially vertical position when mounted on the front assembly engaging device mounting bracket 272. The front assembly engaging device tripping element 276 is made from a short piece of cylindrical shaped material, such as a dowel rod, and is made from wood, plastic, or metal. One end of the front assembly engaging device tripping element 276 is rigidly attached to the interior edge of the first flap guide 256 at a point where the front assembly engaging device tripping element 276 lines up with the first face plate rotation element 266 when the face plate 30 is in the first face plate position. The front assembly engaging device guide 278 is made from a thin sheet of material that is substantially rectangular in shape with a curvature that matches the curvature of the first flap guide 256. The front assembly engaging device guide 278 is rigidly attached to the interior edge of the first flap guide 256 on the left side of the first flap guide 256 when looking at the rear of the front assembly 108.

When the face plate 30 is in the first face plate position and the chamber 20 is rotated in the counter-clockwise direction, the front assembly engaging device lever arm 274 comes in contact with the front assembly engaging device tripping element 276. This causes the front assembly engaging device lever arm 274 to rotate from a substantially vertical position to a substantially horizontal position. As the front assembly engaging device lever arm 274 is rotated past the front assembly engaging device tripping element 276, the front assembly engaging device guide 278 holds the front assembly engaging device lever arm 274 in the substantially horizontal position. As the chamber 20 continues to rotate in a counter-clockwise direction, the front assembly engaging device lever arm 274 is rotated past the front assembly engaging device guide 278. Once the front assembly engaging device lever arm 274 has cleared the front assembly engaging device guide 278, the spring loaded mechanism in the front assembly engaging device lever arm 274 rotates the front assembly engaging device lever arm 274 back to the substantially vertical position. As the chamber 20 continues to rotate in a counter-clockwise direction, the front assembly engaging device lever arm 274 comes in contact with the second face plate rotation element 268 and moves the face plate 30 by pushing on the second face plate rotation element 268. This moves the face plate 30 from the first face plate position to the second face plate position. At the end of one counter-clockwise rotation of the chamber 20, the face plate 30 is in the second face plate position and the front assembly engaging device lever arm 274 comes in contact with the front assembly engaging device tripping element 276 again. This causes the front assembly engaging device lever arm 274 to rotate from a substantially vertical position to a substantially horizontal position which prevents the front assembly engaging device lever arm 274 from pushing on the second face plate rotation element 268 and stops the face plate 30 in the second face plate position. The front assembly engaging device lever arm 274 once again comes in contact with the front assembly engaging device tripping element 276. This causes the front assembly engaging device lever arm 274 to rotate from a substantially vertical position to a substantially horizontal position. As the front assembly engaging device lever arm 274 is rotated past the front assembly engaging device tripping element 276 a second time, the front assembly engaging device guide 278 holds the front assembly engaging device lever arm 274 in the substantially horizontal position. As the chamber 20 continues its rotation a second time, the front assembly engaging device lever arm 274 is rotated past the front assembly engaging device guide 278. Once the front assembly engaging device lever arm 274 has cleared the front assembly engaging device guide 278, the spring loaded mechanism in the front assembly engaging device lever arm 274 rotates the front assembly engaging device lever arm 274 back to the substantially vertical position. As the chamber 20 continues to rotate the second time, the front assembly engaging device lever arm 274 comes in contact with the first face plate rotation element 266 and moves the face plate 30 by pushing on the first face plate rotation element 266. This moves the face plate 30 from the second face plate position back to the first face plate position.

Figure 24:
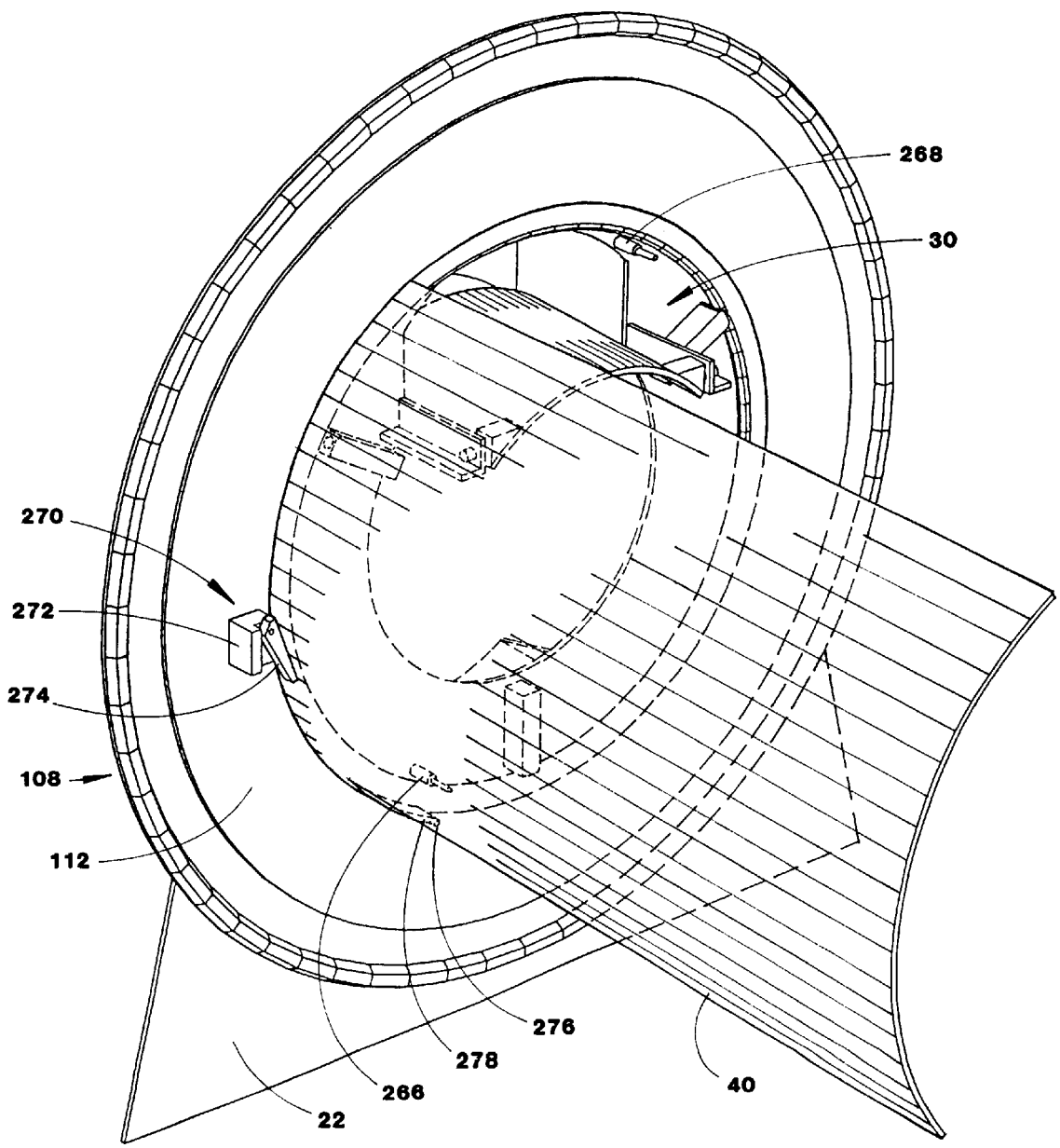
FIG. 24 is a rear perspective view of the front assembly showing another alternative embodiment of the invention with a first baffle and with a face plate in the first face plate position.

As shown in FIG. 24, if this embodiment of the invention uses a first baffle 40 instead of the first flap guide 256 and the second flap guide 258, the front assembly engaging device tripping element 276 and the front assembly engaging device guide 278 are rigidly attached to the front bearing retainer 116 instead of the first flap guide 256. The front assembly engaging device guide 278 butts up to the first baffle 40 at the bottom of the first baffle 40. The front assembly engaging device lever arm 274 is held in the substantially horizontal position by first the front assembly engaging device guide 278 and then by the first baffle 40. If any reverse (clockwise) rotation is required by the chamber 20, the front assembly engaging device guide 278 prevents any interference with the front assembly engaging device tripping element 276, the first face plate rotation element 266, when the face plate 30 is in the first face plate position, and the second face plate rotation element 268, when the face plate 30 is in the second face plate position, by the front assembly engaging device lever arm 274 by maintaining the front assembly engaging device lever arm 274 in the substantially horizontal position.

In this embodiment of the invention, the separating means 35 must be located on the right side, at an angle of approximately ninety degrees, with zero degrees being at the center of the top of the chamber 20 when looking at the front of the chamber 20, before starting the first rotation of the chamber 20. This allows the face plate 30 to move into the second face plate position before the separating means 35 removes the soiled litter and animal waste 12 and places them on the ramp 34.

Figure 15:
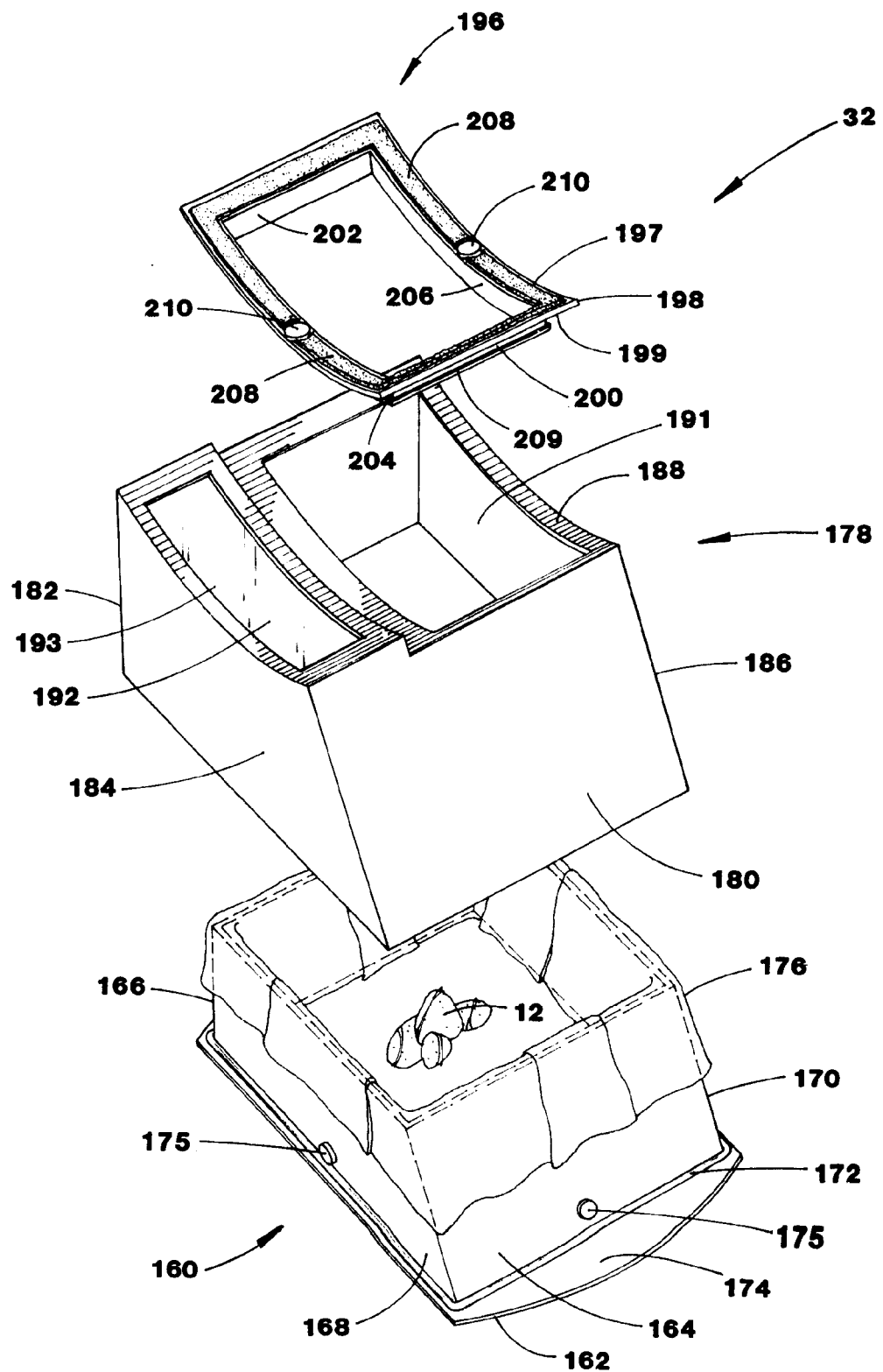
FIG. 15 is an exploded view of one embodiment of the receptacle.

As shown in FIG. 1, FIG. 16, FIG. 18 and FIG. 20A, the receptacle 32 is situated outside the front support 22 and aligned with the front support 22 by the front support alignment elements 120 to cooperate with the face plate step 124 to create a step for the animal to use to enter the chamber 20, when the face plate 30 is in the first face plate position. As shown in FIG. 17 and FIGS. 20B through 20G, the receptacle 32 cooperates with the separating means 35, the ramp 34, the short ramp 36 and the face plate disposal chute 136 to receive the separated soiled litter and animal waste 12 from the interior of the chamber 20. As shown in FIG. 15, one embodiment of the receptacle 32 comprises a receptacle inner element 160, a receptacle outer element 178 and a receptacle chute 196. The receptacle inner element 160 creates a cavity to receive the separated soiled litter and animal waste 12 until the receptacle inner element 160 reaches a given receptacle full level. The receptacle outer element 178 creates a cavity to receive the receptacle inner element 160 and contains an opening in the top of the receptacle outer element 178. The receptacle chute 196 is received in the opening in the top of the receptacle outer element 178. The receptacle chute 196 cooperates with the face plate step 124 to seal the receptacle 32, when the face plate 30 is in the first face plate position, and cooperates with the separating means 35, the ramp 34, the short ramp 36 and the face plate disposal chute 136 to direct the separated soiled litter and animal waste 12 from the interior of the chamber 20 into the receptacle inner element 160, when the face plate 30 is in the second face plate position.

As shown in FIG. 16 and FIG. 17, the receptacle inner element 160 receives and holds the separated soiled litter and animal waste 12 from the chamber 20. As shown in FIG. 15, the receptacle inner element 160 may contain a plastic bag 176 in the interior of the receptacle inner element 160 to receive and hold the separated soiled litter and animal waste 12 from the chamber 20. Any type of plastic bag 176 may be used in the receptacle. The receptacle inner element 160 comprises a receptacle inner element bottom 162, a first receptacle inner element side wall 164, a second receptacle inner element side wall 166, a receptacle inner element front wall 168, a receptacle inner element back wall 170, a receptacle inner element seal 172, and at least four receptacle inner element alignment devices 175.

The receptacle inner element bottom 162 is made from a thin sheet of material that is substantially rectangular in shape, except that two opposite sides are outwardly curved instead of straight, and has a receptacle inner element bottom interior surface 174. The first receptacle inner element side wall 164 is made from a thin sheet of material and is substantially rectangular in shape. The bottom of the first receptacle inner element side wall 164 is rigidly attached onto the receptacle inner element bottom interior surface 174. The second receptacle inner element side wall 166 is made from a thin sheet of material and is substantially rectangular in shape. The bottom of the second receptacle inner element side wall 166 is rigidly attached onto the receptacle inner element bottom interior surface 174. The receptacle inner element front wall 168 is made from a thin sheet of material and is substantially trapezoidal in shape. The bottom of the receptacle inner element front wall 168 is rigidly attached onto the receptacle inner element bottom interior surface 174. The end of the receptacle inner element front wall 168 is rigidly attached onto the end of the first receptacle inner element side wall 164. The opposite end of the receptacle inner element front wall 168 is rigidly attached onto the end of the second receptacle inner element side wall 166. The receptacle inner element back wall 170 is made from a thin sheet of material and is substantially trapezoidal in shape. The bottom of the receptacle inner element back wall 170 is rigidly attached onto the receptacle inner element bottom interior surface 174. The end of the receptacle inner element back wall 170 is rigidly attached onto the opposite end of the first receptacle inner element side wall 164. The opposite end of the receptacle inner element back wall 170 is rigidly attached onto the opposite end of the second receptacle inner element side wall 166. The receptacle inner element seal 172 is made from flexible material, such as rubber, foam rubber or polyethylene. The receptacle inner element seal 172 is rigidly attached onto the receptacle inner element bottom interior surface 174; at the joint formed where the receptacle inner element front wall 168, the receptacle inner element back wall 170, the first receptacle inner element side wall 164 and the second receptacle inner element side wall 166 are attached to the receptacle inner element bottom interior surface 174; to provide a seal between the receptacle outer element 178 and the receptacle inner element 160 to prevent the odor from the separated soiled litter and animal waste 12 from entering the owner's living space. The receptacle inner element alignment devices 175 are made from material such as wood, plastic, fiberglass, coated cardboard, rubber, other natural materials or other man-made materials and are substantially semicircular in shape. The receptacle inner element alignment devices 175 are rigidly attached onto the centers of the exterior surfaces of the first receptacle inner element side wall 164, the second receptacle inner element side wall 166, the receptacle inner element front wall 168, and the receptacle inner element back wall 170 to align the receptacle inner element 160 inside the receptacle outer element 178 to insure that the receptacle outer element 178 properly mates with the receptacle inner element seal 172.

As seen in FIG. 2, FIG. 4, FIG. 15, FIG. 16 and FIG. 17, the receptacle outer element 178 fits over the receptacle inner element 160 to create a top for the receptacle 32 and has an interference fit with the receptacle inner element seal 172 to prevent the odors from the separated soiled litter and animal waste 12 from escaping from the receptacle inner element 160. As shown in FIG. 1, FIG. 5, FIG. 16, FIG. 18 and FIG. 20A, the top of the receptacle outer element 178 has a recessed area to receive the face plate step 124 when the face plate 30 is in the first face plate position. As shown in FIG. 11, FIG. 17 and FIGS. 20B through 20G, the top of the receptacle outer element 178 receives the face plate disposal chute 136, in the same recessed area, when the face plate 30 is in the second face plate position.

As seen in FIG. 4 and FIG. 15, the receptacle outer element 178 comprises a first receptacle outer element side wall 180, a second receptacle outer element side wall 182, a receptacle outer element front wall 184, a receptacle outer element back wall 186, a receptacle outer element top 188 and a receptacle fastener 194. The receptacle outer element top 188 is made from a thin sheet of material and is substantially Z-shaped to create a recessed area for receiving the face plate step 124, when the face plate 30 is in the first face plate position, and for receiving the face plate disposal chute 136, when the face plate 30 is in the second face plate position. As shown in FIG. 2 and FIG. 15, the receptacle outer element top 188 has a first receptacle outer element top opening 191. The first receptacle outer element top opening 191 is a rectangular opening centered in the recessed area of the receptacle outer element top 188. The receptacle outer element top 188 is curved to allow it to match the curvature of the face plate step 124 and the face plate disposal chute 136. The receptacle outer element front wall 184 is made from a thin sheet of material and is substantially trapezoidal in shape. The top of the receptacle outer element front wall 184 is curved to allow it to match the curvature of the receptacle outer element top 188 and is rigidly attached onto the bottom of the receptacle outer element top 188. The receptacle outer element back wall 186 is made from a thin sheet of material and is substantially trapezoidal in shape. The top of the receptacle outer element back wall 186 is curved to allow it to match the curvature of the receptacle outer element top 188 and is rigidly attached onto the bottom of the receptacle outer element top 188. The first receptacle outer element side wall 180 is made from a thin sheet of material and is substantially rectangular in shape with a rectangular extension on the top front corner to allow the top of the first receptacle outer element side wall 180 to match the shape of the receptacle outer element top 188. The top of the first receptacle outer element side wall 180 is rigidly attached onto the bottom of the receptacle outer element top 188. The end of the first receptacle outer element side wall 180 is rigidly attached onto the end of the receptacle outer element front wall 184 and the opposite end of the first receptacle outer element side wall 180 is rigidly attached onto the end of the receptacle outer element back wall 186. The second receptacle outer element side wall 182 is made from a thin sheet of material and is substantially rectangular in shape with a rectangular extension on the top front corner to allow the top of the second receptacle outer element side wall 182 to match the shape of the receptacle outer element top 188. The top of the second receptacle outer element side wall 182 is rigidly attached onto the bottom of the receptacle outer element top 188. The end of the second receptacle outer element side wall 182 is rigidly attached onto the opposite end of the receptacle outer element front wall 184 and the opposite end of the second receptacle outer element side wall 182 is rigidly attached onto the opposite end of the receptacle outer element back wall 186. The receptacle fastener 194 is rigidly attached to the exterior surface of the receptacle outer element back wall 186. The receptacle fastener 194 cooperates with the front support fastener 122 to removably attach the receptacle 32 to the front support 22. The preferred receptacle fastener 194 is either a small piece of metal that is attracted to a magnet, such as iron or steel, or the second part of a hook and loop fastener.

As shown in FIG. 15, an alternative embodiment of the receptacle includes a second receptacle outer element top opening 193 and a receptacle outer element top insert 192. The second receptacle outer element top opening 193 is a rectangular opening in the receptacle outer element top 188 where the receptacle outer element top 188 is not recessed. The receptacle outer element top insert 192 is made from a thin sheet of transparent material, such as fiberglass or plastic, and is curved to match the curvature of the receptacle outer element top 188. The receptacle outer element top insert 192 is rigidly situated inside the second receptacle outer element top opening 193 in the receptacle outer element top 188. The receptacle outer element top insert 192 allows viewing the inside of the receptacle 32, without having to remove the receptacle 32 from the front support 22 and removing the receptacle outer element 178, to determine if the receptacle 32 should be emptied.

As shown in FIG. 2, FIG. 4, and FIG. 15, the receptacle chute 196 is received inside the first receptacle outer element top opening 191 in the recessed area of the receptacle outer element top 188. As shown in FIG. 16, the receptacle chute 196 aligns with the face plate step 124 when the face plate 30 is in the first face plate position to assist with sealing the receptacle 32 to prevent odors from the separated soiled litter and animal waste 12 from entering the owner's living space. As shown in FIG. 17, the receptacle chute 196 aligns with the face plate disposal chute 136 when the face plate 30 is in the second face plate position to direct the separated soiled litter and animal waste 12 from the interior of the chamber 20 to the receptacle 32.

As shown from FIG. 15, the receptacle chute 196 comprises a receptacle chute top 198, a receptacle chute front 204, a receptacle chute back 206, a first receptacle chute side 200, a second receptacle chute side 202, a first receptacle chute seal 208, a second receptacle chute seal 209 and at least two receptacle chute alignment devices 210. The receptacle chute top 198 is made from a thin sheet of material and is substantially rectangular in shape with a rectangular opening in the center of the receptacle chute top 198. The receptacle chute top 198 is curved to match the curvature of the face plate step 124 and the face plate disposal chute 136. The rectangular opening in the receptacle chute top 198 is sized to mate with the rectangular opening in the face plate disposal chute top 144 of the face plate disposal chute 136. The receptacle chute top 198 has a receptacle chute top interior surface 199 and a receptacle chute top exterior surface 197. The receptacle chute front 204 is made from a thin sheet of material and is substantially rectangular in shape. The top of the receptacle chute front 204 is curved to allow it to match the curvature of the receptacle chute top 198. The receptacle chute front 204 is rigidly attached onto the receptacle chute top interior surface 199, at the point where the rectangular opening in the receptacle chute top 198 occurs, and is perpendicular to the receptacle chute top interior surface 199. The receptacle chute back 206 is made from a thin sheet of material and is substantially rectangular in shape. The top of the receptacle chute back 206 is curved to allow it to match the curvature of the receptacle chute top 198. The receptacle chute back 206 is rigidly attached onto the receptacle chute top interior surface 199, at the point where the rectangular opening in the receptacle chute top 198 occurs, and is perpendicular to the receptacle chute top interior surface 199. The first receptacle chute side 200 is made from a thin sheet of material and is substantially rectangular in shape. The top of the first receptacle chute side 200 is rigidly attached onto the receptacle chute top interior surface 199, at the point where the rectangular opening in the receptacle chute top 198 occurs and is perpendicular to the receptacle chute top interior surface 199. The end of the first receptacle chute side 200 is rigidly attached to the end of the receptacle chute front 204 and the opposite end of the first receptacle chute side 200 is rigidly attached to the end of the receptacle chute back 206. The second receptacle chute side 202 is made from a thin sheet of material and is substantially rectangular in shape. The top of the second receptacle chute side 202 is rigidly attached onto the receptacle chute top interior surface 199, at the point where the rectangular opening in the receptacle chute top 198 occurs and is perpendicular to the receptacle chute top interior surface 199. The end of the second receptacle chute side 202 is rigidly attached to the opposite end of the receptacle chute front 204 and the opposite end of the second receptacle chute side 202 is rigidly attached to the opposite end of the receptacle chute back 206. The first receptacle chute seal 208 is made from flexible material, such as rubber, foam rubber or polyethylene. The first receptacle chute seal 208 is rigidly attached onto the receptacle chute top exterior surface 197. As shown in FIG. 16, the first receptacle chute seal 208 seals against the face plate step base 126, when the face plate 30 is in the first face plate position, to prevent the odor from the separated soiled litter and animal waste 12 from entering the owner's living space. As shown in FIG. 17, the first receptacle chute seal 208 seals against the face plate disposal chute top 144, when the face plate 30 is in the second face plate position, to help direct the separated soiled litter and animal waste 12 from the chamber 20 into the receptacle 32 to avoid spillage of the separated soiled litter and animal waste 12 around the perimeter of the receptacle chute 196 and the face plate disposal chute top 144. The second receptacle chute seal 209 is made from flexible material, such as rubber, foam rubber or polyethylene. The second receptacle chute seal 209 is rigidly attached onto the front and near the bottom of the receptacle chute front 204; onto the front and near the bottom of the first receptacle chute side 200; onto the front and near the bottom of the receptacle chute back 206; and onto the front and near the bottom of the second receptacle chute side 202 to match the curvature of the interior surface of the receptacle outer element top 188. The second receptacle chute seal 209 provides a continuous seal against the interior surface of the receptacle outer element top 188 to assist with preventing the odor from the separated soiled litter and animal waste 12 from entering the owner's living space. The receptacle chute 196 has at least two receptacle chute alignment devices 210 rigidly attached to the receptacle chute top exterior surface 197. The preferred receptacle chute alignment devices 210 are magnets. As shown in FIG. 16, the receptacle chute alignment devices 210 cooperate with the face plate step alignment devices 132 to align the receptacle chute 196 to the face plate step 124, to force the first receptacle chute seal 208 into contact with the bottom of the face plate step base 126 and to force the second receptacle chute seal 209 into contact with the interior surface of the receptacle outer element top 188, when the face plate 30 is in the first face plate position. As shown in FIG. 17, the receptacle chute alignment devices 210 also cooperate with the face plate disposal chute alignment devices 146 to align the receptacle chute 196 to the face plate disposal chute 136, to force the first receptacle chute seal 208 into contact with the top of the face plate disposal chute top 144 and to force the second receptacle chute seal 209 into contact with the interior surface of the receptacle outer element top 188, when the face plate 30 is in the second face plate position. As shown in FIG. 4, at least one receptacle fastener 194 is rigidly attached onto the exterior surface of the receptacle outer element back wall 186 and cooperates with the front support fastener 122 to connect the receptacle 32 to the front support 22. The preferred receptacle fastener 194 is either a small piece of metal, such as iron or steel, to cooperate with a magnet or the second part of a hook and loop fastener to cooperate with the first part of a hook and loop fastener.

FIG. 25A shows another alternative embodiment of the receptacle 32. In this embodiment, the receptacle 32 has a drawer type arrangement that allows access to the inside of the receptacle 32 by pulling the receptacle inner element 160 forward out of the receptacle outer element 178. This allows the receptacle 32 to be cleaned while still attached to the front support 22. In this embodiment, the receptacle inner element 160 comprises a receptacle inner element top 161, a receptacle inner element bottom 162, a receptacle inner element front wall 168, a receptacle inner element back wall 170, a receptacle inner element handle 163, a receptacle inner element attachment device 173, and a plastic bag attachment device 179.

The receptacle inner element front wall 168 is made from a thin sheet of material, is substantially trapezoidal in shape and is of such a size to allow the perimeter of the receptacle inner element front wall 168 to be flush with the outside perimeter of the receptacle outer element 178 when the receptacle inner element 160 is received inside the receptacle outer element 178. The top of the receptacle inner element front wall 168 is curved to allow it to match the curvature of the receptacle outer element top 188. The receptacle inner element handle 163 is made from a thin sheet of material, is rectangular in shape and has a slight curvature to allow the owner to grasp it easily. One edge of the receptacle inner element handle 163 is rigidly attached to the exterior surface of the receptacle inner element front wall 168 such that the receptacle inner element handle 163 is centered on the receptacle inner element front wall 168. The receptacle inner element attachment device 173 is a thin strip of magnetic material that is attached to the interior surface, a short distance from the edge of all four sides, of the receptacle inner element front wall 168. The receptacle inner element bottom 162 is made from a thin sheet of material and is substantially rectangular. The receptacle inner element back wall 170 is made from a thin sheet of material and is substantially trapezoidal and is of a size to be received inside the receptacle outer element 178. One end of the receptacle inner element bottom 162 is rigidly attached to the interior surface of the receptacle inner element front wall 168. The opposite end of the receptacle inner element bottom 162 is rigidly attached to the bottom of the receptacle inner element back wall 170.

The receptacle inner element top 161 comprises a receptacle inner element top support 165 and a plastic bag support element 177. The receptacle inner element top support 165 is made from a thin sheet of material and is substantially rectangular in shape with a rectangular opening. The rectangular opening in the receptacle inner element top support 165 is positioned to align with the first receptacle outer element top opening 191 in the receptacle outer element top 188 to allow the separated soiled litter and animal waste 12 to be received into the receptacle 32. As shown in FIG. 25B, the plastic bag support element 177 is made from a thin sheet of material that is J-shaped where the top of the J-shape is rigidly attached to the exterior surface of the receptacle inner element top support 165, at the point where the rectangular opening in the receptacle inner element top support 165 occurs, and is perpendicular to the exterior surface of the receptacle inner element top support 165. The plastic bag support element 177 is made from materials such as wood, plastic, fiberglass, coated cardboard, rubber, or other natural materials or other man-made materials. One end of receptacle inner element top support 165 is rigidly attached to the interior surface of the receptacle inner element front wall 168. The opposite end of the receptacle inner element top support 165 is rigidly attached to the top of the receptacle inner element back wall 170.

The plastic bag attachment device 179 cooperates with the plastic bag support element 177 to hold the plastic bag 176 in place on the receptacle inner element 160. The plastic bag attachment device 179 comprises four plastic bag holder elements 181, an elastic band 183 and two plastic bag holder element attachment devices 185. The plastic bag holder element 181 is preferably a tube made from materials such as wood, plastic, fiberglass, rubber, or other natural materials or other man-made materials. Each plastic bag holder element 181 is of a length that matches one side of the plastic bag support element 177. The elastic band 183, such as a rubber band, is received inside the plastic bag holder elements 181. The end of the elastic band 183 is attached to the opposite end of the elastic band 183 to create a continuous elastic band 183 and which holds the four plastic bag holder elements 181 together. The plastic bag holder element attachment devices 185 are made from stiff but flexible material such as rubber or plastic. As shown in FIG. 25A, the preferred plastic bag holder element attachment devices 185 are short, cylindrical shaped pieces of plastic. One of the plastic bag holder element attachment devices 185 has one end attached to the interior surface of the receptacle inner element front wall 168, just above where the receptacle inner element top support 165 is attached to the receptacle inner element front wall 168, and the opposite end is attached to the exterior surface of one of the plastic bag holder elements 181, near the end of the plastic bag holder elements 181. The other plastic bag holder element attachment device 185 also has one end attached to the interior surface of the receptacle inner element front wall 168 and the opposite end attached to the exterior surface of the same plastic bag holder elements 181, near the opposite end of the plastic bag holder elements 181. The pair of plastic bag holder element attachment devices 185 connects the combination of the four plastic bag holder elements 181 and the elastic band 183 to the receptacle inner element front wall 168 to hold the plastic bag attachment device 179 in place during the changing of the plastic bag 176.

Figure 25C:
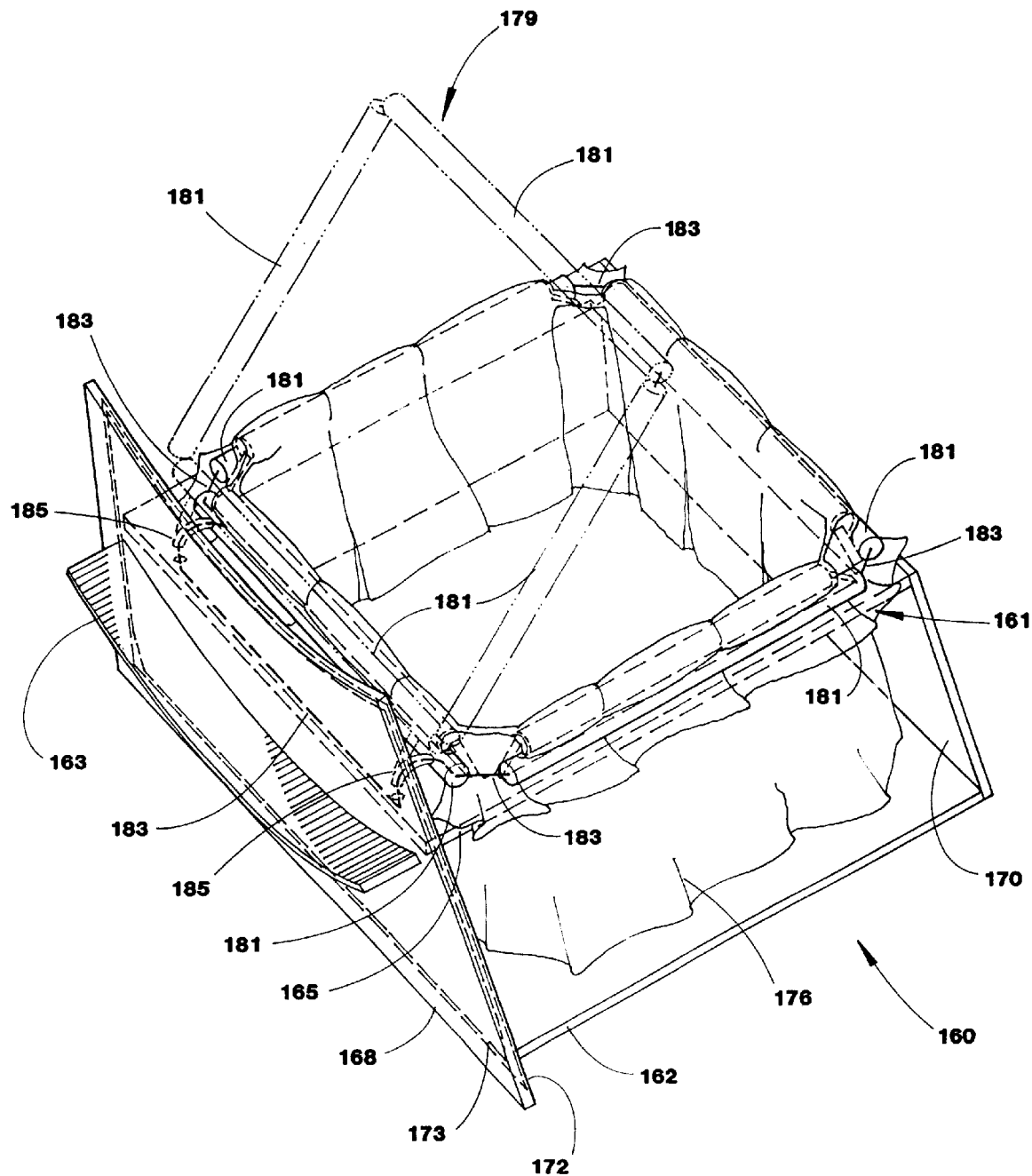
FIG. 25C is a perspective view of an alternate plastic bag attachment device used with the alternate embodiment of the receptacle shown in FIG. 25A.

An alternative embodiment of the plastic bag attachment device 179 is shown in FIG. 25C. In this embodiment the plastic bag holder element attachment devices 185 are tubes. One end of the plastic bag holder element attachment device 185 is attached to one of the four plastic bag holder elements 181 and the other end of the plastic bag holder element attachment device 185 is attached to the exterior surface of the receptacle inner element top support 165 near the receptacle inner element front wall 168. There are openings in the plastic bag holder elements 181 and in the receptacle inner element top support 165 at the location where the plastic bag holder element attachment devices 185 are attached. These openings are slightly smaller than the internal diameter of the plastic bag holder element attachment devices 185. As shown in FIG. 25C, the elastic band 183 is threaded through one of the openings in the receptacle inner element top support 165, one of the plastic bag holder element attachment devices 185, through one of the openings in one of the plastic bag holder elements 181, through all four of the plastic bag holder elements 181, through the other opening in the plastic bag holder element 181, through the other plastic bag holder element attachment devices 185, and through the other opening in the receptacle inner element top support 165 where the ends of the elastic band 183 are connected together. This allows access to the elastic band 183 and the elastic band 183 holds the four plastic bag holder elements 181, the two plastic bag holder element attachment devices 185 and the receptacle inner element top support 165 together to facilitate the changing of the plastic bag 176.

Before the device 10 is placed into use with the alternate receptacle 32 shown in FIG. 25A and FIG. 25C, the receptacle 32 is opened by pulling the receptacle inner element 160 out of the receptacle outer element 178. A plastic bag 176 is inserted into the rectangular opening in the receptacle inner element top support 165 with the edge of the plastic bag 176 laying over the exterior surface of the receptacle inner element top support 165. The owner places the four plastic bag holder elements 181 over the plastic bag 176 and forces the plastic bag holder elements 181 underneath the curved part of the J-shaped plastic bag support element 177 by stretching the elastic band 183 inside the plastic bag holder elements 181 and slipping the plastic bag holder elements 181 over the plastic bag support element 177 to hold the plastic bag 176 in place. The plastic bag 176 is held in place by the pressure of the plastic bag holder elements 181 against the plastic bag support element 177 due to the force of the elastic band 183 against the inside of the plastic bag holder elements 181. When the plastic bag 176 is full, the owner forces the plastic bag holder elements 181 from underneath the curved part of the plastic bag support element 177 by stretching the elastic band 183 and slipping the plastic bag holder elements 181 off the receptacle inner element top 161. This releases the plastic bag 176 from the receptacle inner element 160 and allows the plastic bag 176 to be removed from the receptacle inner element 160.

The alternative embodiment of the receptacle 32 shown in FIG. 25A and FIG. 25C also includes a receptacle outer element 178 that has a first receptacle outer element side wall 180, a second receptacle outer element side wall 182, a receptacle outer element front wall 184, a receptacle outer element back wall 186, a first receptacle outer element guide 187, a receptacle outer element top 188, a second receptacle outer element guide 189, and a receptacle outer element bottom 190. The first receptacle outer element side wall 180, the second receptacle outer element side wall 182, the receptacle outer element back wall 186, and the receptacle outer element top 188 used in this alternate embodiment of the receptacle 32 are identical to the ones used in the receptacle 32 shown in FIG. 15 and discussed above.

The receptacle outer element front wall 184 in this embodiment of the receptacle 32 is made from a thin sheet of material, is substantially trapezoidal in shape and has a trapezoidal opening centered in the receptacle outer element front wall 184 that is large enough to allow the receptacle inner element 160 to slide into the receptacle outer element 178. The top of the receptacle outer element front wall 184 is curved to allow it to match the curvature of the receptacle outer element top 188. The top of the receptacle outer element front wall 184 is rigidly attached to the interior surface of the receptacle outer element top 188, the side of the receptacle outer element front wall 184 is rigidly attached to the interior surface of the first receptacle outer element side wall 180, the opposite side of the receptacle outer element front wall 184 is rigidly attached to the interior surface of the second receptacle outer element side wall 182 and the bottom inside edge of the receptacle outer element front wall 184 is rigidly attached to the front edge of the receptacle outer element bottom 190. The receptacle outer element front wall 184 is recessed into the interior of the receptacle outer element 178 a sufficient distance to allow the perimeter of the receptacle inner element front wall 168 to be flush with the outside perimeter of the receptacle outer element 178, when the receptacle inner element 160 is inserted into the receptacle outer element 178. The receptacle outer element front wall 184 is made from metal that is attracted to magnetic material, such as iron or steel. The receptacle outer element front wall 184 cooperates with the receptacle inner element attachment device 173 to provide a continuous seal and to firmly hold the receptacle inner element 160 into the receptacle outer element 178 when the receptacle 32 is storing separated soiled litter and animal waste 12, or when the receptacle 32 is receiving additional separated soiled litter and animal waste 12 from the chamber 20.

The receptacle outer element bottom 190 is made from a thin sheet of material and is substantially rectangular in shape. The side of the receptacle outer element bottom 190 is rigidly attached near the bottom of the first receptacle outer element side wall 180, the opposite side of the receptacle outer element bottom 190 is rigidly attached near the bottom of the second receptacle outer element side wall 182, and the rear of the receptacle outer element bottom 190 is rigidly attached near the bottom of the receptacle outer element back wall 186.

As shown in FIG. 25A and FIG. 25B, the receptacle outer element 178 has a first receptacle outer element guide 187 and a second receptacle outer element guide 189. The first receptacle outer element guide 187 is made from a sheet of material that is shaped like a right triangle and is made from materials such as wood, plastic, fiberglass, rubber, or other natural materials or other man-made materials. The top of the first receptacle outer element guide 187 (hypotenuse of the right triangle) is rigidly attached to the interior of the first receptacle outer element side wall 180 and the side of the first receptacle outer element guide 187 (opposite side of the right triangle) is rigidly attached to the interior of the receptacle outer element bottom 190. The second receptacle outer element guide 189 is made from a sheet of material that is shaped like a right triangle and is made from materials such as wood, plastic, fiberglass, rubber, or other natural materials or other man-made materials. The top of the second receptacle outer element guide 189 (hypotenuse of the right triangle) is rigidly attached to the interior of the second receptacle outer element side wall 182 and the side of the second receptacle outer element guide 189 (opposite side of the right triangle) is rigidly attached to the interior of the receptacle outer element bottom 190. The first receptacle outer element guide 187 and the second receptacle outer element guide 189 come into contact with edges of the receptacle inner element bottom 162 to guide the receptacle inner element 160 into the receptacle outer element 178 when the receptacle inner element 160 is being inserted into the receptacle outer element 178 to align the plastic bag with the first receptacle outer element top opening 191.

Figure 26A:
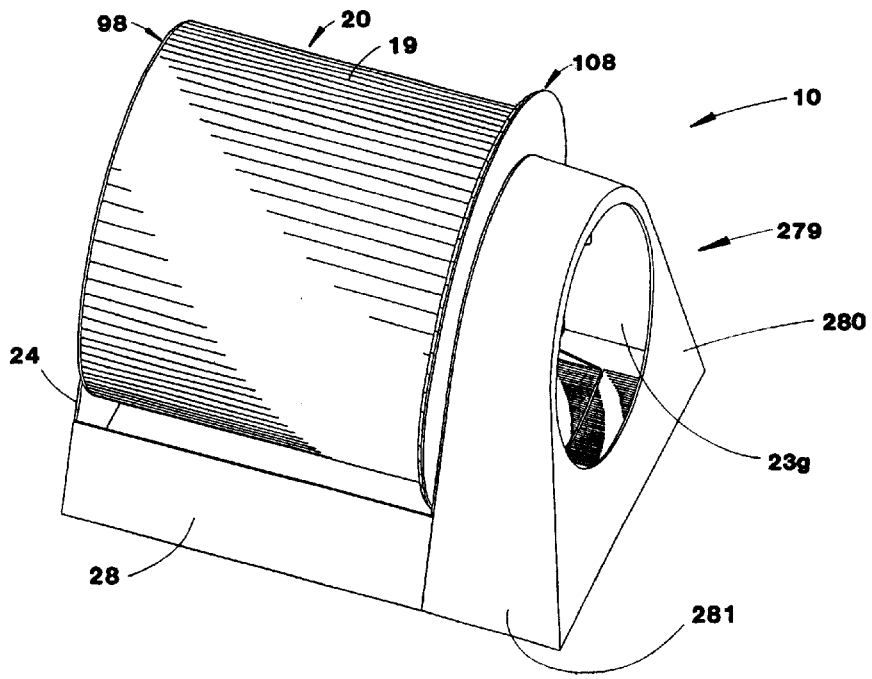
FIG. 26A is a front perspective view of another alternative embodiment of the invention with a receptacle cover in the closed position.
Figure 26B:
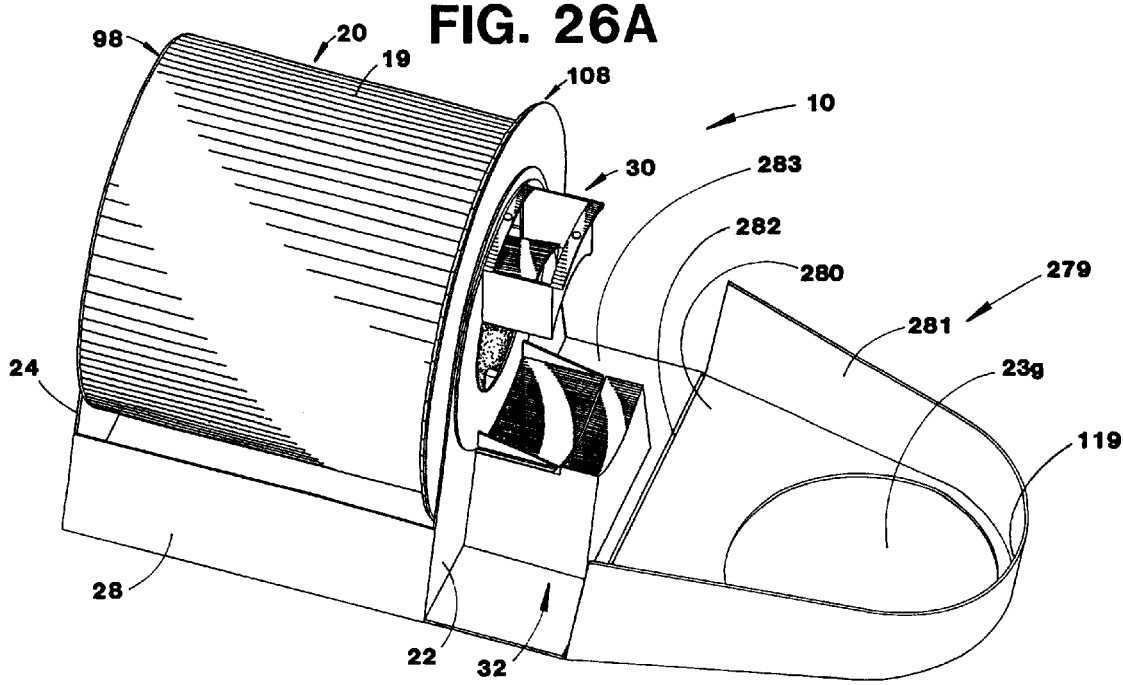
FIG. 26B is a front perspective view of the invention shown in FIG. 26A with a receptacle cover in the open position.

As shown in FIG. 26A and FIG. 26B, another embodiment of the invention includes a receptacle cover 279 that is attached to the bottom of the front support 22 to provide a more appealing appearance by concealing the receptacle 32 and the face plate 30, to conceal the movement of the face plate 30, to provide storage for plastic bags 176 for the receptacle 32 and to provide storage for new litter 11. FIG. 26A shows the receptacle cover 279 in the closed position. FIG. 26B shows the receptacle cover 279 in the open position. The receptacle cover 279 has a receptacle cover front 280, a receptacle cover surface segment 281, a receptacle cover hinge 282, a receptacle cover bottom 283 and a pair of cover alignment devices 119. The receptacle cover front 280 is made from a thin sheet of material and is substantially parabolic in shape where the parallel plane creates the bottom of the receptacle cover front 280 and the curved area creates the top of the receptacle cover front 280 with a receptacle cover opening 23g. The receptacle cover opening 23g is a circular opening in the receptacle cover front 280 and is substantially coincident with the axis of rotation of the chamber 20 to allow for entry into the chamber 20 and for exit from the chamber 20. The receptacle cover front 280 is approximately the same size as the front support 22.

The receptacle cover surface segment 281 is made from a thin sheet of material and is parabolic in shape to form the outer surface of the receptacle cover 279. One edge of the receptacle cover surface segment 281 is attached to the edge of the receptacle cover front 280. The opposite edge of the receptacle cover surface 281 mates with the edge of the front support 22.

As shown in FIG. 26B, the receptacle cover bottom 283 is made from a thin sheet of material and is substantially rectangular in shape. The receptacle cover bottom 283 is positioned underneath the receptacle 32. The front of the receptacle cover bottom 283 is attached to the bottom of the front support 22. The back of the receptacle cover bottom 283 is attached to one side of the receptacle cover hinge 282. The opposite side of the receptacle cover hinge 282 is attached to the bottom of the receptacle cover front 280. The receptacle cover hinge 282 allows the receptacle cover front 280 and the receptacle cover surface segment 281 to rotate forward to allow access to the face plate 30 and to the receptacle 32 when additional clean litter 11 needs to be added to the chamber 20 or when the owner needs access to the receptacle 32 to dispose of the separated soiled litter and animal waste 12.

In yet another embodiment of the invention, plastic curtains, not shown in drawings, are placed over the receptacle cover opening 23g to close the receptacle cover opening 23g to allow the animal to enter and exit the chamber 20 while preventing clean litter 11 and soiled litter and animal waste 12 from being kicked out of the chamber 20 through the receptacle cover opening 23g.

Figure 18:
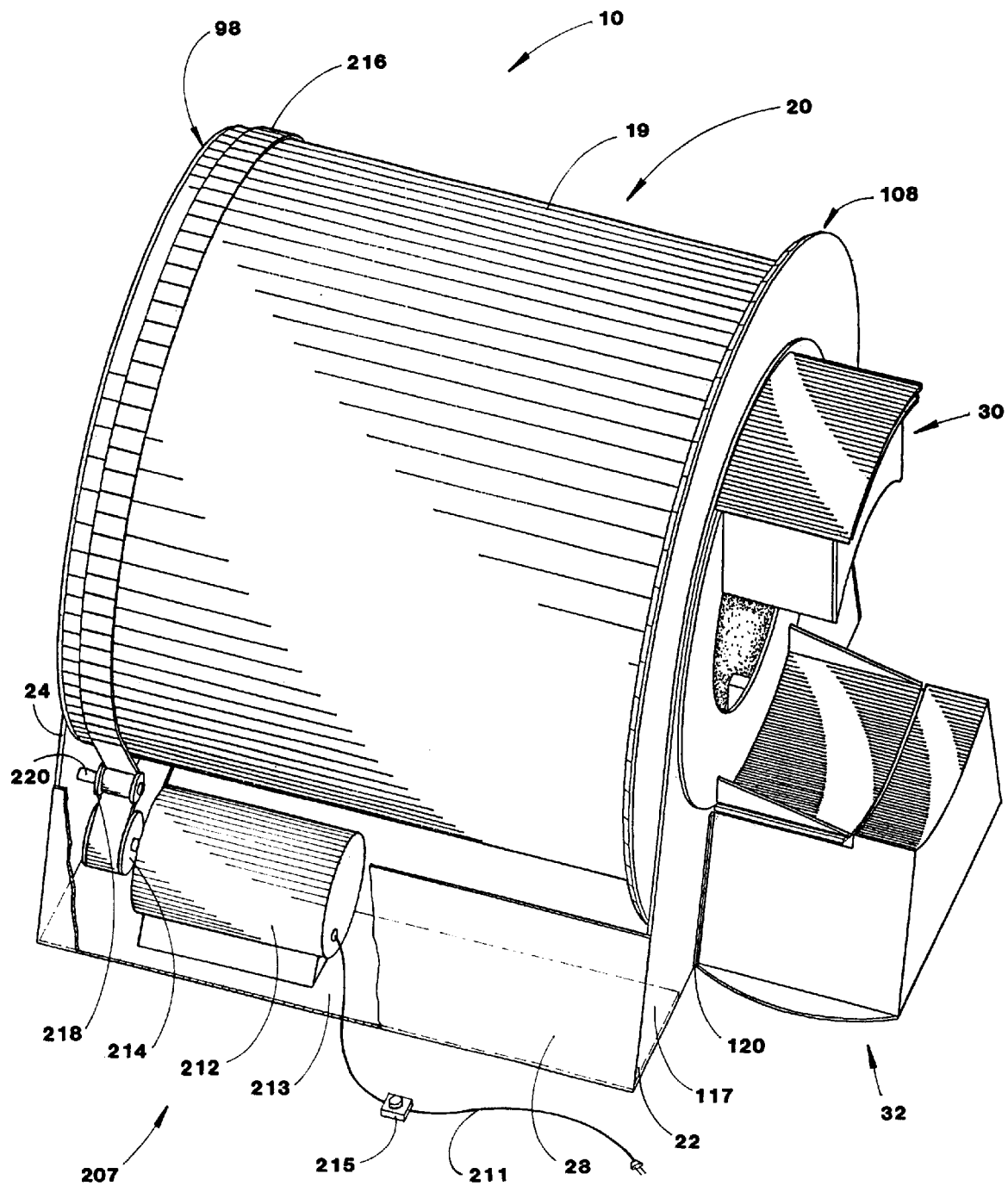
FIG. 18 is a perspective view of another embodiment of the invention with a motor and belt drive system.

As an alternative to manually rotating the chamber 20 as discussed above, the chamber 20 can be rotated by a means for rotating the chamber 207. FIG. 18 shows one such means for rotating the chamber 207 which comprises a motor 212, a motor support base 213, a motor pulley 214, a belt 216, a belt tensioner 218 and a belt tensioner support element 220. The belt 216 is circumferentially disposed around the outside of the surface segment 19 of the chamber 20. The belt 216 engages the motor pulley 214 which is driven by the motor 212. The motor 212 is attached to the support base 21 by the motor support base 213. The belt tensioner 218, which is attached to the support base 21 by the belt tensioner support element 220, is provided to assure that the belt 216 does not slip on the motor pulley 214. Power to the motor 212 is provided through a switch 215 disposed within a power supply line 211 which is interconnected to a power source. When the switch 215 is turned to the on position, electricity flows into the motor 212 and the motor 212 starts turning. The motor 212 then turns the motor pulley 214 which engages the belt 216 and starts moving the belt 216. As the belt 216 moves, it rotates the chamber 20. The chamber 20 continues to rotate until the switch 215 is turned to the off position and the electricity stops flowing to the motor 212. The switch 215 is manually turned to the on position and to the off position by the owner. The motor 212 may be either an alternating current (A.C.) or a direct current (D.C.) motor. Other means for rotating the chamber 207 may be employed to rotate the chamber 20 such as: (1) friction wheel system, shown in FIG. 31, where a friction wheel 346 is attached to the motor 212; where the motor 212 is attached to the motor support base 213 which is spring loaded to force the motor 212 and the friction wheel 346 against the exterior surface of the chamber 20; and where the exterior surface of the chamber 20 has a friction strip 348 that is made from rough material; such that as the motor 212 turns, the friction wheel 346 turns, the friction wheel 346 grips the friction strip 348 on the exterior surface of the chamber 20 and turns the chamber 20; (2) a gear system where the chamber 20 has teeth on the exterior of the chamber 20 that fit inside a gear driven by the motor 212 so that when the motor turns, the gear cooperates with the teeth to rotate the chamber 20; or (3) a chain and sprocket system where the chamber 20 and motor 212 have sprockets connected by a chain such that when the motor 212 rotates the sprocket attached to the motor, it forces the chain to move, and the chain forces the sprocket on the chamber 20 to rotate, which rotates the chamber 20.

Figures 30A, 30B:
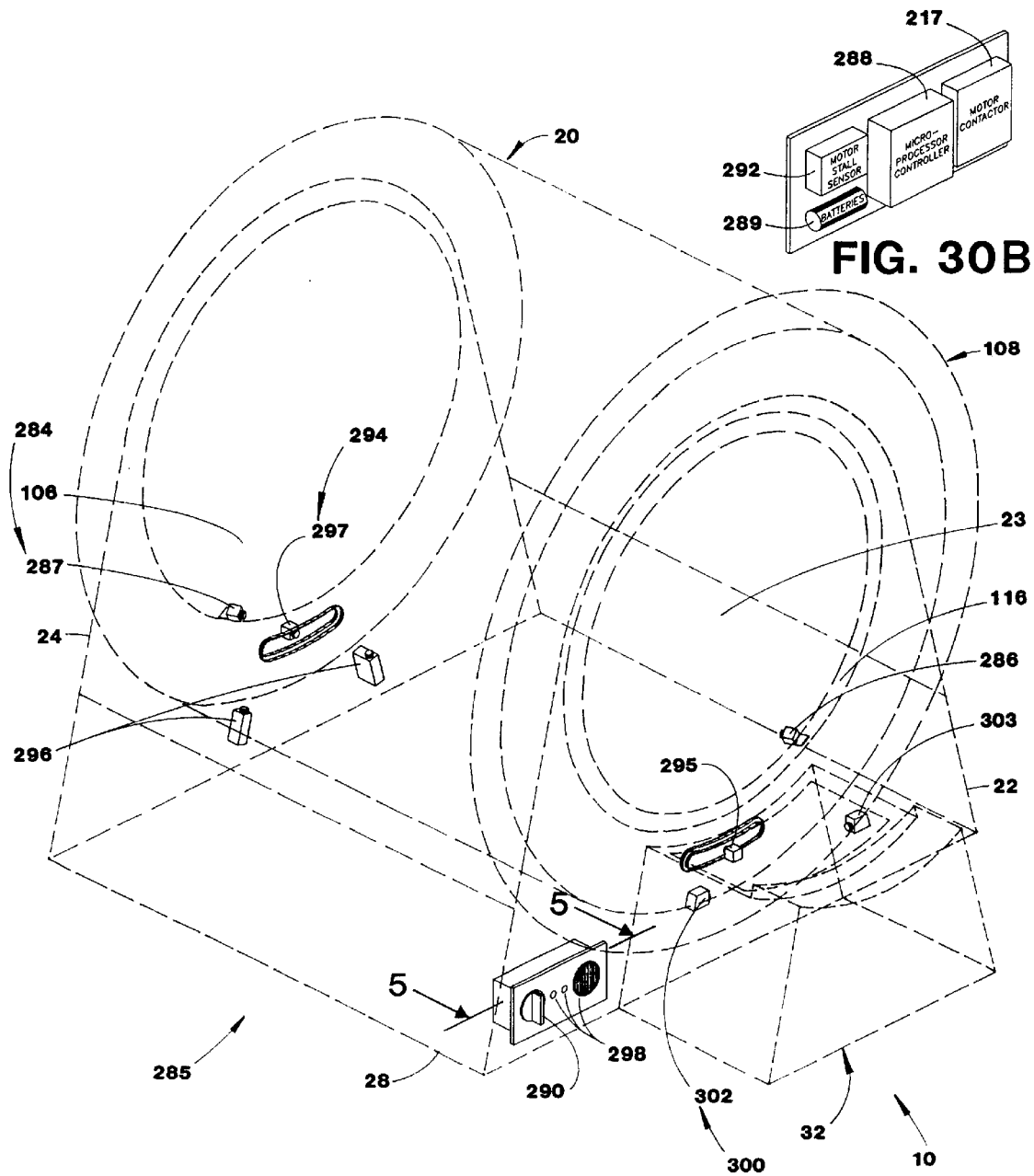
FIG. 30A is a front perspective view showing the locations of the controls and sensors for the fully automated, self-cleaning litter box for the invention of FIG. 27.
FIG. 30B is a perspective view showing the controls for the fully automated, self-cleaning litter box for the invention of FIG. 27 taken along a line 5—5 in FIG. 30A.

An alternative embodiment of the invention provides the addition of a means to control the means for rotating the chamber 285 to make the device 10 into a fully automated self-cleaning litter box. FIG. 30A shows the location of one set of control devices that could be used in the means to control the means for rotating the chamber 285 to fully automate the self-cleaning litter box. In this embodiment, the invention further comprises a chamber sensor 284 to sense the exit of an animal from the chamber 20. The chamber sensor 284 comprises a chamber detector 287 and a chamber radiation source 286. In the preferred embodiment as shown in FIG. 30A, the chamber detector 287 is mounted on the rear bearing retainer 106 and the chamber radiation source 286 is mounted on the front bearing retainer 116, above a fill level of the clean litter 11 in the chamber 20. One type of chamber detector 287 is a conventional photodetector and one type of chamber radiation source 286 is a light source where the chamber detector 287 receives a light beam from the chamber radiation source 286.

Figure 27:
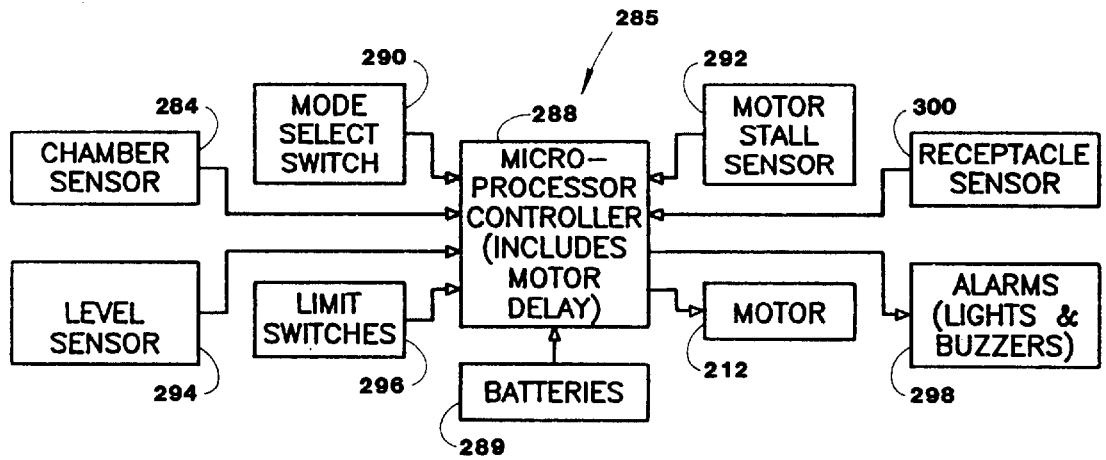
FIG. 27 is a block diagram of the drive and control systems for another embodiment of the invention as a fully automated self-cleaning litter box.

A block diagram for the operating circuit of this embodiment of the invention is presented in FIG. 27. As shown therein, the motor 212 is energized by a power source controlled by a pre-programmed, micro-processor controller 288. The micro-processor controller 288 receives input signals from chamber sensor 284. Additional inputs to the micro-processor controller 288 may be supplied by a mode select switch 290, and a motor stall sensor 292. Limit switches 296 may be provided to detect different positions of the chamber 20. A receptacle sensor 300 may be installed to detect when the separated soiled litter and animal waste 12 exceeds the receptacle 32 full level. The receptacle sensor 300 comprises a receptacle detector 303 and a receptacle radiation source 302. In the preferred embodiment as shown in FIG. 30A, the receptacle detector 303 and the receptacle radiation source 302 are mounted on the inside the receptacle outer element 178, above a full level of the receptacle inner element 160. One type of receptacle detector 303 is a conventional photodetector and one type of receptacle radiation source 302 is a light source where the receptacle detector 303 receives a light beam from the receptacle radiation source 302. Also, a level sensor 294 may be installed to detect when the litter level falls below the fill level of the chamber 20 and additional clean litter 11 needs to be added to the chamber 20. The level sensor 294 comprises a level detector 297 and a level radiation source 295. In the preferred embodiment as shown in FIG. 30A, the level detector 297 and the level radiation source 295 are mounted on the outside of the chamber 20 just below the fill level of the clean litter 11 in the chamber 20. One type of level detector 297 is a conventional photodetector and one type of level radiation source 295 is a light source, where the photodetector receives a light beam from the light source. One or more alarm devices 298, such as a buzzer or light, are included in the circuit so that the animal's owner can be signaled when the litter box is functional or when other conditions occur, such as an insufficient litter supply in the chamber 20 or a motor 212 failure or a full receptacle 32. Circuit components 288–292 and alarm devices 298 may all be packaged in the same housing as shown in FIG. 30B. The chamber sensor 284 can be incorporated inside the chamber 20 in appropriate positions as desired. The level sensor 294 can be incorporated outside the chamber 20 in appropriate positions as desired. The receptacle sensor 300 can be incorporated in the receptacle 32 in appropriate positions as desired to determine when the separated larger sized objects, such as soiled litter and animal waste 12, received by the receptacle exceed the given receptacle full level.

In considering operation of the fully automated self-cleaning device 10 of FIG. 30A, the best starting point is when the device 10 is in its stationary mode, which is applicable most of the time. In this embodiment of the invention, the face plate 30 has the additional elements of a first face plate rotation element 266 and a second face plate rotation element 268; and the front assembly 108 has the additional elements of a front assembly engaging device 270, a front assembly engaging device tripping element 276 and a front assembly engaging device guide 278 as shown in FIG. 21, FIG. 22 and FIG. 23. The face plate 30 is in the first face plate position and the position of the separating means 35 is on the right side at approximately ninety degrees, with zero degrees being at the center of the top of the chamber 20 when looking at the front of the chamber 20. The motor 212 is shut off, but is set for counter-clockwise rotation of the chamber 20. The chamber 20 is filled with litter. The chamber detector 287, on the rear bearing retainer 106, receives beams from the chamber radiation source 286, on the front bearing retainer 116 (see FIG. 30A). With no animal present in the litter box, reception of the beams by the chamber detector 287 is unimpeded. All other mechanisms are in the stationary mode position. The receptacle 32 is covered and sealed by the face plate step 126. The receptacle detector 303 receives beams from the receptacle radiation source 302 which indicates that the receptacle is ready to receive additional soiled litter and animal waste 12.

At this juncture, it may be assumed that an animal (not illustrated) enters the chamber 20 for the purpose of elimination of either liquid or solid waste. With some kinds of litter, the urine from the animal creates a clump in the litter with which the bottom portion of chamber 20 is filled. For solid elimination, the clump is formed by the waste itself. In either instance, the animal is likely to bury the waste or to cover it with other litter. Thus, soiled litter and animal waste 12 are produced by the animal, and are located at some level in the litter above the bottom of the chamber 20. It is assumed that the device 10 has previously been used and that previously deposited soiled litter and animal waste 12 are already present in the receptacle 32.

While the animal is present in the chamber 20, the beams from the chamber radiation source 286 to the chamber detector 287 is cut off. Subsequently, when the animal leaves the chamber 20, the beams from the chamber radiation source 286 again is received by the chamber detector 287. Accordingly, an output signal from the chamber sensor 284 is supplied to the micro-processor controller 288 (FIG. 27). At this point, there still is no actuation of a self-cleaning operation in device 10. The reason for the delay is that the animal might return to the chamber 20, deciding that its elimination activities have not been completed. In these circumstances, the beams from the chamber radiation source 286 to the chamber detector 287 are again cut off and the preset delay interval for actuation of a self-cleaning operation is reset.

Ultimately, the animal leaves chamber 20 for an interval long enough to exceed the preset time delay that is programmed into the micro-processor controller 288. The time interval is expected to be in the range of two to ten minutes. The self-cleaning operation, carried out by the rotation of the chamber 20, should not be initiated while the animal is in the immediate vicinity because it is undesirable to cause the animal to have reason to be afraid of the device 10 and is the reason for the time delay.

After the animal has left the chamber 20 for a time exceeding the programmed delay interval in the micro-processor controller 288, as shown in FIG. 27, the motor 212 is energized by a power source controlled by the micro-processor controller 288. As a consequence, the motor pulley 214 and the belt 216 are rotated, which rotates the chamber 20 in a counter-clockwise rotation. The first rotation of the chamber 20 moves the face plate 30 from its first face plate position to its second face plate position and moves the separating means 35 through the clean litter 11 and the soiled litter and animal waste 12 to separate the soiled litter and animal waste 12. The second rotation of the chamber 20 allows the separated soiled litter and animal waste 12 to move from the separating means 35 onto the ramp 34. The weight of the separated soiled litter and animal waste 12 cause the ramp 34 to pivot downward, which allows the ramp 34 to mate with the short ramp 36 of the face plate 30. The soiled litter and animal waste 12 then slide down the ramp 34 and the short ramp 36, out of the chamber 20, and into the receptacle 32. The last half of the second rotation of the chamber 20 also moves the face plate 30 from the second face plate position back to the first face plate position. The chamber 20 is rotated counter-clockwise a total of 2$\frac{1}{12}$ turns before the motor 212 is de-energized by one of the limit switches 296. The chamber 20 is then rotated $\frac{1}{12}$ of a turn in the clockwise direction to level the clean litter 11 in the chamber 20 and the motor 212 is de-energized by another limit switch 296. The soiled litter and animal waste 12 from the chamber 20 is totally enclosed in the receptacle 32. The chamber 20 is now in the stationary mode and ready for the animal to use the device 10 again. The resulting output signals from the limit switches 296 to the micro-processor controller 288 (FIG. 27) stop the motor 212, reverses the motor 212 and stop the motor 212 a second time such that the chamber 20 stops in the "home" or stationary mode shown in FIG. 1.

Figure 28:
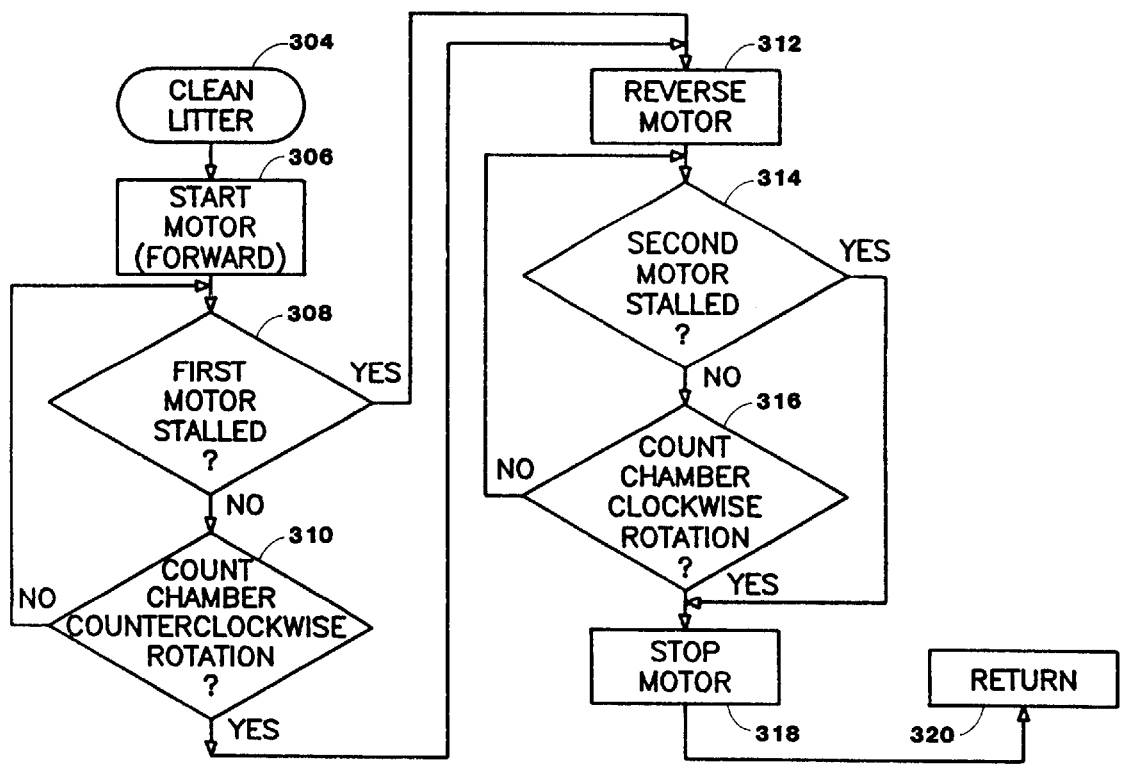
FIG. 28 is a flow chart of the operation for the embodiment of the invention as the fully automated, self-cleaning litter box shown in FIG. 27.

FIG. 28 is a flow chart illustrating a subroutine programmed into the micro-processor controller 288 (FIG. 27) for a self-cleaning operation in this embodiment of the device 10. The flow chart starts with a clean litter command 304 supplied to the micro-processor controller 288 as a result of the animal activating the chamber sensor 284. As a consequence, a start command is supplied to the motor 212 in a start motor step 306 of the subroutine. In a first motor stalled step 308, if the motor 212 is stalled, that condition is sensed and there is an output command to a subsequent reverse motor step 312 to reverse the direction of the motor 212. Ordinarily, however, the motor 212 will not be stalled and a count chamber counter-clockwise rotation step 310 counts the rotations of the chamber 20 by sensing output signals from the limit switches 296 to determine when 2$\frac{1}{12}$ rotations of the chamber 20 have been completed. If there are no output signals from the limit switches 296, there is a feedback command back to the first motor stalled step 308. If the chamber 20 has completed 2½ counter-clockwise rotations, the output from the count chamber counter-clockwise rotation step 310 of the subroutine, illustrated in the flow chart FIG. 28, is applied to the reverse motor step 312. When the reverse motor step 312 command has been sent to the motor 212 and the motor 212 has been reversed, the condition of the motor 212 is again checked to see if it is stalled by a second motor stalled step 314. If the motor 212 does stall, there is an output signal to a subsequent stop motor step 318. Ordinarily, the motor 212 will not be stalled and the count chamber clockwise rotation step 316 of the flow chart receives an enabling signal to check and see if the chamber 20 has rotated $\frac{1}{12}$ of a rotation to its "home" position. If not, a feedback signal is supplied to the second motor stalled step 314. When chamber 20 reaches its "home" position, as determined from the output signals of the limit switches 296, an output signal from the count chamber clockwise rotation step 316 is supplied to a stop motor step 318. Then, the stop motor step 318 supplies an output signal to a return step 320. This completes the subroutine of FIG. 28.

Figure 29:
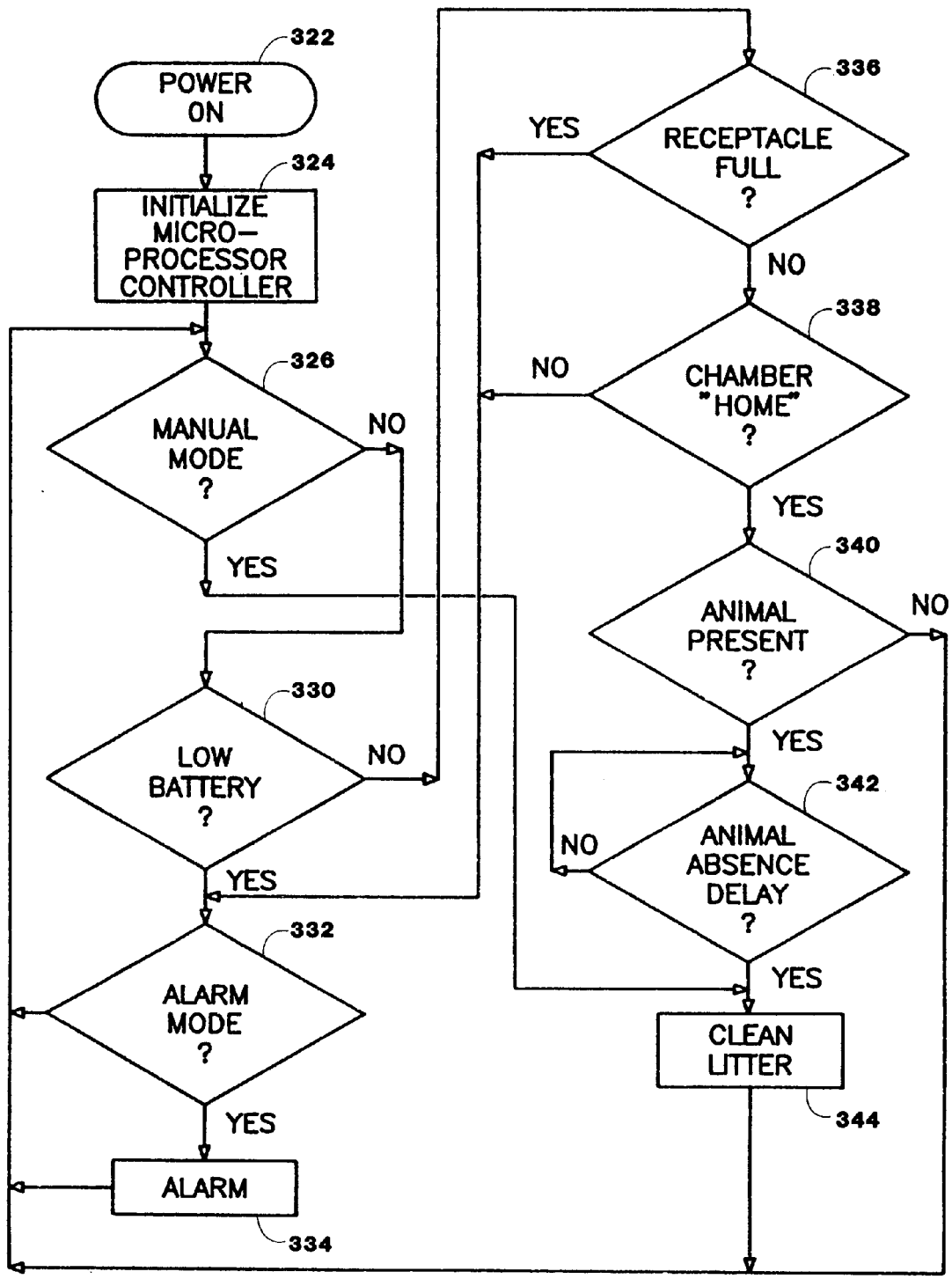
FIG. 29 is a detailed flow chart illustrating optional modes of operation for the controls of the embodiment of the invention as a fully automated, self-cleaning litter box of FIG. 27.

FIG. 29 illustrates a further subroutine that is also programmed into the micro-processor controller 288 (FIG. 27). It starts with a power-on step 322 that may be initiated by a power select switch (not shown) or may start simply with insertion of appropriate batteries 289 into a battery case shown in FIG. 30B. The initialize micro-processor controller step 324 in this subroutine initializes the micro-processor controller 288. Once the micro-processor controller 288 is initialized, it checks to determine whether the mode select switch 290 of FIG. 27 is set for manual mode. If the mode select switch 290 has been moved to select the manual mode operation of the device 10, the output from the mode select switch 290 is received and causes the manual mode step 326 to send a YES output to the clean litter step 344. Then, the cleaning cycle is initiated by the clean litter command 304 of the subroutine of FIG. 28. Once the chamber 20 has completed the cleaning cycle, the return step 320 provides a feedback output back to the subroutine manual mode step 326. As long as the manual mode step 326 is maintained, self-cleaning of the device 10 is continued on a cyclical basis. This may be desirable when the person using the device 10 wants to make sure that all soiled litter and animal waste 12 have been removed from the clean litter 11 in the chamber 20 before adding more clean litter 11 to the device 10.

If the mode select switch 290 is set for automatic mode this output is received and a NO output from the manual mode step 326 goes to the low battery step 330 in the subroutine of FIG. 29 to check the condition of the batteries 289 that supply power to the micro-processor controller 288. If a low battery voltage condition is ascertained, there is a YES output from low battery step 330 to an alarm mode step 332. If the alarm mode step 332 is set for audible alarm, then the alarm mode step 332 actuates the alarm step 334 to produce a programmed output from the buzzer alarm device 298, see FIG. 27, that alerts the user of device 10 that a change of batteries 289 is required. If the alarm mode step 332 is set for visual alarm, then the alarm mode step 332 actuates the alarm step 334 to produce a programmed output from the indicator light alarm device 298, see FIG. 27, that alerts the user of device 10 that a change of batteries 289 is required, outputs from the alarm mode step 332 and the alarm step 334 may be fed back to the manual mode step 326 in this subroutine in appropriate circumstances. Ordinarily, however, when the voltages of the batteries 289 are adequate, there is a NO output from the low battery step 330 and it is supplied to a receptacle full step 336 that determines whether the receptacle 32, shown in FIG. 1, is full. Ordinarily, the receptacle 32 will not be full. But if the receptacle 32 is full, the receptacle sensor 300 will provide a signal that will cause the receptacle full step 336 to send a YES output to the alarm mode step 332. If the alarm mode step 332 is set for audible alarm, then the alarm mode step 332 actuates the alarm step 334 to produce a programmed output from the buzzer alarm device 298, as shown in FIG. 27, that alerts the user of device 10 that the receptacle is full and needs to be emptied, and prevents the chamber 20 from going into a self-cleaning cycle. If the alarm mode step 332 is set for visual alarm, then the alarm mode step 332 actuates the alarm step 334 to produce a programmed output from the indicator lights alarm devices 298 (FIG. 27) that alerts the user of device 10 that the receptacle is full and needs to be emptied, and prevents the chamber 20 from going into a self-cleaning cycle.

In normal circumstances, with adequate room in the receptacle 32, there is a NO output from receptacle full step 336 that is applied to a chamber "home" step 338 in the subroutine of FIG. 29. The normal NO output from the receptacle full step 336 goes to the chamber "home" step 338 for the micro-processor controller 288 to determine whether the chamber 20 of the fully automatic self-cleaning device 10 is at its "home" position or stationary position as shown in FIG. 1. The YES output of the chamber "home" step 338 is applied to a animal present step 340 that determines whether an animal is present in the chamber 20 from the output signals from the chamber sensor 284. If an animal is present, there is a YES output from the animal present step 340 to an animal absence delay step 342 in the program for this subroutine. When the animal leaves the chamber 20, a YES output from the animal absence delay step 342, after the appropriate time delay, in the range of two to ten minutes, is supplied to a clean litter step 344 that is the last stage in this subroutine. The clean litter step 344 is the source of the clean litter command 304 of FIG. 28. As shown in the flow chart of FIG. 29, the NO outputs from the chamber "home" step 338 or the YES output from the receptacle full step 336 results in a signal to the alarm mode step 332. The NO output from the animal present step 340 result in a feedback signal to the manual mode step 326. The output from the clean litter step 344 at the end of the subroutine is also a feedback signal to the manual mode step 326.

The fully automated self-cleaning device 10 does not frighten or disturb an animal. The self-cleaning movement of the chamber 20 does not occur until there is a reasonable certainty that an animal using the device 10 has been gone from the chamber 20 for two to ten minutes, depending on the delay set into the micro-processor controller 288.

Other sensors can be used instead of the photodetector for the chamber detector 287, the level detector 297 and the receptacle detector 303 and the light source for the chamber radiation source 286, the level radiation source 295 and the receptacle radiation source 302. For example, an infra red detector receiving radiation from an appropriate I-R source; a strain gauge on the bottom of the face plate step base 126 or the bottom of chamber 20 or the bottom of the receptacle 32; or a motion detector and a source to detect the movement of the animal when inside the chamber 20 could serve the same purpose as the photodetector and the light source discussed above. Multiple sensors may also be used to detect the presence of the animal in the chamber 20, to determine the level of the clean litter 11 and to determine the level of the separated soiled litter and animal wastes 12 instead of the single sensor system described above. Also, a combination of different types of sensors may be used to detect the presence of the animal in the chamber 20, to determine the level of the clean litter 11 and to determine the level of the separated soiled litter and animal wastes 12.

The drive system that rotates the chamber 20 is not subject to fouling by the litter, which often includes powdery material that is likely to interfere with operation of other drive mechanisms of other litter boxes, because the drive system is situated outside the chamber 20. Device 10 is simple and economical in construction, but should afford an extended operating life with little or no attention apart from periodic replacement of the litter and replacement of the batteries.

With respect to the above description, the scope of the invention shall include variations in size, material, shape, form, function and manner of operation, assembly and use, and other variations that are deemed readily apparent and obvious to one skilled in the art. All equivalent relationships to those illustrated in the drawings and described in the specifications are also intended to be encompassed by the present invention.

The above description, related drawings and discussions are merely meant to be illustrative of particular embodiments of the invention and are not limitations upon the practice of the invention or upon the many possible variations of the invention not specifically described herein. Since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A device, for selectively separating and removing larger sized objects from a mixture of larger and smaller sized objects which comprises:

(a) a rotatable chamber, the chamber adapted to contain the mixture of larger and smaller sized objects, the chamber having at least one opening substantially coincident with an axis of rotation, the axis of rotation being longitudinal with respect to the chamber, the opening in the chamber suitable for access into the interior of the chamber and for removal of the larger sized objects from the interior of the chamber;

(b) a support base, the support base rotatively supporting the chamber for rotation about the axis of rotation, the support base having at least one opening that aligns with the opening in the chamber and is substantially coincident with the axis of rotation, the opening in the support base suitable for access into the interior of the chamber and for removal of the larger sized objects from the interior of the chamber;

(c) at least one separating element, the separating element being rigidly situated, longitudinally with respect to the chamber and parallel with respect to the axis of rotation, on the interior of the chamber such that the combination of the separating element, gravity and the interior of the chamber cooperate to separate the larger sized objects from the mixture of larger and smaller sized objects and to retain the separated larger sized objects onto the separating element during the rotation of the chamber; and (d) a ramp, the ramp interior of the chamber and fixed to the support base such that the combination of the separating element and the ramp cooperate to allow the separated larger sized objects to exit the chamber.

2. A device as recited in claim 1 further comprising a receptacle, the receptacle being situated outside the chamber to receive the separated larger sized objects from the ramp and to store the separated larger sized objects removed from the mixture of larger and smaller sized objects.

3. A device as recited in claim 2 further comprising a face plate, the face plate being removably situated on the exterior surface of the support base at the opening in the chamber and the opening of the support base, the face plate having an opening that aligns with the opening in the chamber and the opening in the support base and is substantially coincident with the axis of rotation, the opening in the face plate suitable for access into the interior of the chamber and for removal of the larger sized objects from the interior of the chamber, the face plate is removable from the support base and the chamber to provide access to the interior of the chamber through the opening in the support base and the opening in the chamber.

4. A device as recited in claim 3 in which the ramp is pivotable between a first position wherein the ramp is substantially horizontal to receive the separated larger sized objects from the separating means and a second position wherein the ramp is inclined to allow the separated larger sized objects to slide on the ramp and exit the chamber, the ramp pivoting from the first position to the second position against a restoring means by the cooperation of gravity and the larger sized objects when deposited on the ramp by the separating means and pivoting from the second position to the first position by the restoring means when the larger sized objects have slid off the ramp and exited the chamber.

5. A device, for selectively separating and removing larger sized objects from a mixture of larger and smaller sized objects which comprises:
   (a) a rotatable chamber, the chamber adapted to contain the mixture of larger and smaller sized objects, the chamber having at least one opening substantially coincident with an axis of rotation, the axis of rotation being longitudinal with respect to the chamber, the opening in the chamber suitable for access into the interior of the chamber and for removal of the larger sized objects from the interior of the chamber;
   (b) a support base, the support base rotatively supporting the chamber for rotation about the axis of rotation, the support base having at least one opening that aligns with the opening in the chamber and is substantially coincident with the axis of rotation, the opening in the support base suitable for access into the interior of the chamber and for removal of the larger sized objects from the interior of the chamber;
   (c) a separating means, the separating means being rigidly situated interior of the chamber such that the combination of the separating means, gravity and the interior of the chamber cooperate to separate the larger sized objects from the mixture of larger and smaller sized objects and to retain the separated larger sized objects onto the separating means during the rotation of the chamber; and
   (d) a ramp interior of the chamber and fixed to the support base, the ramp pivotable between a first position wherein the ramp is substantially horizontal to receive the separated larger sized objects from the separating means and a second position wherein the ramp is inclined to allow the separated larger sized objects to slide on the ramp and exit the chamber, the ramp pivoting from the first position to the second position against a restoring means by the cooperation of gravity and the larger sized objects when deposited on the ramp by the separating means and pivoting from the second position to the first position by the restoring means when the larger sized objects have slid off the ramp and exited the chamber.

6. A device as recited in claim 5 in which the rotatable chamber further comprises:
   (a) a surface segment, the surface segment being a sheet that is cylindrical in shape to form the outer surface of the chamber;
   (b) a front assembly, the front assembly being circular in shape, the interior surface of the front assembly being rigidly situated onto the end of the surface segment to support the surface segment, and the front assembly being rotatively situated onto the end of the support base to rotatively support the chamber, the front assembly having an opening, the opening is substantially coincident with the axis of rotation of the chamber; and
   (c) a rear assembly, the rear assembly being circular in shape, the interior surface of the rear assembly being rigidly situated onto the opposite end of the surface segment to support the surface segment, and the rear assembly being rotatively situated onto the opposite end of the support base to rotatively support the chamber.

7. A device as recited in claim 6 in which the front assembly further comprises a grip, the grip being rigidly situated along the outer edge of the front assembly, wherein the grip is used to rotate the chamber.

8. A device as recited in claim 5 in which the separating means comprises at least one separating element.

9. A device as recited in claim 8 in which the separating element further comprises:
   (a) a framework, the framework being rigidly situated, longitudinally, onto the interior of the chamber; and
   (b) a plurality of elements, the plurality of elements being rigidly situated in the framework wherein the elements are a predetermined distance apart to form a plurality of apertures in the separating element, the apertures to allow the smaller sized objects to pass through the separating element while restraining and separating the larger sized objects from the mixture of larger and smaller sized objects and wherein the elements are inclined with respect to a line projected from the center of the axis of rotation of the chamber to the center of the framework such that the combination of gravity, the elements, the framework, and the interior surface of the chamber cooperate to retain the separated larger sized objects on the separating element during the rotation of the chamber.

10. A device as recited in claim 5 further comprising a means for guiding the separating means, the means for guiding the separating means being rigidly situated interior of the chamber and fixed to the support base to cooperate with the separating means to separate the larger sized objects from the mixture of larger and smaller sized objects, to retain the separated larger sized objects onto the separating means as the chamber is rotated and to move the separated larger sized objects from the separating means onto the ramp when the separating means is over the ramp.

11. A device as recited in claim 10 in which the separating means further comprises at least one separating element, at least one flap alignment device, at least one flap element, and at least one stop:
   (a) the separating element comprising:
      (i) a framework, the framework being rigidly situated, longitudinally, onto the interior of the chamber, and
      (ii) a plurality of elements, the elements being rigidly situated in the framework wherein the elements are a predetermined distance apart to form a plurality of apertures in the separating element, the apertures to allow the smaller sized objects to pass through the separating element while restraining and separating the larger sized objects from the mixture of larger and smaller sized objects;
   (b) the flap alignment device being situated onto the end of the flap element;
   (c) the flap element being rotatively situated onto the framework, over the top of the elements, wherein the flap element is closer to the center of the chamber than the elements, where the flap element rotates between a first flap element position wherein the flap element is substantially horizontal such that the flap element passes over the top of the mixture of larger and smaller sized objects to force all of the mixture of larger and smaller sized objects through the separating element, and a second flap element position wherein the flap element is inclined when the separating means is over the ramp to move the separated larger sized objects from the separating means onto the ramp, the flap element is rotated from the first flap element position to the second flap element position by the cooperation of gravity, the means for guiding the separating means and the separated larger sized objects and is rotated from the second flap element position to the first flap element position by the cooperation between the means for guiding the separating means and the flap alignment device after the larger sized objects are moved from the separating means onto the ramp; and (d) the stop being rigidly situated onto the framework to cooperate with the means for guiding the separating means to maintain the flap element in the first flap element position as the separating means moves through the mixture of larger and smaller sized objects and as the separating means retains the separated larger sized objects during the rotation of the chamber.

12. A device as recited in claim 10 in which the separating means further comprises at least one separating element, at least one flap counter balance element, at least one flap element and at least one stop:

(a) the separating element comprising:
   (i) a framework, the framework being rigidly situated, longitudinally, onto the interior of the chamber, and
   (ii) a plurality of elements, the elements being rigidly situated in the framework wherein the elements are a predetermined distance apart to form a plurality of apertures in the separating element, the apertures to allow the smaller sized objects to pass through the separating element while restraining and separating the larger sized objects from the mixture of larger and smaller sized objects;

(b) the flap counter balance element being rigidly situated onto the flap element;

(c) the flap element being rotatively situated onto the framework, over the top of the elements, wherein the flap element is closer to the center of the chamber than the elements, where the flap element rotates between a first flap element position wherein the flap element is substantially horizontal such that the flap element passes over the top of the mixture of larger and smaller sized objects to force all of the mixture of larger and smaller sized objects through the separating element, and a second flap element position wherein the flap element is inclined when the separating means is over the ramp to move the separated larger sized objects from the separating means onto the ramp, the flap element is rotated from the first flap element position to the second flap element position by the cooperation of gravity, the means for guiding the separating means and the separated larger sized objects and is rotated from the second flap element position to the first flap element position by the cooperation of gravity and the flap counter balance element after the larger sized objects are moved from the separating means onto the ramp; and (d) the stop being rigidly situated onto the framework to cooperate with the means for guiding the separating means to maintain the flap element in the first flap element position as the separating means moves through the mixture of larger and smaller sized objects and as the separating means retains the separated larger sized objects during the rotation of the chamber.

13. A device as recited in claim 5 in which the ramp pivots about an axis transverse to the axis of rotation of the chamber.

14. A device as recited in claim 5 in which the restoring means is provided by the cooperation of gravity and a ramp counter balance element attached to the ramp.

15. A device as recited in claim 5 in which the restoring means is provided by at least one spring attached to the ramp.

16. A device as recited in claim 5 in which the ramp further comprises:

(a) a long lever arm, the long lever arm comprising a sheet that is substantially rectangular in shape with a concave surface such that the combination of gravity and the concave surface cooperate to concentrate the separated larger sized objects in the center of the long lever arm to retain the separated larger sized objects on the long lever arm to ultimately allow the separated larger sized objects to exit the chamber; and (b) a ramp mounting bracket, the ramp mounting bracket being rigidly situated onto the bottom of the long lever arm substantially close to the rear of the long lever arm to rotatively support the long lever arm in the interior of the chamber.

17. A device as recited in claim 5 further comprising at least one baffle being rigidly situated interior of the chamber and fixed to the support base in a substantially vertical position, where the combination of gravity, the baffle, the separating means and the interior of the chamber cooperate to retain the separated larger sized objects on the separating means while the chamber is being rotated such that the separated larger sized objects will ultimately exit the chamber.

18. A device, for selectively separating and removing larger sized objects from a mixture of larger and smaller sized objects and for storing the separated larger sized objects which comprises:

(a) a rotatable chamber, the chamber adapted to contain the mixture of larger and smaller sized objects, the chamber having at least one opening substantially coincident with an axis of rotation, the axis of rotation being longitudinal with respect to the chamber, the opening in the chamber suitable for access into the interior of the chamber and for removal of the larger sized objects from the interior of the chamber;

(b) a support base, the support base rotatively supporting the chamber for rotation about the axis of rotation, the support base having at least one opening that aligns with the opening in the chamber and is substantially coincident with the axis of rotation, the opening in the support base suitable for access into the interior of the chamber and for removal of the larger sized objects from the interior of the chamber;

(c) a separating means, the separating means being rigidly situated interior of the chamber such that the combination of the separating means, gravity and the interior of the chamber cooperate to separate the larger sized objects from the mixture of larger and smaller size objects and to retain the separated larger sized objects onto the separating means as the chamber is rotated;

(d) a ramp, the ramp interior of the chamber and fixed to the support base such that the combination of the separating means and the ramp cooperate to allow the separated larger sized objects to exit the chamber;

(e) a receptacle, the receptacle being situated outside the chamber to receive the separated larger sized objects from the ramp and to store the separated larger sized objects removed from the mixture of larger and smaller sized objects; and (f) a face plate, the face plate being removably situated on the exterior surface of the support base at the opening in the chamber and the opening of the support base, the face plate having an opening that aligns with the opening in the chamber and the opening in the support base and is substantially coincident with the axis of rotation, the opening in the face plate suitable for access into the interior of the chamber and for removal of the larger sized objects from the interior of the chamber, the face plate is removable from the support base and the chamber to provide access to the interior of the chamber through the opening in the support base and the opening in the chamber.

19. A device as recited in claim 18 in which the face plate is movable while being removably situated on the exterior surface of the support base, the face plate is movable from a first face plate position, wherein the face plate provides access into the chamber, to a second face plate position, wherein the face plate cooperates with the ramp to move the separated larger sized objects from the interior of the chamber into the receptacle.

20. A device as recited in claim 19 in which the second face plate position is located approximately one hundred and eighty degrees from the first face plate position.

21. A device as recited in claim 19 in which the face plate further comprises a face plate step, the face plate step being rigidly attached onto the exterior surface of the face plate such that the face plate step covers the receptacle when the face plate is in the first face plate position.

22. A device as recited in claim 19 in which the face plate further comprises a face plate disposal chute, the face plate disposal chute being rigidly attached to the exterior surface of the face plate such that the combination of the face plate disposal chute and the ramp cooperate to move the separated larger sized objects from the interior of the chamber into the receptacle when the face plate is in the second face plate position.

23. A device as recited in claim 21 in which the face plate further comprises a face plate disposal chute, the face plate disposal chute being rigidly attached to the exterior surface of the face plate such that the combination of the face plate disposal chute and the ramp cooperate to move the separated larger sized objects from the interior of the chamber into the receptacle when the face plate is in the second face plate position.

24. A device as recited in claim 22 in which the face plate further comprises a short ramp, the short ramp being situated in the face plate disposal chute of the face plate, the short ramp pivotable between a first short ramp position wherein the face plate disposal chute holds the short ramp substantially horizontal to prevent the short ramp from falling down into the opening in the face plate and a second short ramp position wherein the short ramp is inclined to allow the separated larger sized objects to slide from the ramp onto the short ramp and from the short ramp into the receptacle, the short ramp pivoting from the first short ramp position to the second short ramp position when the face plate is moved from the first face plate position to the second face plate position and the short ramp pivoting from the second short ramp position to the first short ramp position when the face plate is moved from the second face plate position to the first face plate position.

25. A device as recited in claim 23 in which the face plate further comprises a short ramp, the short ramp being situated in the face plate disposal chute of the face plate, the short ramp pivotable between a first short ramp position wherein the face plate disposal chute holds the short ramp substantially horizontal to prevent the short ramp from falling down into the opening in the face plate and a second short ramp position wherein the short ramp is inclined to allow the separated larger sized objects to slide from the ramp onto the short ramp and from the short ramp into the receptacle, the short ramp pivoting from the first short ramp position to the second short ramp position when the face plate is moved from the first face plate position to the second face plate position and the short ramp pivoting from the second short ramp position to the first short ramp position when the face plate is moved from the second face plate position to the first face plate position.

26. A device as recited in claim 24 in which the short ramp comprises a short lever arm, a pair of short ramp mounting brackets and a pair of short ramp mounting bracket pins:

(a) the short lever arm comprising a sheet that is substantially rectangular in shape with a concave surface such that the combination of gravity and the concave surface cooperate to concentrate the separated larger sized objects in the center of the short lever arm to retain the separated larger sized objects on the short lever arm to ultimately allow the separated larger sized objects to exit the chamber;

(b) the pair of short ramp mounting brackets being rigidly situated onto the bottom of the short lever arm to pivotally support the short lever arm; and (c) the pair of short ramp mounting bracket pins are received in the end of the short ramp mounting brackets to pivotally attach the short lever arm to the face plate.

27. A device as recited in claim 19 further comprising:

(a) a first face plate rotation element, the first face plate rotation element being rigidly situated onto the interior surface of the face plate and is perpendicular to the face plate such that the first face plate rotation element extends toward the interior of the chamber a predetermined distance;

(b) a second face plate rotation element, the second face plate rotation element being rigidly situated onto the interior surface of the face plate and is perpendicular to the face plate such that the second face plate rotation element extends toward the interior of the chamber a predetermined distance, the second face plate rotation element is located one-hundred and eighty degrees from the first face plate rotation element;

(c) a front assembly engaging device, the front assembly engaging device being rigidly situated interior of the chamber, on the end of the chamber with the opening in the chamber, such that the combination of the front assembly engaging device and the second face plate rotation element cooperate to rotate the face plate from the first face plate position to the second face plate position with a first rotation of the chamber and such that the combination of the front assembly engaging device and the first face plate rotation element cooperate to rotate the face plate from the second face plate position back to the first face plate position with a second rotation of the chamber; and (d) a front assembly engaging device tripping element, the front assembly engaging device tripping element being rigidly situated interior of the chamber and fixed to the support base, on the end of the chamber with the opening in the chamber, and is perpendicular to the support base and the chamber such that the front assembly engaging device tripping element extends toward the interior of the chamber a predetermined distance to allow the front assembly engaging device tripping element to come in contact with the front assembly engaging device wherein the front assembly engaging device tripping element disengages the front assembly engaging device from the first face plate rotation element to stop the movement of the face plate at the first face plate position and disengages the front assembly engaging device from the second face plate rotation element to stop the movement of the face plate at the second face plate position.

28. A device as recited in claim 27 further comprising a front assembly engaging device guide, the front assembly engaging device guide being rigidly situated interior of the chamber and fixed to the support base, on the end of the chamber with the opening in the chamber, and is perpendicular to the support base such that the front assembly engaging device guide extends toward the interior of the chamber a predetermined distance to allow the front assembly engaging device guide to come in contact with the front assembly engaging device wherein the front assembly engaging device guide prevents the front assembly engaging device from re-engaging the first face plate rotation element during a predetermined distance of the first rotation after the front assembly engaging device tripping element has disengaged the front assembly engaging device from the first face plate rotation element and from re-engaging the second face plate rotation element a predetermined distance of the second rotation after the front assembly engaging device tripping element has disengaged the front assembly engaging device from the second face plate rotation element.

29. A device as recited in claim 22 in which the receptacle comprises:
(a) a receptacle inner element, the receptacle inner element comprising a cavity to receive the separated larger sized objects from the ramp;
(b) a receptacle outer element, the receptacle outer element comprising a cavity to receive the receptacle inner element inside the receptacle outer element and having an opening in the top of the receptacle outer element; and
(c) a receptacle chute, the receptacle chute being received in the opening in the top of the receptacle outer element such that the combination of the receptacle chute, the face plate disposal chute and the ramp cooperate to direct the separated larger sized objects from the interior of the chamber into the receptacle inner element.

30. A device as recited in claim 25 in which the receptacle comprises:
(a) a receptacle inner element, the receptacle inner element comprising a cavity to receive the separated larger sized objects from the ramp;
(b) a receptacle outer element, the receptacle outer element comprising a cavity to receive the receptacle inner element inside the receptacle outer element and having an opening in the top of the receptacle outer element; and
(c) a receptacle chute, the receptacle chute being received in the opening in the top of the receptacle outer element wherein the combination of the receptacle chute and the face plate step seals the receptacle when the face plate is in the first face plate position and wherein the combination of the receptacle chute, the face plate disposal chute, the short ramp and the ramp cooperate to direct the separated larger sized objects from the interior of the chamber into the receptacle inner element when the face plate is in the second face plate position.

31. A device as recited in claim 30 in which the receptacle further comprises:
(a) a receptacle inner element seal, the receptacle inner element seal made from flexible material and being rigidly situated onto the surface of the receptacle inner element wherein the receptacle inner element seal engages the interior surface of the receptacle outer element when the receptacle inner element is received inside the receptacle outer element to retain the separated larger sized objects inside the receptacle inner element and receptacle outer element; and
(b) a first receptacle chute seal, the first receptacle chute seal made from flexible material and being rigidly situated onto the top of the receptacle chute wherein the first receptacle chute seal engages the bottom of the face plate step to seal the receptacle when storing the separated larger sized objects in the receptacle, when the face plate is in the first face plate position, and wherein the first receptacle chute seal engages the top of the face plate disposal chute to seal the receptacle when receiving the separated larger sized objects from the interior of the chamber into the receptacle, when the face plate is in the second face plate position.

32. A device as recited in claim 31 in which the receptacle further comprises a second receptacle chute seal, the second receptacle chute seal made from flexible material and being rigidly situated onto the bottom of the receptacle chute wherein the second receptacle chute seal engages the interior surface of the receptacle outer element to seal the receptacle when storing the separated larger sized objects in the receptacle, when the face plate is in the first face plate position, and to seal the receptacle when receiving the separated larger sized objects from the interior of the chamber into the receptacle, when the face plate is in the second face plate position.

33. A device as recited in claim 22 in which the device uses a plastic bag for storing the separated larger sized objects in the receptacle and the receptacle comprises:
(a) a receptacle inner element, the receptacle inner element holds the plastic bag in a predetermined position such that the plastic bag receives the separated larger sized objects from the ramp for storage;
(b) a plastic bag attachment device, the plastic bag attachment device being attached to the receptacle inner element wherein the plastic bag attachment device removably attaches the plastic bag to the receptacle inner element to allow replacement of the plastic bag when the plastic bag is filled with separated larger sized objects;
(c) a receptacle outer element, the receptacle outer element comprising a cavity to receive the receptacle inner element inside the receptacle outer element and having an opening in the top of the receptacle outer element; and
(d) a receptacle chute, the receptacle chute that is received inside the opening in the top of the receptacle outer element such that the combination of the receptacle chute, the face plate disposal chute and the ramp cooperate to direct the separated larger sized objects from the interior of the chamber into the plastic bag held by the receptacle inner element.

34. A device, for selectively separating and removing larger sized objects from a mixture of larger and smaller sized objects and for storing the separated larger sized objects which comprises:
(a) a rotatable chamber, the chamber adapted to contain the mixture of larger and smaller sized objects, the chamber having at least one opening substantially coincident with an axis of rotation, the axis of rotation being longitudinal with respect to the chamber, the opening in the chamber suitable for access into the interior of the chamber and for removal of the larger sized objects from the interior of the chamber;

(b) a support base, the support base rotatively supporting the chamber for rotation about the axis of rotation, the support base having at least one opening that aligns with the opening in the chamber and is substantially coincident with the axis of rotation, the opening in the support base suitable for access into the interior of the chamber and for removal of the larger sized objects from the interior of the chamber;

(c) a separating means, the separating means being rigidly situated interior of the chamber such that the combination of the separating means, gravity and the interior of the chamber cooperate to separate the larger sized objects from the mixture of larger and smaller size objects and to retain the separated larger sized objects onto the separating means as the chamber is rotated;

(d) a ramp, the ramp interior of the chamber and fixed to the support base such that the combination of the separating means and the ramp cooperate to allow the separated larger sized objects to exit the chamber;

(e) a receptacle, the receptacle being situated outside the chamber to receive the separated larger sized objects from the ramp and to store the separated larger sized objects removed from the mixture of larger and smaller sized objects;

(f) a face plate, the face plate being removably situated on the exterior surface of the support base at the opening in the chamber and the opening of the support base, the face plate having an opening that aligns with the opening in the chamber and the opening in the support base and is substantially coincident with the axis of rotation, the opening in the face plate suitable for access into the interior of the chamber and for removal of the larger sized objects from the interior of the chamber, the face plate is removable from the support base and the chamber to provide access to the interior of the chamber through the opening in the support base and the opening in the chamber, the face plate is movable while being removably situated on the exterior surface of the support base, the face plate is movable from a first face plate position, wherein the face plate provides access into the chamber, to a second face plate position, wherein the face plate cooperates with the ramp to move the separated larger sized objects from the interior of the chamber into the receptacle;

(g) a means for rotating the chamber, the means for rotating the chamber to rotate the chamber to separate and remove the larger sized objects from the mixture of larger and smaller sized objects in the chamber; and (h) a means to control the means for rotating the chamber, the means to control the means for rotating the chamber to regulate the operation of the means for rotating the chamber such that the means for rotating the chamber rotates the chamber a plurality of rotations to separate and remove the larger sized objects from the mixture of larger and smaller sized objects in the chamber.

35. A device as recited in claim 24 in which the means for rotating the chamber comprises:

(a) a motor;

(b) a friction wheel, the friction wheel being attached to the motor wherein the friction wheel is turned by the motor; and (c) a motor support base, the motor support base being rigidly connected to the motor and being resiliently connected to the support base wherein the motor support base forces the friction wheel against the exterior surface of the chamber to rotate the chamber when the friction wheel is turned by the motor.

36. A device as recited in claim 34 where the means to control the means of rotating the chamber further comprises:

(a) a chamber sensor, the chamber sensor for sensing the exit of an object or a living creature from the interior of the chamber; and (b) a delay means, the delay means being connected to the chamber sensor and to the means for rotating the chamber, for actuating the means for rotating the chamber to rotate the chamber at a predetermined time subsequent to sensing the exit of the object or the living creature from the interior of the chamber.

37. A device as recited in claim 30 in which the chamber sensor comprises:

(a) a chamber radiation source, the chamber radiation source being rigidly situated interior of the chamber, at one end of the chamber, and fixed to the support base, the chamber radiation source producing a beam that projects across the chamber above the fill level; and (b) a chamber detector, the chamber detector being rigidly situated interior of the chamber, at the other end of the chamber, and fixed to the support base in a location to intercept the beam from the chamber radiation source.

38. A device as recited in claim 37 in which:

(a) the chamber radiation source being a light source and the beam being a light beam;

(b) the chamber detector being a photodetector; and (c) the light source and the photodetector being rigidly situated interior of the chamber and fixed to the support base at opposite ends of the chamber.

39. A device as recited in claim 36 further comprising a level sensor, the level sensor for sensing an insufficient quantity of the mixture of larger and smaller sized objects in the interior of the chamber, below a given fill level.

40. A device as recited in claim 36 further comprising a receptacle sensor for sensing a quantity of the separated larger sized objects in the interior of the receptacle above a given receptacle full level.

41. A device as recited in claim 40 in which the receptacle sensor comprises:

(a) a receptacle radiation source, the receptacle radiation source being rigidly situated interior of the receptacle at one side of the receptacle, the receptacle radiation source producing a beam that projects across the receptacle above the receptacle full level; and (b) a receptacle detector, the receptacle detector being rigidly situated interior of the receptacle at the other side of the receptacle in a location to intercept the beam from the receptacle radiation source.

* * * * *